(12) United States Patent
Cohen

(10) Patent No.: US 10,547,575 B2
(45) Date of Patent: Jan. 28, 2020

(54) APPARATUS AND METHOD FOR CONTROL OF ACCESS TO COMMUNICATION CHANNELS

(71) Applicant: WRINKL, INC., Sands Point, NY (US)

(72) Inventor: Marc A. Cohen, Blue Bell, PA (US)

(73) Assignee: Wrinkl, Inc., Sands Point, NY (US)

( * ) Notice: Subject to any disclaimer, the term of this patent is extended or adjusted under 35 U.S.C. 154(b) by 0 days.

(21) Appl. No.: 16/376,427

(22) Filed: Apr. 5, 2019

(65) Prior Publication Data

US 2019/0238489 A1    Aug. 1, 2019

Related U.S. Application Data

(63) Continuation-in-part of application No. 16/014,578, filed on Jun. 21, 2018, which is a continuation-in-part of application No. 15/858,696, filed on Dec. 29, 2017, now Pat. No. 10,025,475, and a continuation-in-part of application No. 15/609,663, filed on May 31, 2017, now Pat. No. 10,009,300, which is a continuation of application No. 15/293,620, filed on Oct. 14, 2016, now Pat. No. 9,712,466, said application No. 15/858,696 is a continuation-in-part of application No. 15/431,077, filed on Feb. 13, 2017, now Pat. No. 9,860,198.

(60) Provisional application No. 62/783,410, filed on Dec. 21, 2018, provisional application No. 62/666,137, filed on May 3, 2018, provisional application No. 62/518,905, filed on Jun. 13, 2017, provisional application No. 62/446,067, filed on Jan. 13, 2017, provisional application No. 62/358,719, filed on Jul. 6, 2016, provisional application No. 62/253,229, filed on Nov. 10, 2015.

(51) Int. Cl.
*G06F 15/16* (2006.01)
*H04L 12/58* (2006.01)
*H04L 29/06* (2006.01)

(52) U.S. Cl.
CPC ............ *H04L 51/046* (2013.01); *H04L 51/12* (2013.01); *H04L 51/16* (2013.01); *H04L 51/18* (2013.01); *H04L 51/36* (2013.01); *H04L 65/1069* (2013.01); *H04L 65/1093* (2013.01); *H04L 65/4015* (2013.01)

(58) Field of Classification Search
CPC .............................. H04L 51/12; H04L 51/16
See application file for complete search history.

(56) References Cited

U.S. PATENT DOCUMENTS

2005/0198584 A1 * 9/2005 Matthews ............. G06F 3/0482
                                                        715/779

* cited by examiner

*Primary Examiner* — Yves Dalencourt
(74) *Attorney, Agent, or Firm* — Caesar Rivise, PC

(57) ABSTRACT

A method of managing message communication improves computer security, the method comprising the steps of: first selecting or creating a first group wave rule that identifies a subset of a plurality of message actors; first providing the subset of the plurality of message actors with access to a message sidebar, wherein the plurality of message actors communicate with each other in a message channel associated with the sidebar, and an excluded actor of the plurality of message actors is excluded from access to the sidebar; second selecting or creating a second group wave rule that relates to the excluded actor; receiving one or more responsive messages in the sidebar from the subset responsive to the first providing; and second providing the excluded actor with access to the sidebar.

30 Claims, 87 Drawing Sheets

| Actor | 1st Wave Rule | Done | 2nd Wave Rule | A Loc | S Loc |
|---|---|---|---|---|---|
| Ben | X | | | — | — |
| Jose | X | | | — | — |
| Julia | X | | | — | — |
| Manish | X | | | — | — |
| Sarah | X | | | — | — |
| Sona | X | | | — | — |
| Elizabeth | | | X | | — |

↑ 550  ↑ 555  ↑ 560  ↑ 565  ↑ 570  ↑ 575

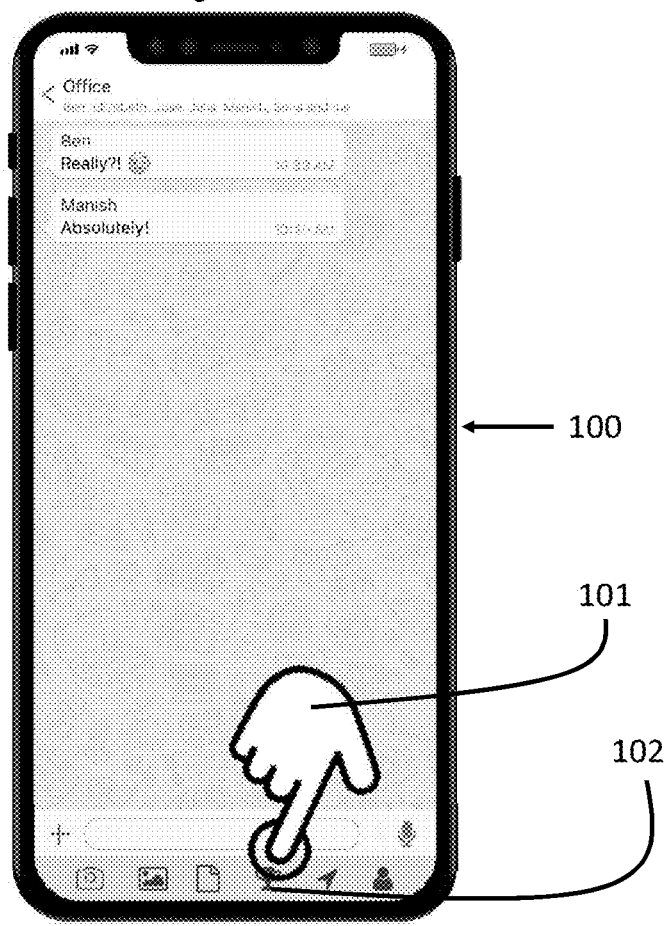

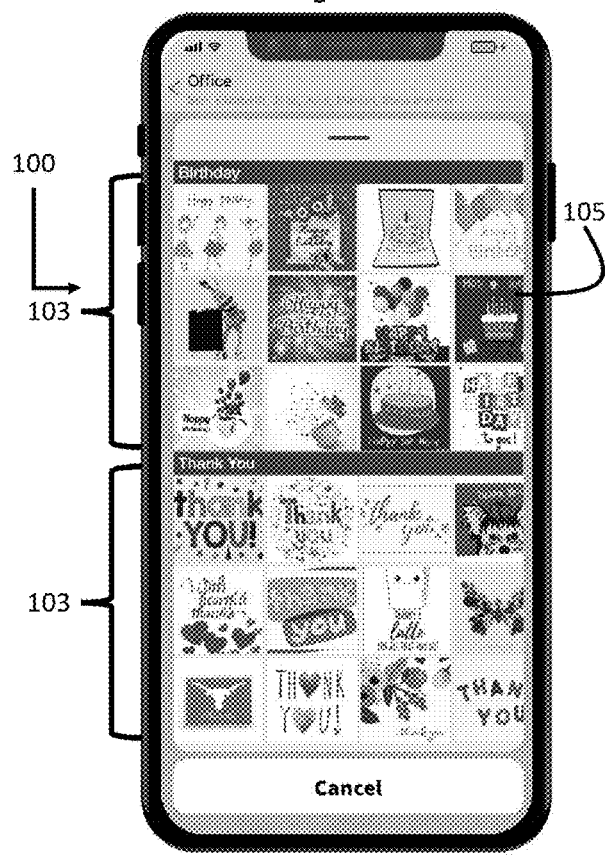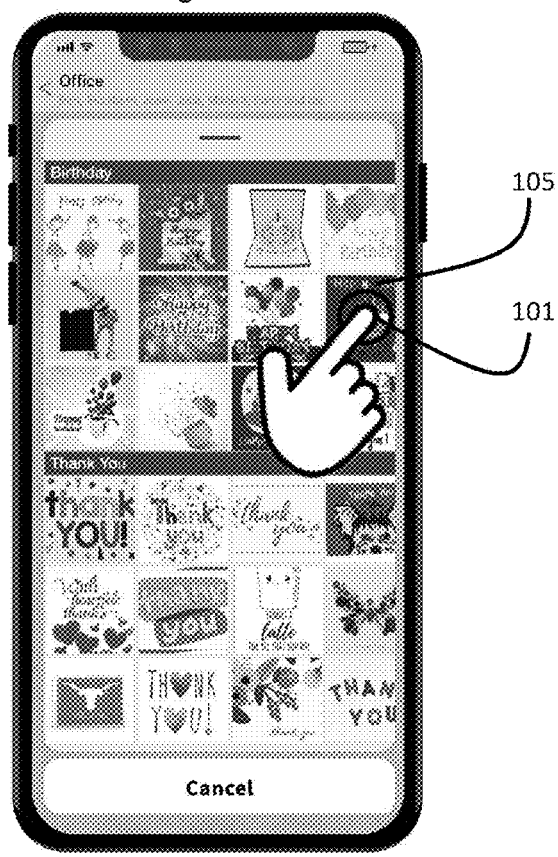

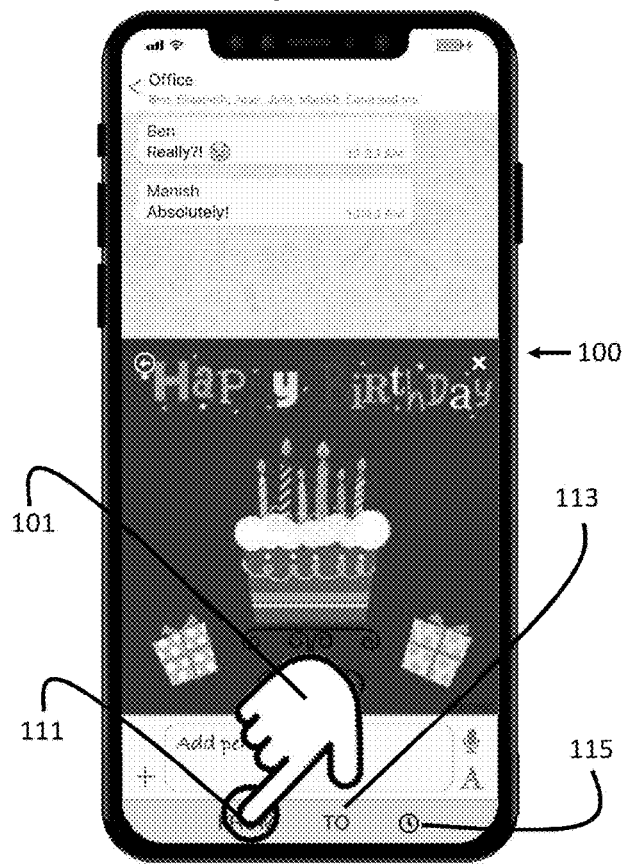

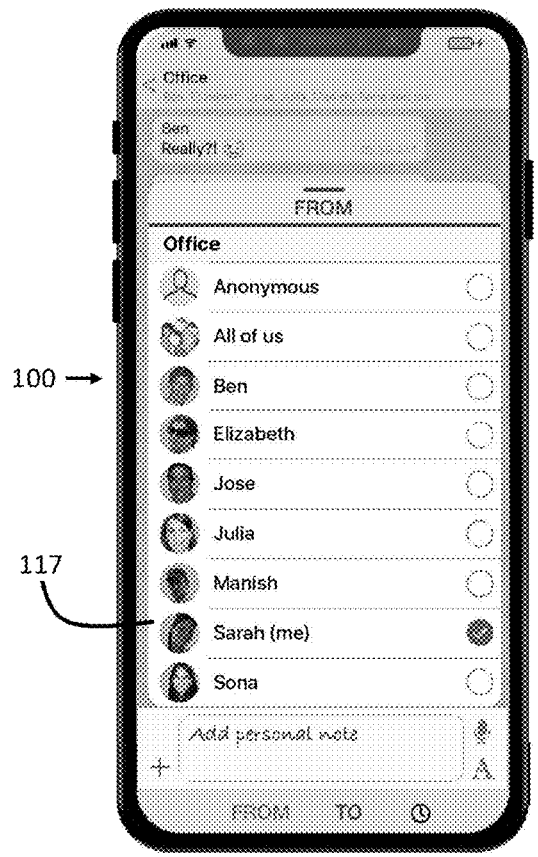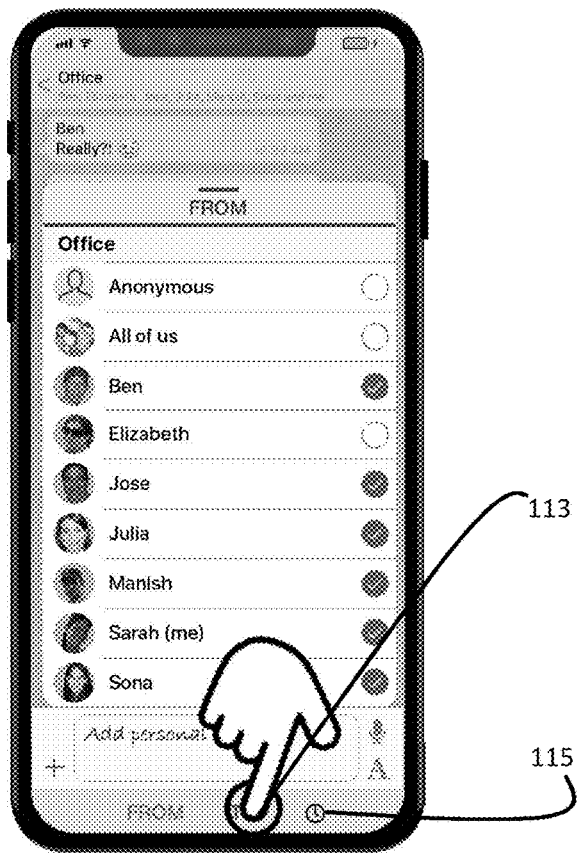

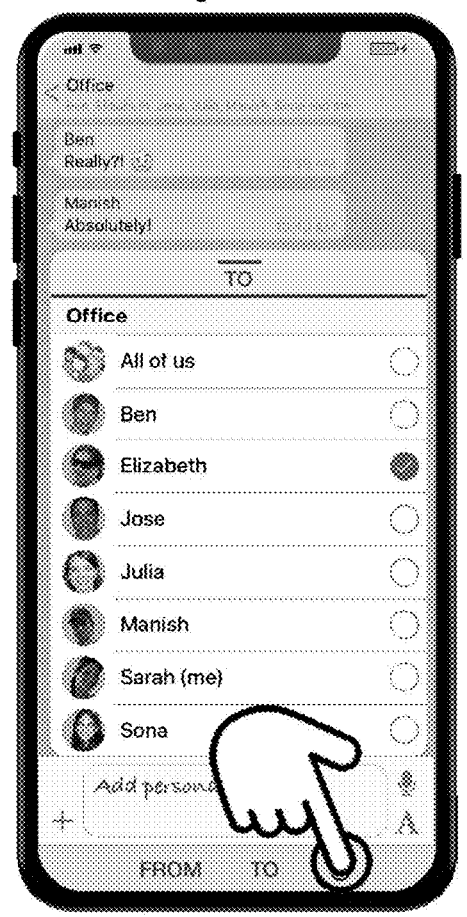

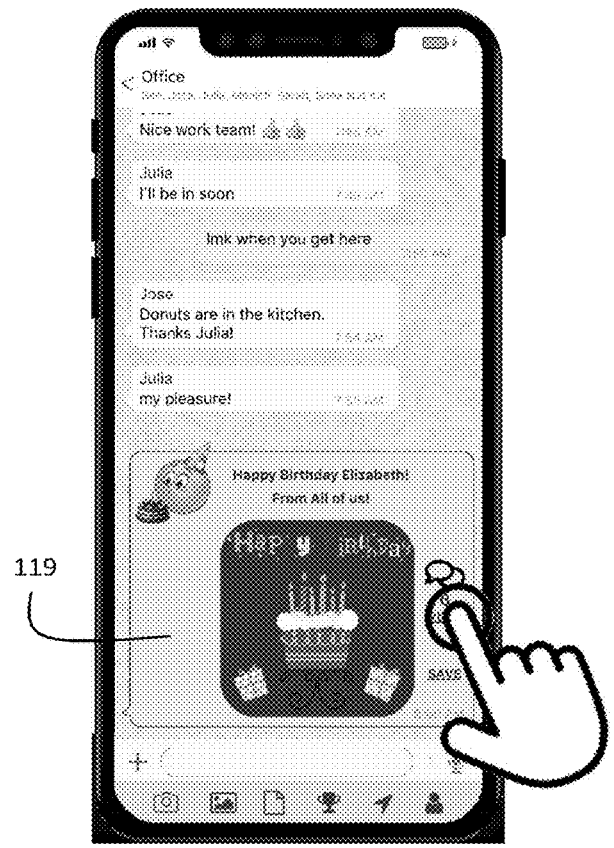
Figure 29
Figure 30

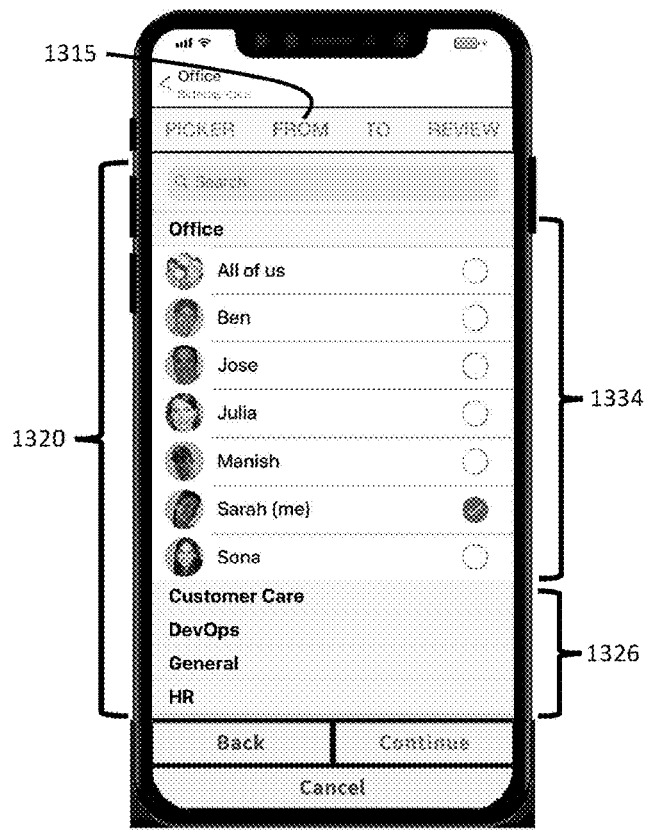
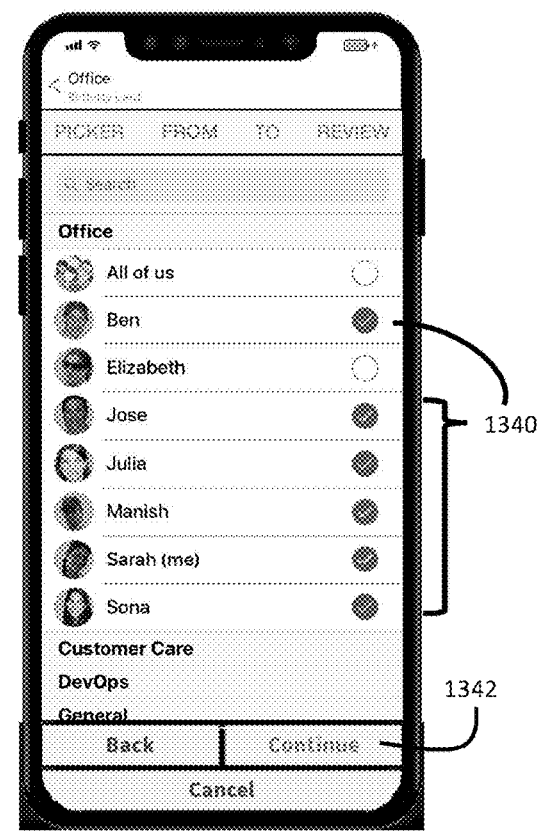

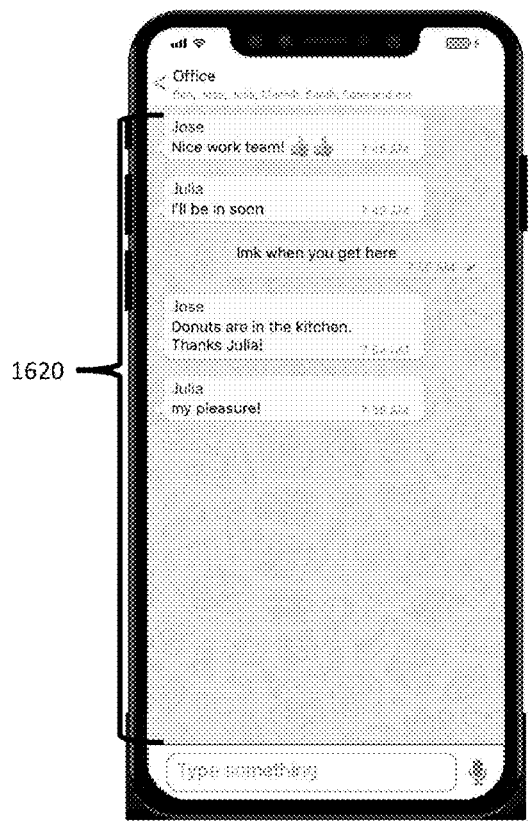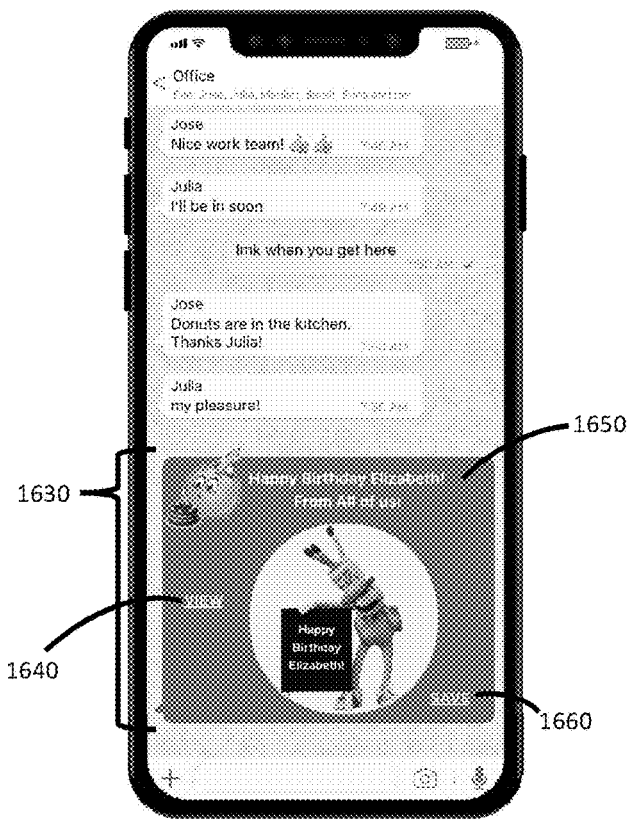

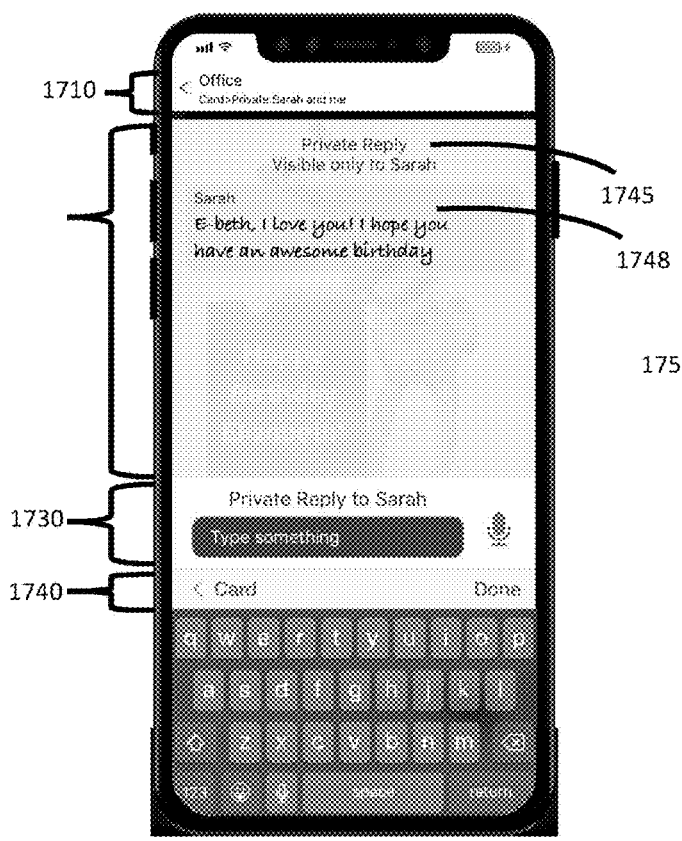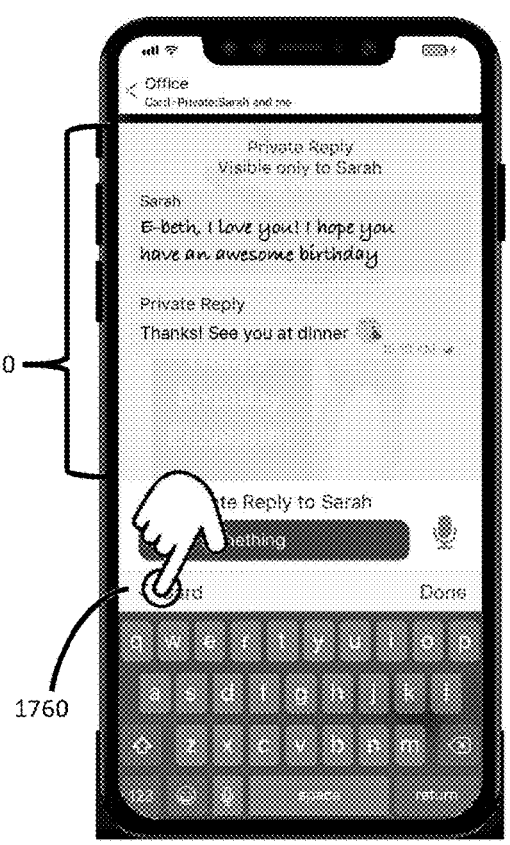

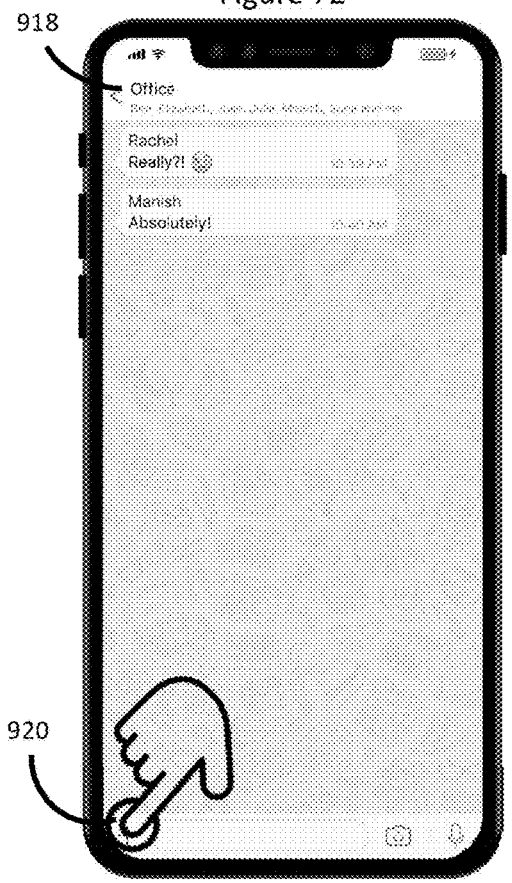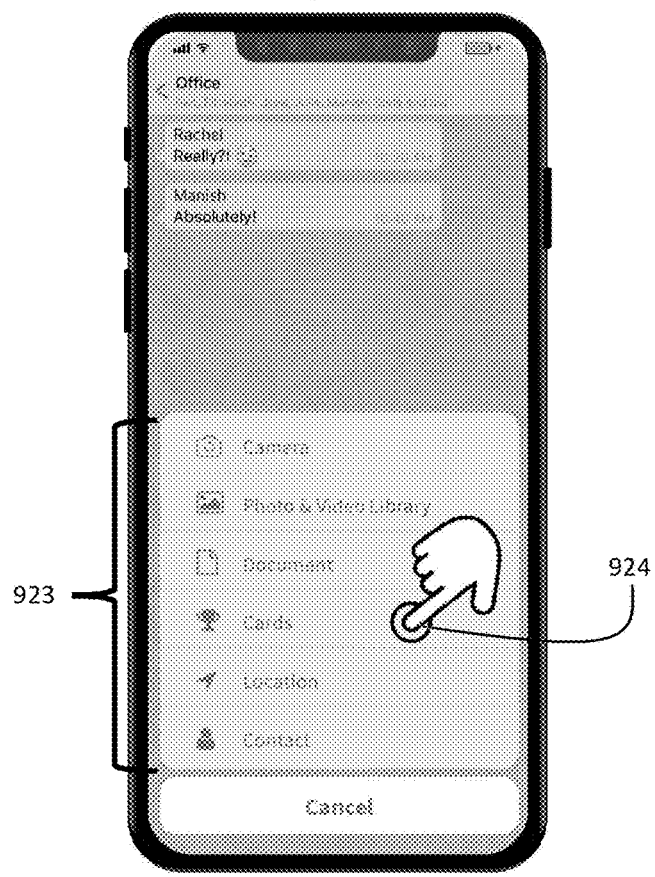

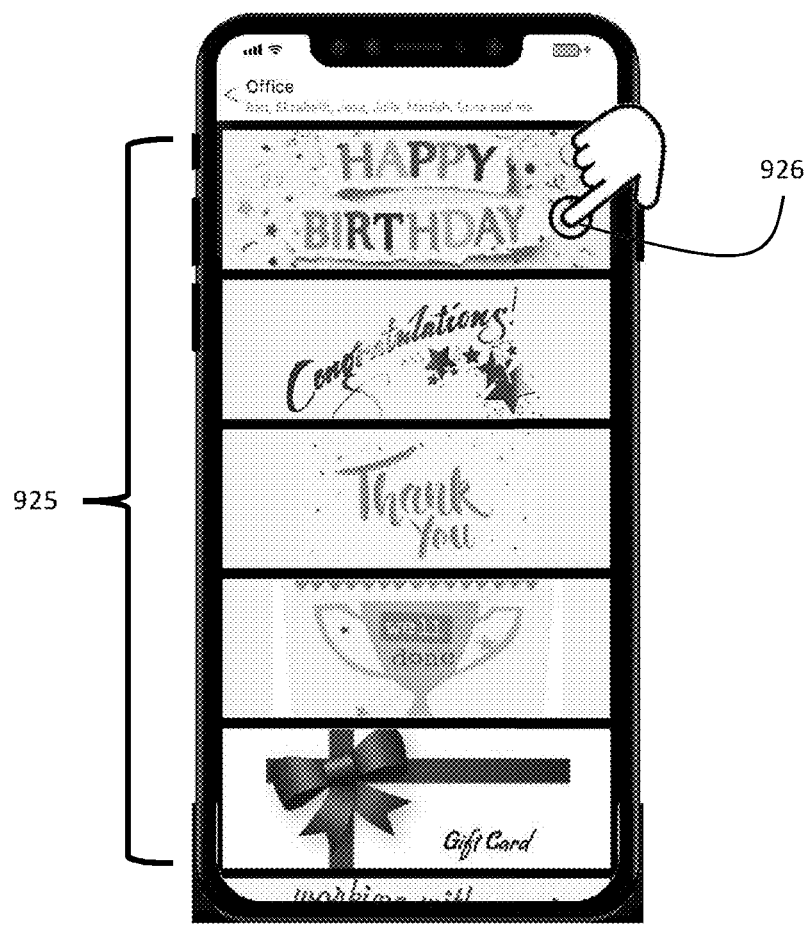

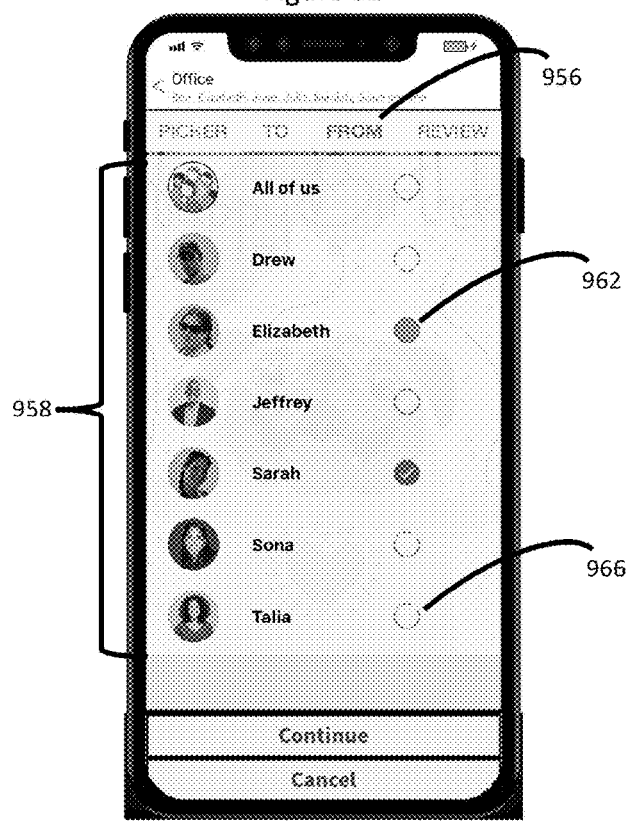
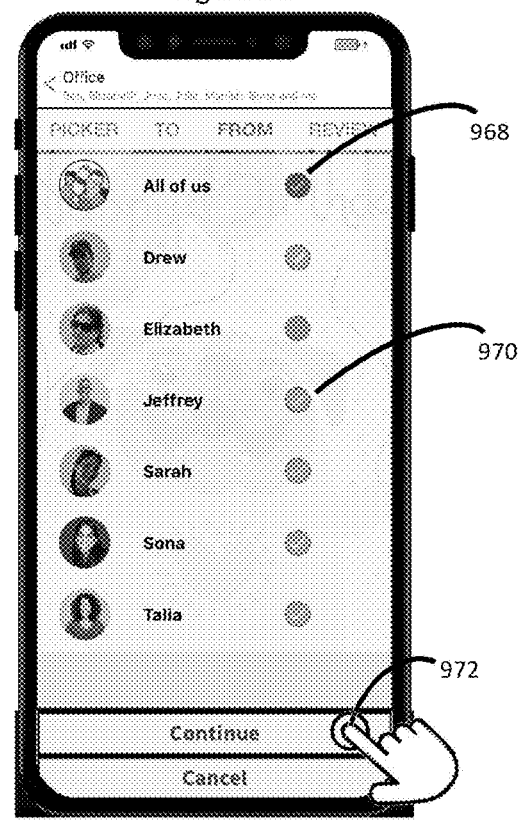

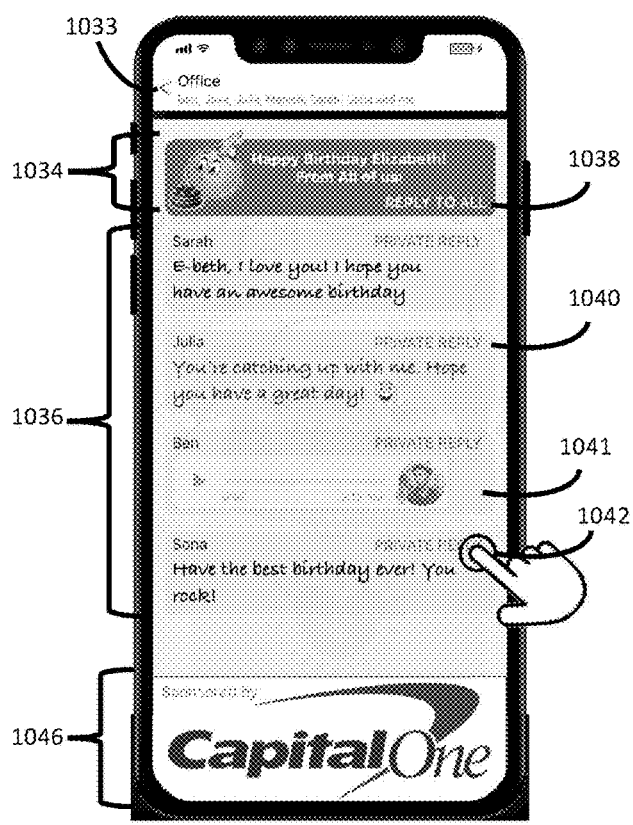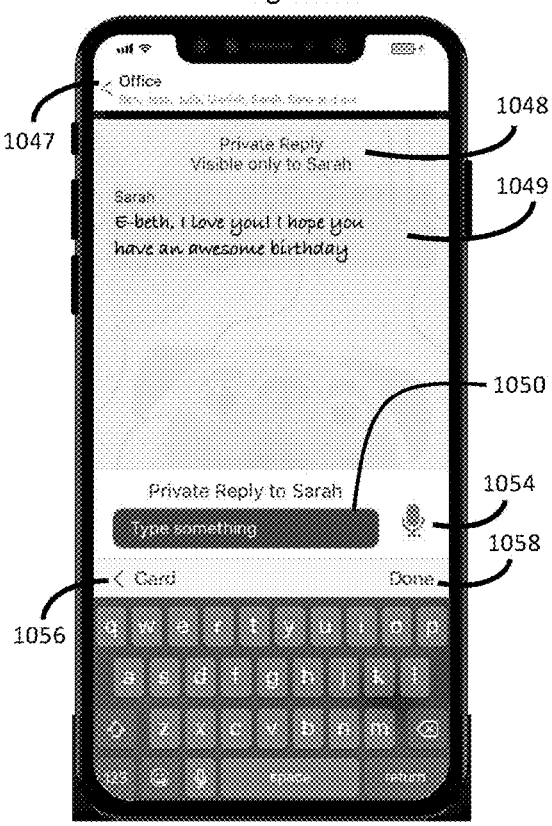

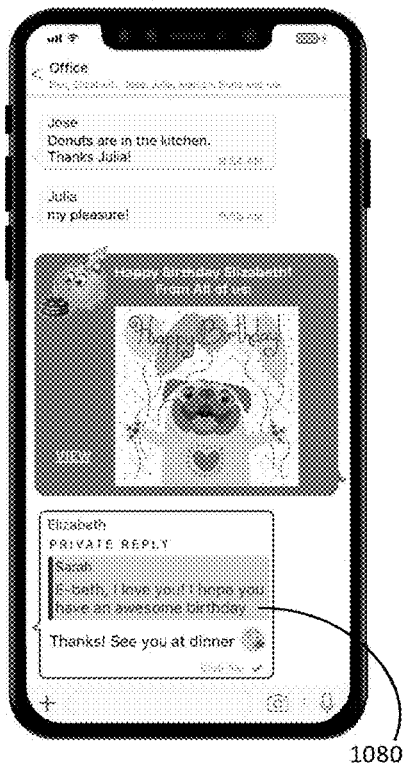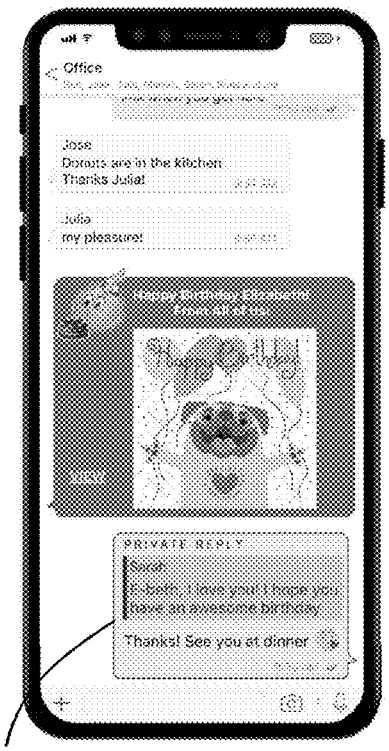

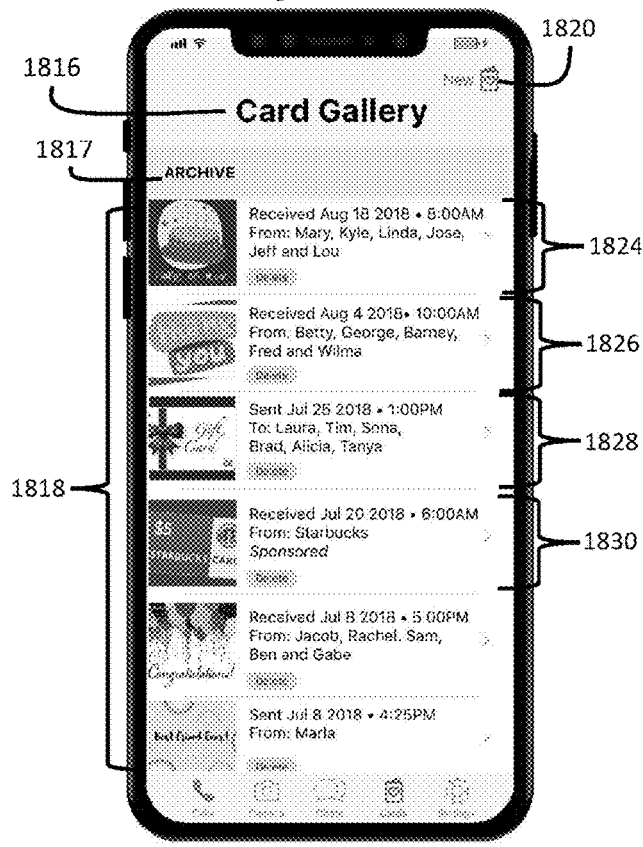
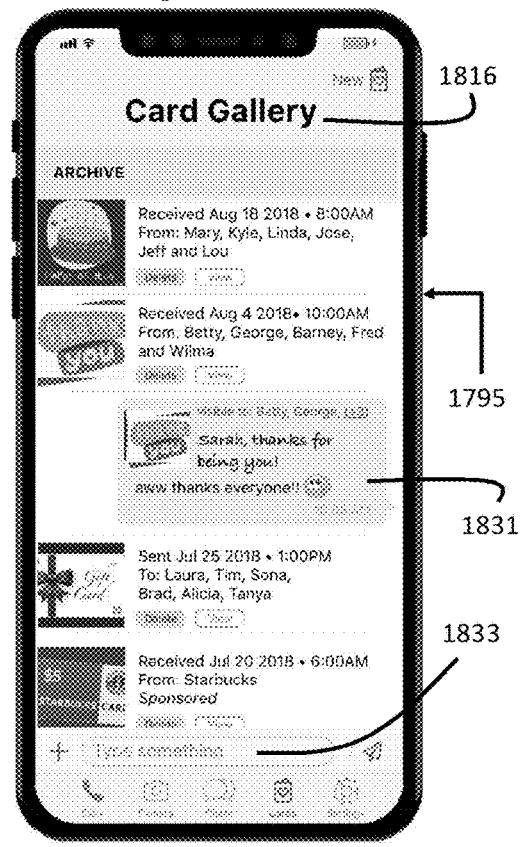
Figure 109a
Figure 109b

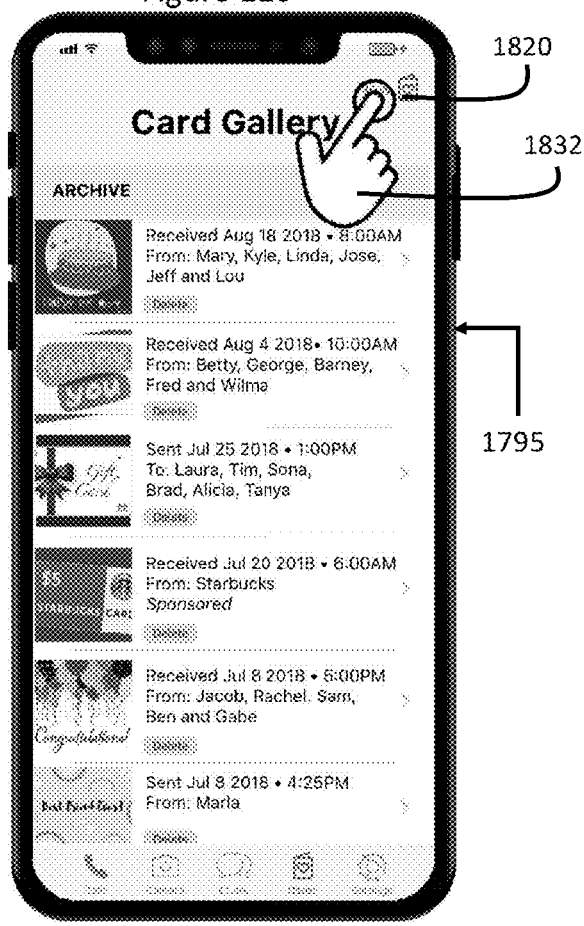

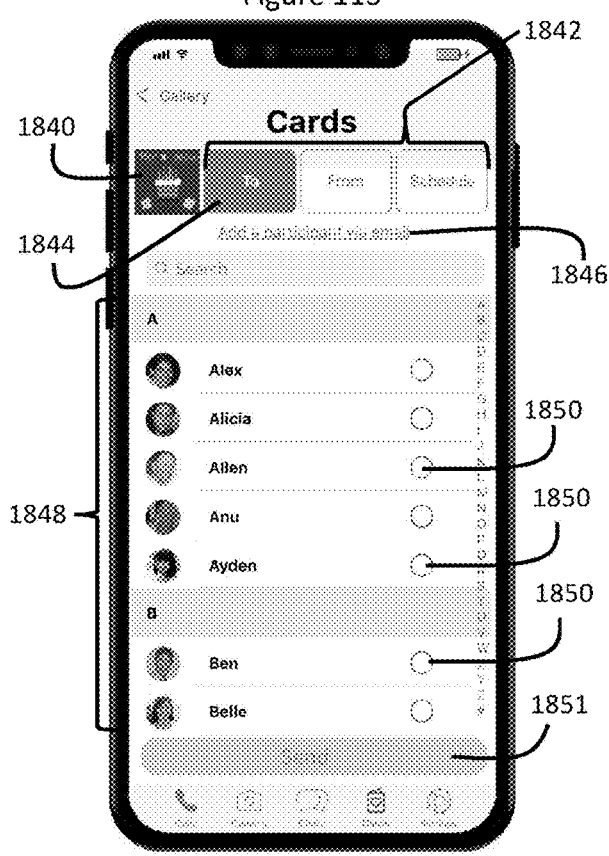
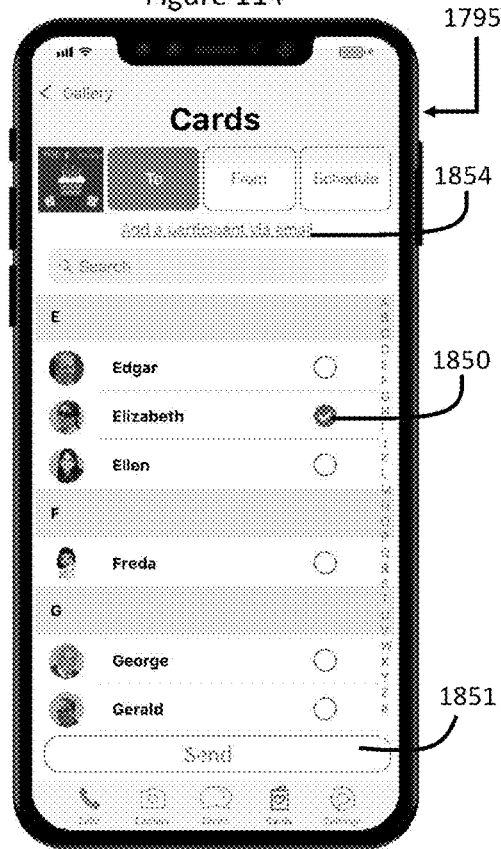

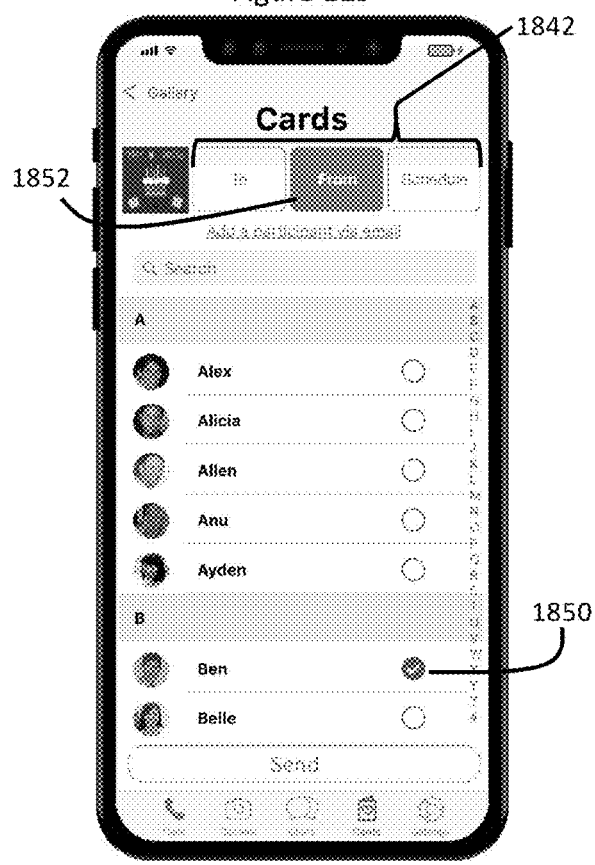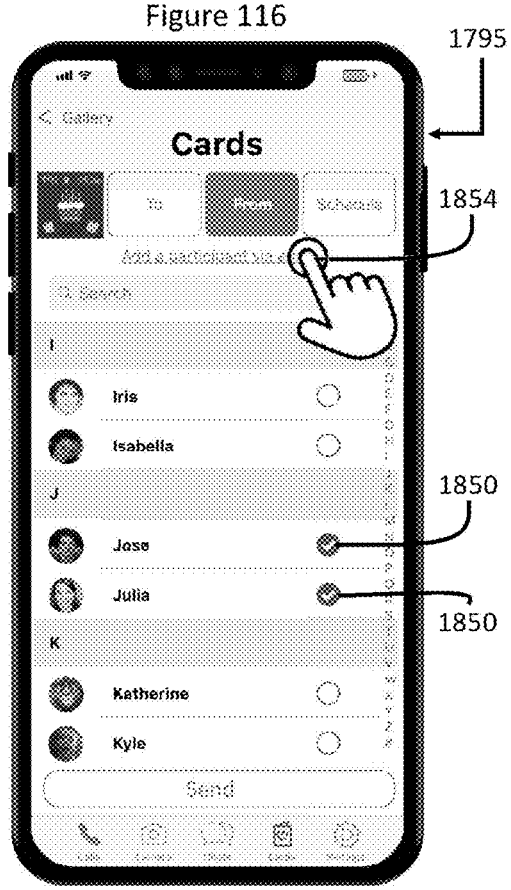

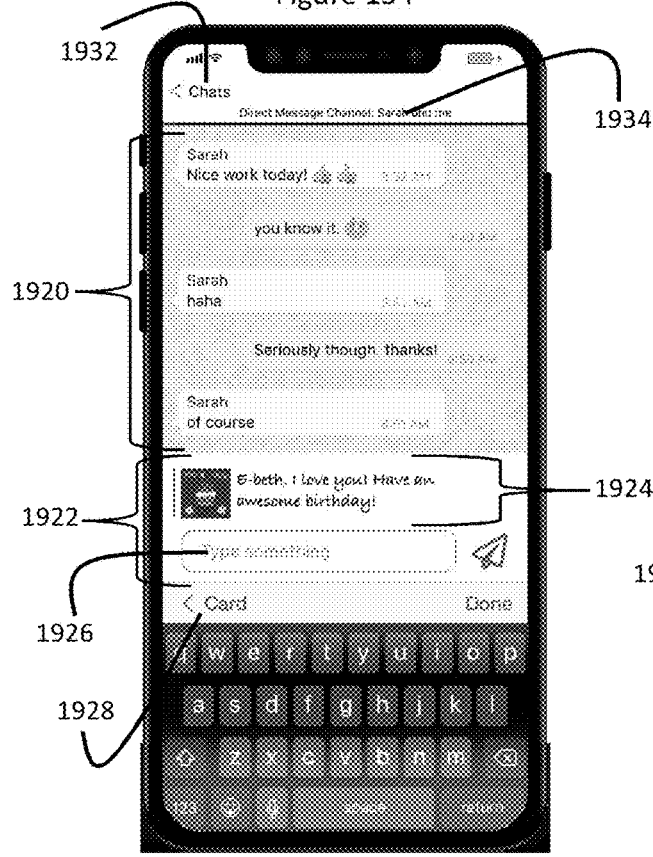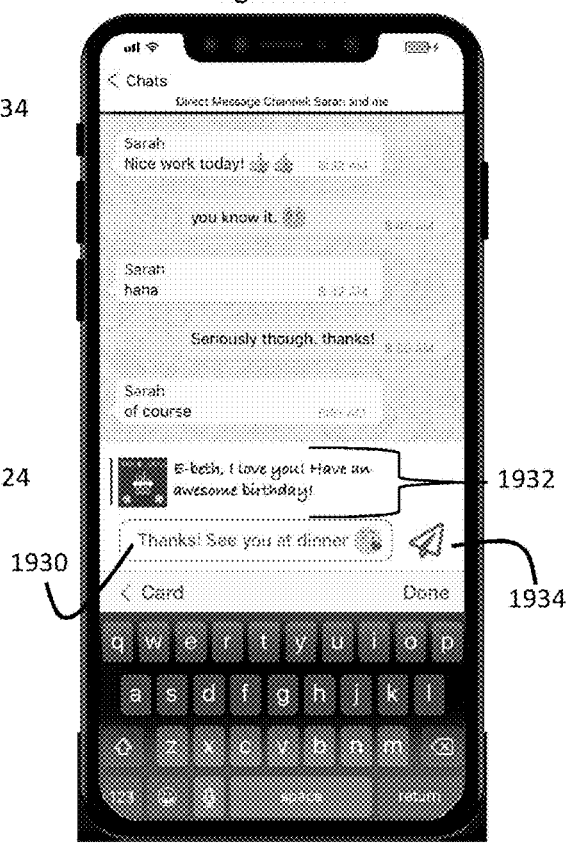

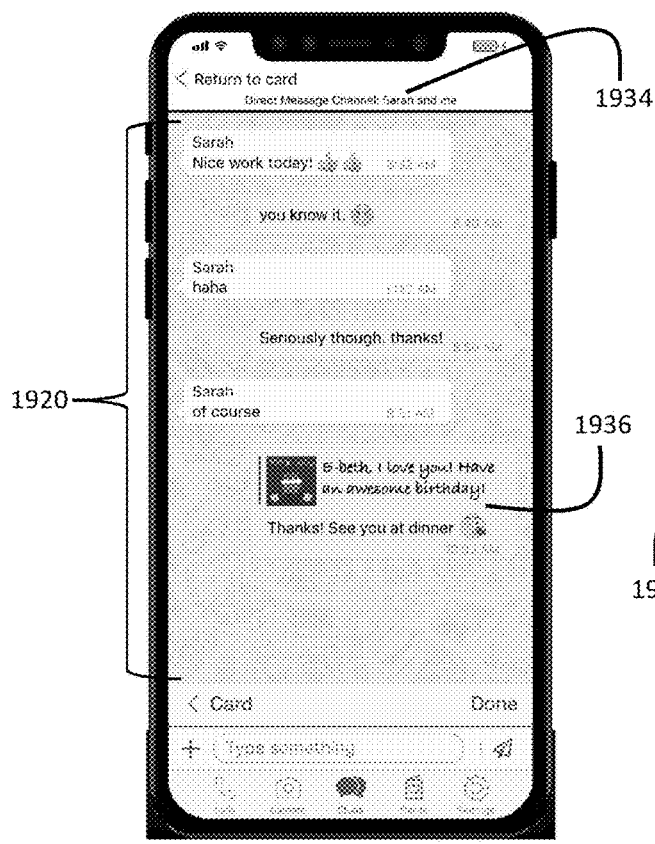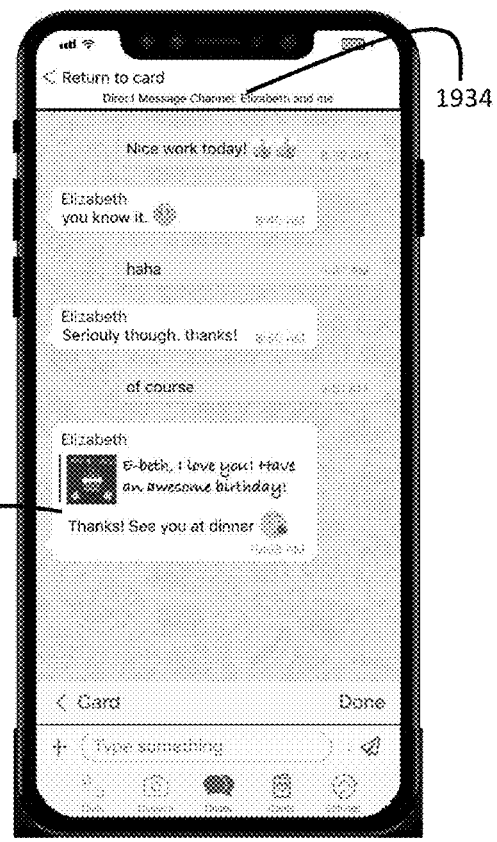

APPARATUS AND METHOD FOR CONTROL OF ACCESS TO COMMUNICATION CHANNELS

CROSS REFERENCE TO RELATED APPLICATIONS

This application is a Continuation-In-Part of U.S. patent application Ser. No. 16/014,578 filed Jun. 21, 2018, which is a Continuation-In-Part of U.S. patent application Ser. No. 15/609,663, filed May 31, 2017, now U.S. Pat. No. 10,009,300, which is a Continuation of U.S. patent application Ser. No. 15/293,620, filed Oct. 14, 2016, now U.S. Pat. No. 9,712,466, which claims the benefit under 35 U.S.C. § 119(e) of U.S. Provisional Patent Application No. 62/358,719, filed Jul. 6, 2016, and U.S. Provisional Patent Application No. 62/253,229, filed Nov. 10, 2015, the disclosures of all of which are incorporated by reference herein in their entireties.

This application is also a Continuation-In-Part of U.S. patent application Ser. No. 16/014,578 filed Jun. 21, 2018, which is a Continuation-In-Part of U.S. patent application Ser. No. 15/858,696 filed on Dec. 29, 2017, now U.S. Pat. No. 10,025,475, which is a Continuation-In-Part of U.S. patent application Ser. No. 15/431,077 filed Feb. 13, 2017, now U.S. Pat. No. 9,860,198, and which claims the benefit of priority under 35 U.S.C. § 119(e) to U.S. Provisional Patent Application 62/446,067 filed Jan. 13, 2017, and U.S. Provisional Patent Application 62/518,905 filed on Jun. 13, 2017, the disclosures of all of which are incorporated by reference herein in their entireties.

This application claims the benefit under 35 U.S.C. 119(e) of U.S. Provisional Patent Application 62/666,137, filed May 3, 2018, and U.S. Provisional Patent Application 62/783,410, filed Dec. 21, 2018, the disclosures of all of which are incorporated by reference herein in their entireties.

This application claims the benefit under 35 U.S.C. 119(e) of U.S. Provisional Patent Application 62/783,410, filed Dec. 21, 2018, the disclosure of which is incorporated by reference in its entirety.

FIELD OF THE INVENTION

The present application relates to computer messaging and more specifically to computer messaging in which multiple entities communicate with each other in a common communications channel. In particular, a method and apparatus are disclosed for enabling messaging between entities, and to the exclusion of a further entity, and for later providing inclusion of the excluded entity.

BACKGROUND

Electronic chat communications (which include chat room communications, instant messaging and text messaging, etc.) are an increasingly popular way for two or more people to communicate on-line in virtual real time. For example, chat sessions for conveying a quick note are often used in the workplace in lieu of having a phone call with multiple individuals. In some situations, the ability to quickly communicate with more than one person using chat communications saves time and avoids costly mistakes in collaborative efforts, such as team projects. When multiple people, however, are participating in a chat session that may be established for a large project, current electronic chat communications are limited due the sequential, read-only, chronological presentation of exchanges between individuals or groups individuals associated with the electronic chat session.

SUMMARY OF THE INVENTION

A method (and apparatus) of managing message communication comprises the steps of: first selecting or creating a first group wave rule that identifies a subset of a plurality of message actors; first providing the subset of the plurality of message actors with access to a sidebar, wherein the plurality of message actors communicate with each other in a message channel associated with the sidebar, and an excluded actor of the plurality of message actors is excluded from access to the sidebar; second selecting or creating a second group wave rule that relates to the excluded actor; receiving one or more responsive messages in the sidebar from the subset responsive to the first providing; and second providing the excluded actor with access to the sidebar. The method provides useful security features to a computer system, including maintaining data in a confidential state until it is appropriate for an excluded entity to have access to certain data.

The above steps are not necessarily performed in the order specified above (although they could be). The words "first" and "second" are merely used to identify steps, and may not refer to the sequence in which those steps are performed.

BRIEF DESCRIPTION OF THE DRAWINGS

The disclosure is illustrated by way of example, and not by way of limitation, and will become apparent upon consideration of the following detailed description, taken in conjunction with the accompanying drawings, in which like reference characters refer to like parts throughout, and in which:

FIG. 10c is a data structure in accordance with an exemplary embodiment of the present invention.

FIGS. 11-39 are screen shots that illustrate an exemplary embodiment of the present invention.

FIGS. 41-70 are screen shots that illustrate an exemplary embodiment of the present invention.

FIGS. 72-108, 109*a*, 109*b*, and 110-137 are screen shots that illustrate exemplary embodiments of the present invention.

OVERVIEW

Figure 1:
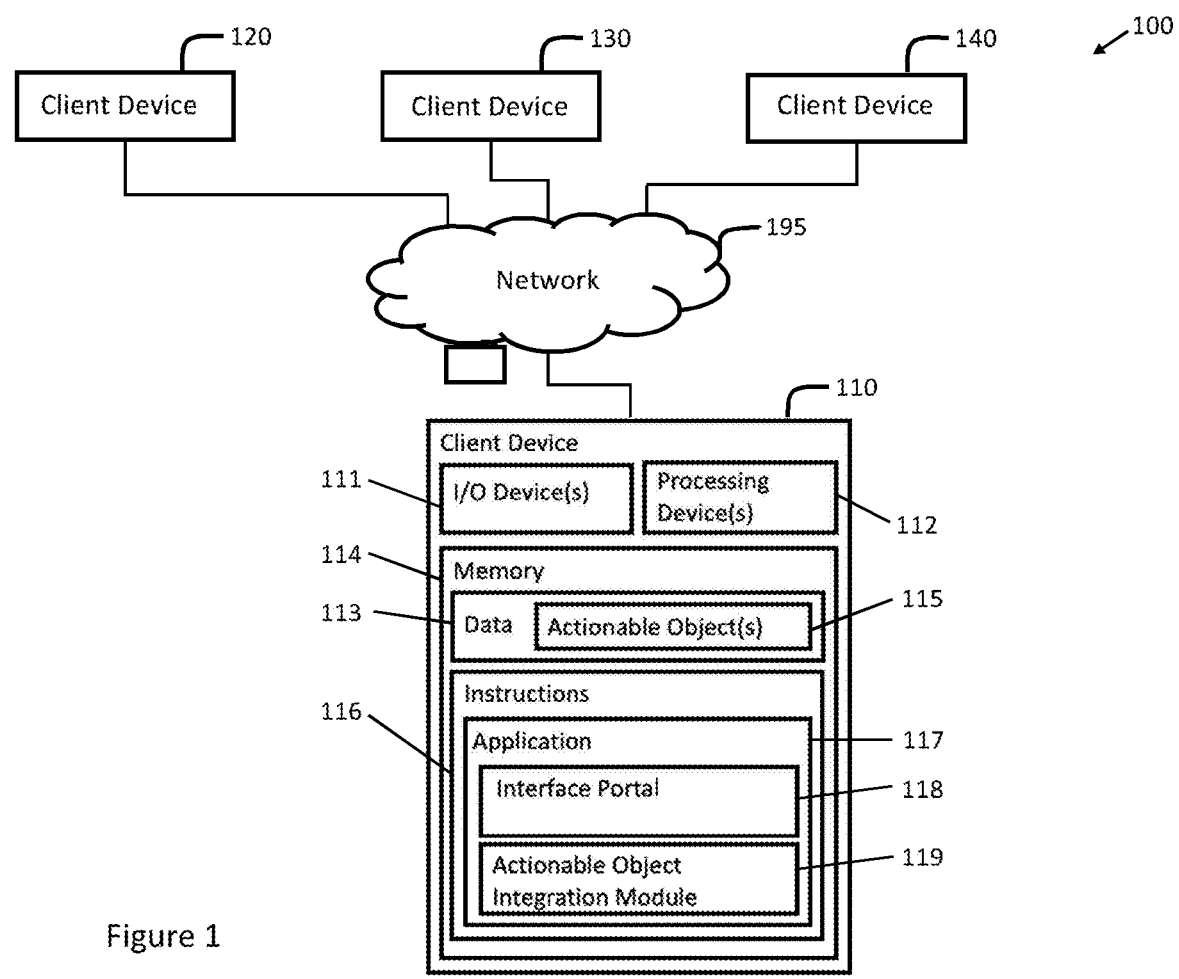
FIG. 1 is a block diagram illustrating a system in which implementations of the disclosure may operate.

The present invention relates to a method and apparatus with regard to management of communications. This overview is being provided to set forth an abbreviated explanation of the present invention, and is being provided for illustrative purposes only. Various technical features have been omitted. This overview merely describes one exemplary embodiment of the present invention, to enable partial understanding of the invention, and should not be construed as a limitation on the scope of the present invention. The Detailed Description should be carefully reviewed to obtain a more comprehensive explanation of the present invention.

Names of people and the action of a birthday greeting are described below merely as an analogy, to facilitate an understanding of digital communications management in accordance with an exemplary embodiment of the present invention.

An exemplary embodiment of the present invention relates to a sidebar, which may loosely be thought of as "a message channel within a message channel." While a group of users may effectively communicate (i.e. "have a conversation") with each other in a message channel, sometimes another conversation with a subset of the group of users is preferable. A sidebar allows the group subset to communicate privately. The subset of users thus exchanges messages with each other in the sidebar, and a user outside of the subset does not see the exchange of those messages (unless the sidebar is shared).

A simple example may be helpful. Assume Alex, Bob, Charisse and David are all communicating with each other in a single messaging channel. It will soon be David's birthday, and Alex, Bob and Charisse wish to give David birthday greetings. However, Alex, Bob and Charisse do not want David to see their birthday greetings until they each have had the chance to add their greeting (think of a person not receiving a birthday card until the card is signed by a group of people). Alex, Bob and Charisse access the sidebar to create their birthday greeting to David. David is excluded from the sidebar so that he will not have access to the birthday greeting until Alex, Bob and Charisse have first had the chance to add their greetings. (e.g., After a period of time and/or other condition is fulfilled (e.g., at a specified date and time or immediately after the last of Alex, Bob or Charisse has added a personalized birthday greeting), previously excluded David is given access to the Sidebar and is able to view the birthday greeting.

Associated with exemplary embodiments of the present invention are a) the digital mechanisms for accessing the sidebar in a manner so that Alex, Bob and Charisse remain in communication to the exclusion of David, b) a digital data structure (e.g. the birthday greeting) that is completed (and/or modified) while David remains excluded, and c) the features that give David access to the completed (and or modified) digital data structure.

In the above example, Alex, Bob, Charisse and David are a plurality of message actors. An anchor message is selected (or for example, created) in order to trigger creation of the sidebar in which a first subset of the actors (i.e. Alex, Bob and Charisse) are given access to the birthday card (i.e., Sidebar). A first group wave rule identifies the first subset of message actors, namely Alex, Bob and Charisse, so that they can access the sidebar and create their birthday greeting for David. In this example, Alex is the Sidebar (Birthday Card) Creator and spawns the Sidebar when he selects (or creates) the anchor message. Bob and Charisse, by having access to the sidebar are able to add their own greetings (i.e., messages) to the Sidebar (i.e., birthday card/greeting). A second group wave rule identifies David as part of a second subset of message actors. At an appropriate time, the second group wave rule gives David access to the sidebar. As a result of David having access to the sidebar, David can see and respond to the birthday card greetings.

DETAILED DESCRIPTION

In accordance with the present disclosure a system is provided that is intended to be used as a system of record for an organization, work group, social group, etc., using various combinations of communication techniques. Although implementations of the disclosure may be particularly beneficial in certain types of communication platforms (e.g., chat room communications), other types of communication platforms can be utilized in conjunction with the disclosure. For example, some of these communication platforms may include platforms for text messages, short message services (SMS), rich communications services (RCS), e-mails and other types of similar on-line and/or social media communication platforms for facilitating information exchanges between client devices of a plurality of participants.

In the following description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to a system for performing the operations herein. This system may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

In some implementations, the computer program product, or software may include a non-transitory machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

In one implementation, the computer program product may be installed and/or a service may be selected from a cloud-computing environment in order to obtain the benefits of the techniques described herein. In an implementation, the computer program product may be downloaded onto a client device. For example, a participant may elect to download the computer program product from a service associated with an online server. The client device may transmit a request for the computer program product over a network and, in response, receive the computer program product from the service. The computer program product may be installed locally on the client device or stored at the service and may be accessed through the client device, for example, via a mobile web browser.

I. Example Systems

FIG. 1 is a block diagram illustrating a system 100 in which implementations of the disclosure may operate. In some implementations, the system 100 may facilitate the transfer of electronic communications between computing devices of two or more users or participants over a communication network. The system 100 can include one or more servers (e.g. server device 140), which provide access or a communication link between a plurality of client devices (e.g., client devices 110, 120 and 130) in order to facilitate communication between two or more client devices.

As shown in FIG. 1, the system 100 may include a plurality of client computing devices, such as client devices 110, 120 and 130, coupled to network 195, and one or more server computing devices, such as server device 140, capable of communicating with the client computing devices 110, 120 and 130 over the network 195. In some implementations, the network 195 may be a private network (e.g., a local area network (LAN), Wi-Fi, Bluetooth, Radio Frequency), a wide area network (WAN), intranet, etc.), or a public network (e.g., the Internet).

Server device 140 may be at one node of network 195 and capable of directly and indirectly communicating with other nodes of the network 195. For example, the server device 140 may include a web server that may be capable of communicating with client devices 110, 120 and 130 via network 195 such that it uses the network 195 to transmit and display information to a participant on a display associated with client devices. In some implementations, the server device 140 may also include a plurality of computers that exchange information with different nodes of a network for the purpose of receiving, processing and transmitting data to the client devices 110, 120 and 130.

Referring to FIG. 1, the computing devices of system 100, such as client device 110, may include one or more I/O (input/output) devices 111, processors 112, memory 114, and other components typically present in general purpose computers. "Processor" or "Processing device" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 112 is depicted in FIG. 1, in some other implementations computer system 100 may comprise a plurality of processors. Similarly, in some other implementations computer system 100 may comprise a plurality of I/O devices, rather than a single I/O device 111.

Instructions 116 of the client device 110 may be a set of instructions to be executed directly (such as machine code) or indirectly (such as scripts) by the processor 112. In that regard, the terms "instructions," "steps" and "programs" may be used interchangeably herein. The instructions 116 may be stored in object code format for direct processing by the processors 112, or in another computer language including scripts or collections of independent source code modules that are interpreted on demand or compiled in advance.

Data 118 may be retrieved, stored or modified by processors 112 in accordance with the instructions 116. For instance, although the present disclosure is not limited by a particular data structure, the data 118 may be stored in computer registers, in a relational database as a table having a plurality of different fields and records, XML documents, or flat files. The data 118 may also be formatted in a computer-readable format such as, but not limited to, binary values, ASCII or Unicode. By further way of example only, the data 118 may comprise information sufficient to identify the relevant information, such as numbers, descriptive text, proprietary codes, pointers, references to data stored in memory or information that is used by a function to calculate the relevant data. For example, the data 118 may include actionable objects 115 that may identify user perceivable action that can be included in a chat session.

Each of the actionable objects 115 may comprise an adjustable data structure (e.g., a memory array) comprising a plurality of fields that characterize a type category to associate with a chat message. By incorporating the actionable objects 115 into the creation of the chat messages, the system 100 is able to ascribe a value "type" to each message. In one implementation, when one or more actionable objects 115 are added or inserted into a chat message of the chat session, the actionable object executes a series of steps to be performed by a corresponding user perceivable action. The series of steps can be preprogrammed or variable based on the context of the type category for that action.

In some implementations, each client device may include an application 117 to facilitate different types of electronic communications between each client device and one or more other client devices via network 195, including providing interactive interface portals 118 for facilitating various operating functions of the disclosure. In one implementation, the application 117 may be installed and/or a service may be selected in order to obtain the benefits of the techniques described herein. In an implementation, the application 117 may be downloaded onto the client device 110. For example, a participant may elect to download the application from a service associated with an online server. The client device 110 may transmit a request for the application 117 over network 195 and, in response, receive the application 117 from the service.

The application 117 may be installed locally on the client device 110. Alternatively, the application 117 can be stored at the service and may be accessed through the client device 110, for example, via a mobile web browser. By using the application 117, the client device 110 may integrate into a chat session user perceivable actionable objects, such as actionable objects 115, which can be executed by the client device 110 to enhance communications between participants of that session. In an alternative implementation, the application 117 may be a firmware embedded in communication device.

As shown in FIG. 1, the instructions 116 may include an interface portal 118 for displaying network data and to allow a participant associated with the client device 110 to interactively navigate over the display of data. The interface portal 118 provides for the display of network content, such as chat messages of a chat session or any other type of network data, to an I/O device 111 (e.g., a touch screen display) of the client device 110 by sending and receiving data across the network 195. The network data may be received in response to a transmitted chat message that includes one or more actions objects 115.

To facilitate integrating actionable objects into a chat session, the instructions 116 of the client device 110 may include actionable object integration module 119. The actionable object integration module 119 may generate and transmit user perceivable actionable objects in a chat session that can be executed by the client devices of system 100. The functionality of the module 119 can exist in a fewer or greater number of modules than what is shown, with such modules residing at one or more computing devices, which may be geographically dispersed. The systems may be operable in conjunction with components of the client device 110 from which it may receive chat message related data and other relevant information regarding the device 110.

Figure 2:
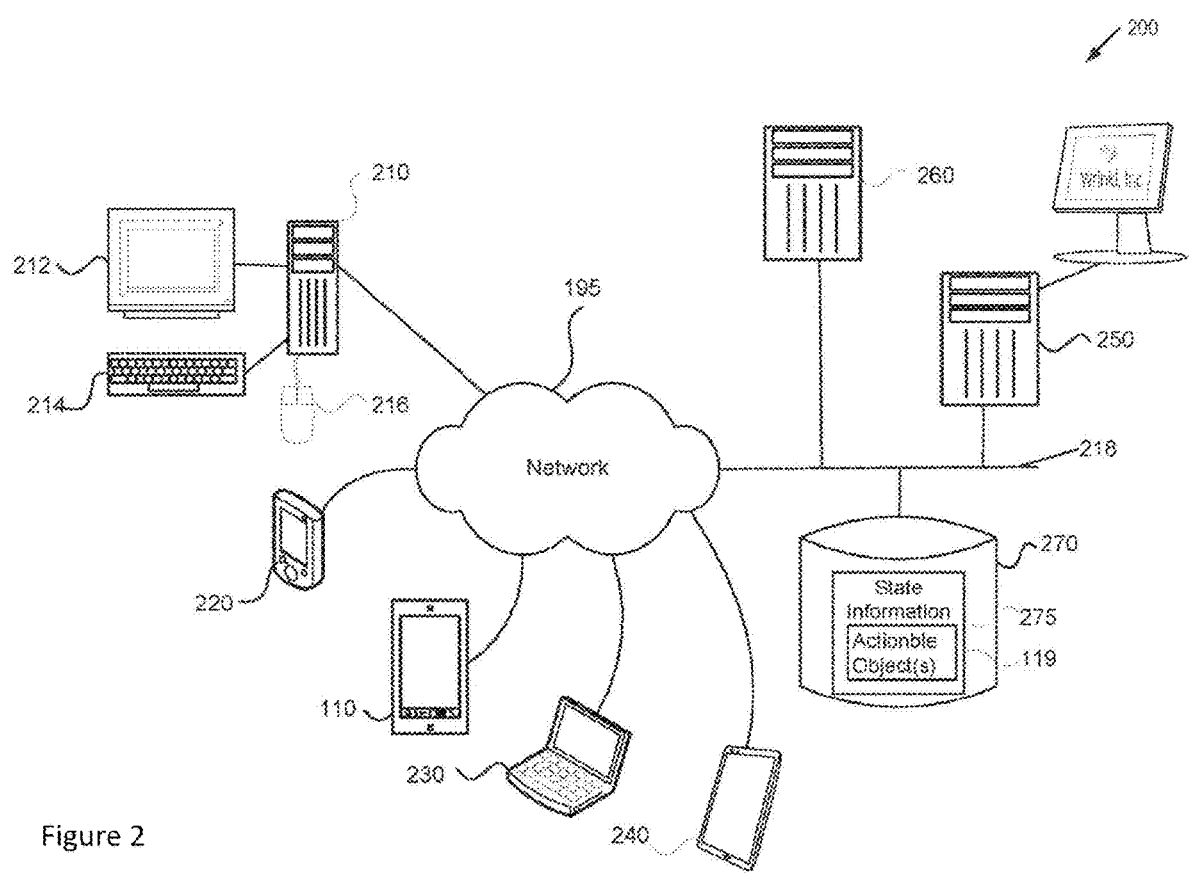
FIG. 2 is a pictorial diagram of a system including a plurality of client devices in accordance with aspects of the disclosure.

FIG. 2 is a pictorial diagram of a system 200 including a plurality of computing devices in accordance with aspects of the disclosure. In some implementations of system 200 two or more computing devices (e.g., participant/client devices) may engage in an electronic communication session (e.g., chat session) with each other. In some implementations, a first participant/client device may engage in a chat session with a second participant/client device via a network 195. As shown, FIG. 2 illustrates network 195 having a plurality of computing devices, such as client device 110, and other types of computing devices, a base station 210, a personal data assistant (PDA) 220, a laptop/netbook 230 and a tablet 240 as well as computing server devices 250 and 260 (e.g., computing devices that can be located at a number of different receiving stations). The various devices may be interconnected via a network or direct connection 218 and/or may be coupled via a communications network 195 (e.g., a LAN, WAN, the Internet, etc. that may be wired or wireless). In some implementations, the computing devices may communicate with each other before accessing the communication network 195.

Each device may include, for example, user input devices such as a keyboard 214 and mouse 216 and/or various other types of input devices such as pen-inputs, joysticks, buttons, touch screens, etc., as well as a display, which could include, for instance, a CRT, LCD, plasma screen monitor, TV, projector, touch screen, etc. Each device may be a personal computer, application server, etc. By way of example only, computing device 110 may be a mobile phone while computing device 260 may be a server. Databases, such as database 270, may be accessible to one or more of the computing devices or other devices of system 200. The database 270 may comprise data, such as state information 275, associated a chat session implemented on the client devices as well as store chat messages transmitted via system 200.

In one implementation, a resource associated with the system 200 may be used to maintain a consistency of the state information 275 and in such cases when there is a system failure. This is so that the chat session can continue uninterrupted without losing chat participant details. For example, a state manager (not shown) may maintain and transfer the state information 275 to state backup storage (not shown) for later retrieval. State backup storage may be accessible by any of the computing devices of system 200 via network connection 218 so that the chat session between the participants may be rerouted while the state information 275 is maintained, if a computing device of system 200 fails.

In some implementations, the state information 275 may correspond to a chat session between participants associated with the client devices of system 200. In some implementations, the state information 275 may be stored in database 270 by the state manager running on the server device 260 and/or the client devices or some combination thereof. In one implementation, the state information 275 may include, for example, information regarding the identity of participants of the chat session, the number of chat participants, actionable objects 119 that are applied to the chat session, a unique identifier associated with each of the action objects 119 and/or the chat message or session, and an order in which chat messages are received as well as other relevant information. When an actionable object 119 is applied in a particular chat session, the state information 275 for that session may be updated in accordance with the user perceivable action associated with the actionable object 119. This updating of the state information 275 in accordance with the actionable object 119 applied therein is further discussed below with respect to various interactive interfaces of the disclosure.

Sidebar Selection

In some implementations, the system provides asymmetrical chat through chat channels that are generally visible to all or directed participants in an intended group. Each of these channels may be referred to as a sidebar. An advantage of this is that users can reply 1 to 1 to someone in a group chat rather than the typical limited and distracting Reply-To-All messaging technology. For example, a user can reply directly to someone in a group chat that can be kept private from other group members without having to engage the entire group, while retaining context and relativity to the broader conversation for the participants of the 1 to 1 conversation.

Figure 3A:
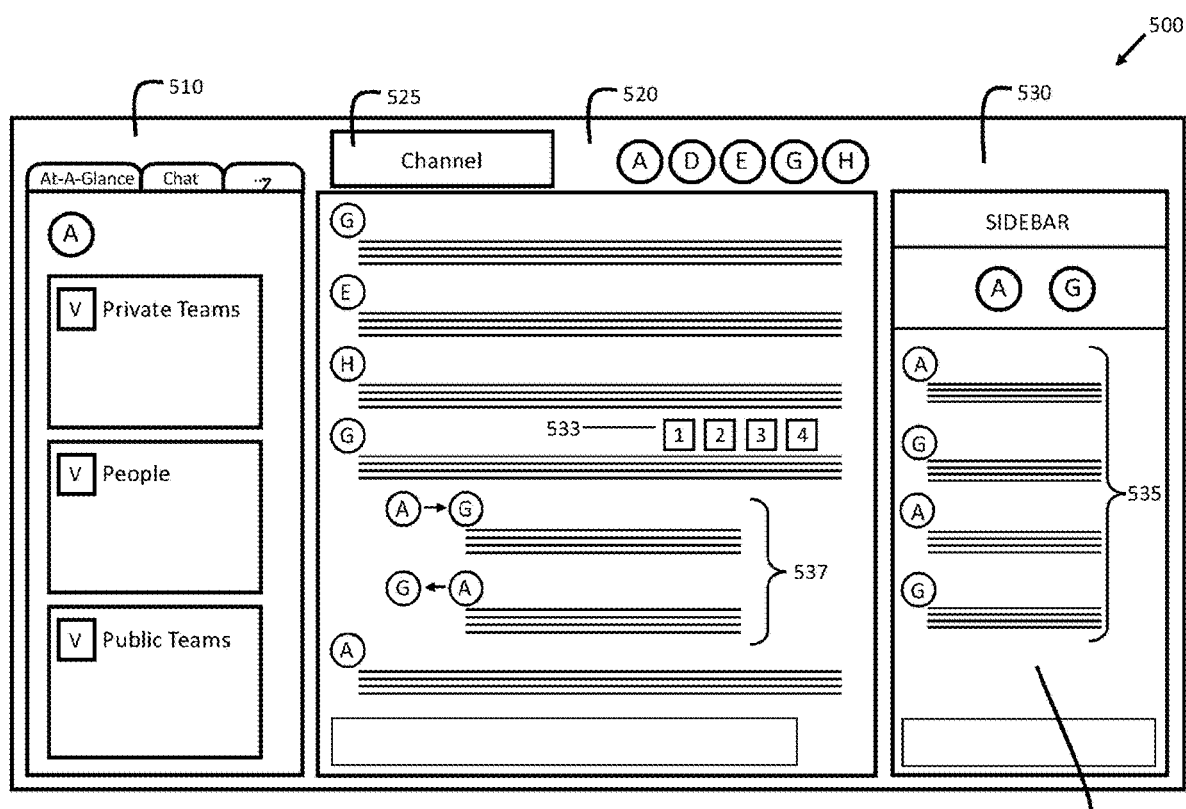
FIG. 3A is an example illustrating another interactive interface portal in accordance with aspects of the disclosure.

Turning to FIG. 3A, another view of the interactive interface portal 500 is shown. In this example, interactive interface portal 500 includes the capability of opening a sidebar selection 531 that allows two or more members, such as member A and G of a larger group session channel 525 to communicate privately in a private chat session 535. In some implementations, the private chat session 535 is hidden from display to the other participants of the larger group session. In one implementation, the interface portal 500 may include controls 533 to integrate some or all of the private chat session 537 into the larger group session channel 525 for display to other participants. In some implementations, the private chat session 535 in response to a request from the first participant or the second participant may permit a third participant to join the second chat session that is either currently in or not in the larger group session channel 525.

In some implementations, a first chat participant, such as participant A, clicks on and/or hovers over the display name for a second chat participant, such as participant G, in the main window 520, a sidebar session 531 opens. In some implementations, the first chat participant may also initiate the sidebar session 531 by activating a control 533 associated with a message from the second chat participant. The sidebar session 531 allows the first chat participant to interact directly with the second chat participant outside of larger group session channel 525 that includes the other participants. The sidebar session 531 includes functions available to users of interface portal 500. For example, sidebar session 531 allows the first and second chat participants to integrate actionable objects, such as actionable objects 119, into the private chat session 535 to enhance the electronic communications between the participants.

Figure 3B:
FIG. 3B illustrates an exemplary text entry bar that allows for sidebar selection.

FIG. 3B is an exemplary screen shot that illustrates one exemplary approach that allows users to initiate a Sidebar. In this example, a Sidebar may be a 1:1 private conversation between two (for example) members (or more) of a larger group conversation from within a group channel. Messages in the Sidebar are only visible to the parties to the Sidebar. This is further described below with reference to FIGS. 4A-4I.

Figure 4A:
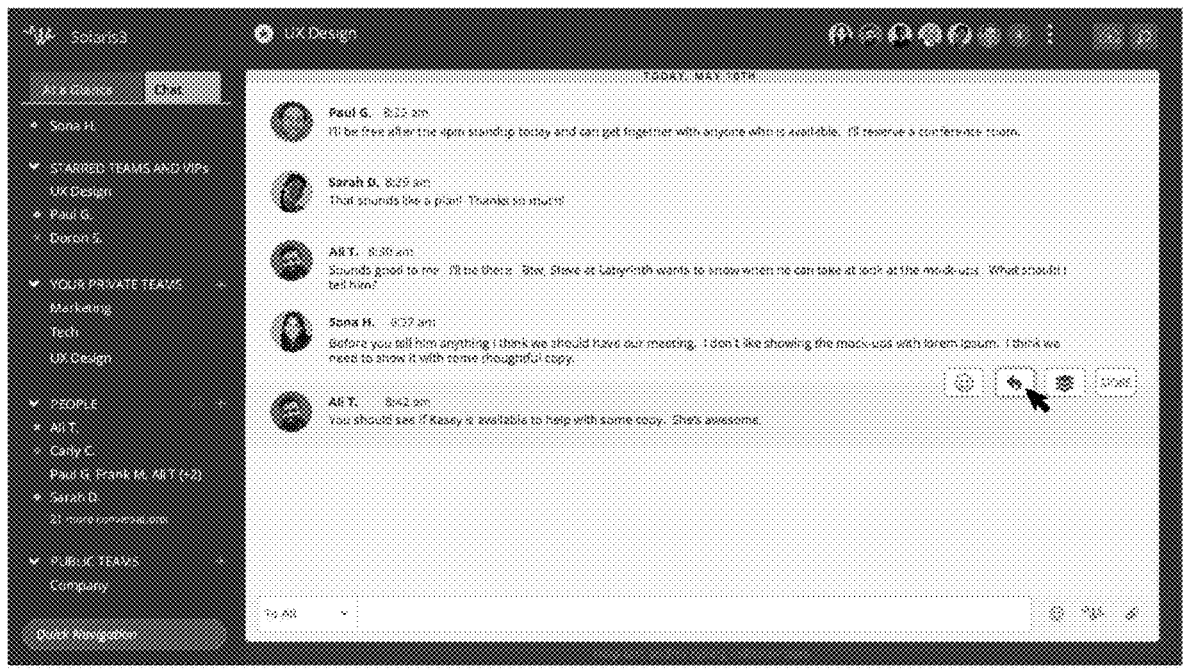
FIGS. 4A-4I are screenshots that illustrate exemplary operation of a sidebar.
Figure 4B:
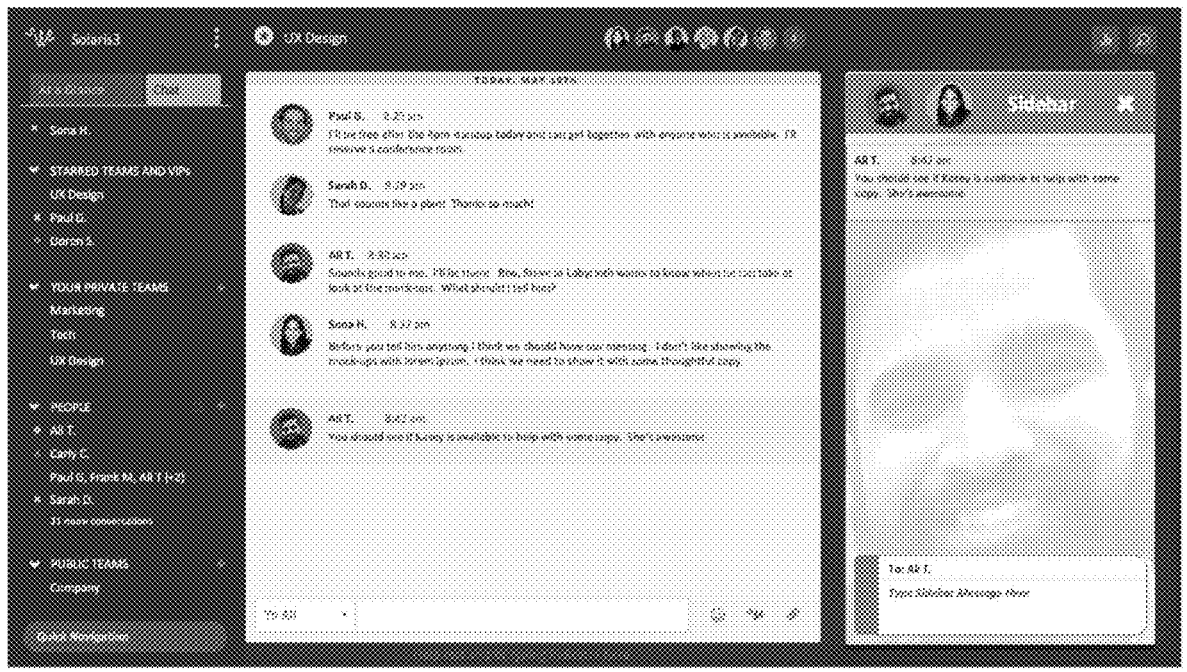
Figure 4C:
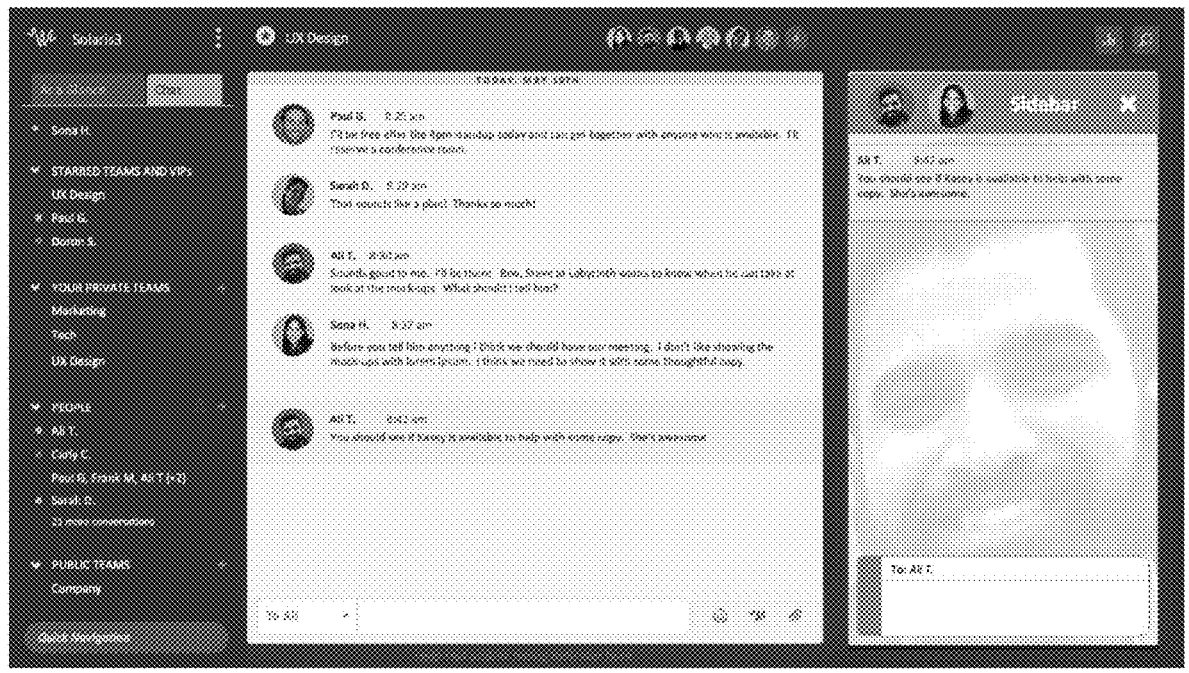
Figure 4D:
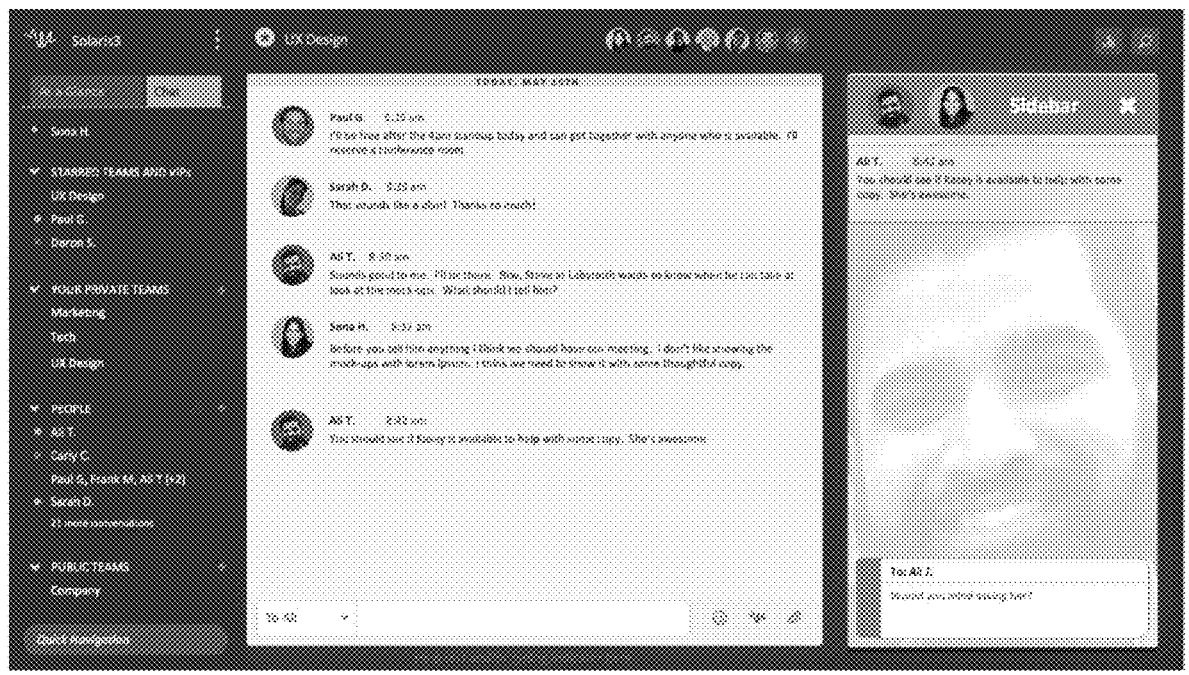
Figure 4E:
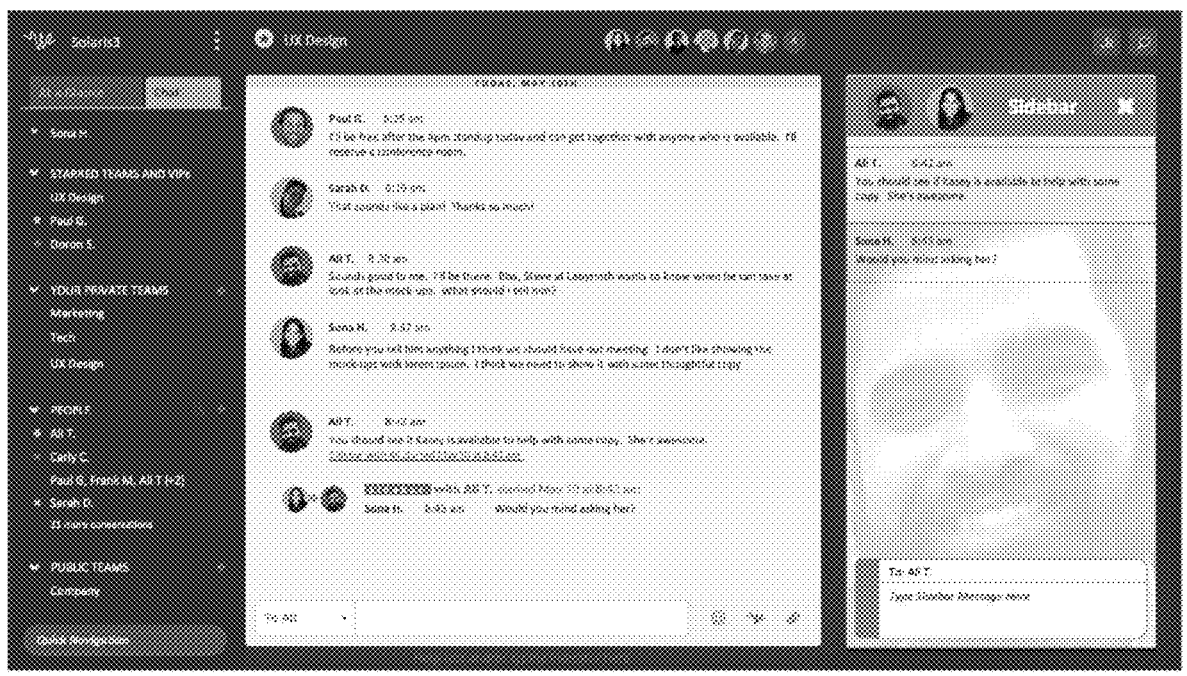
Figure 4F:
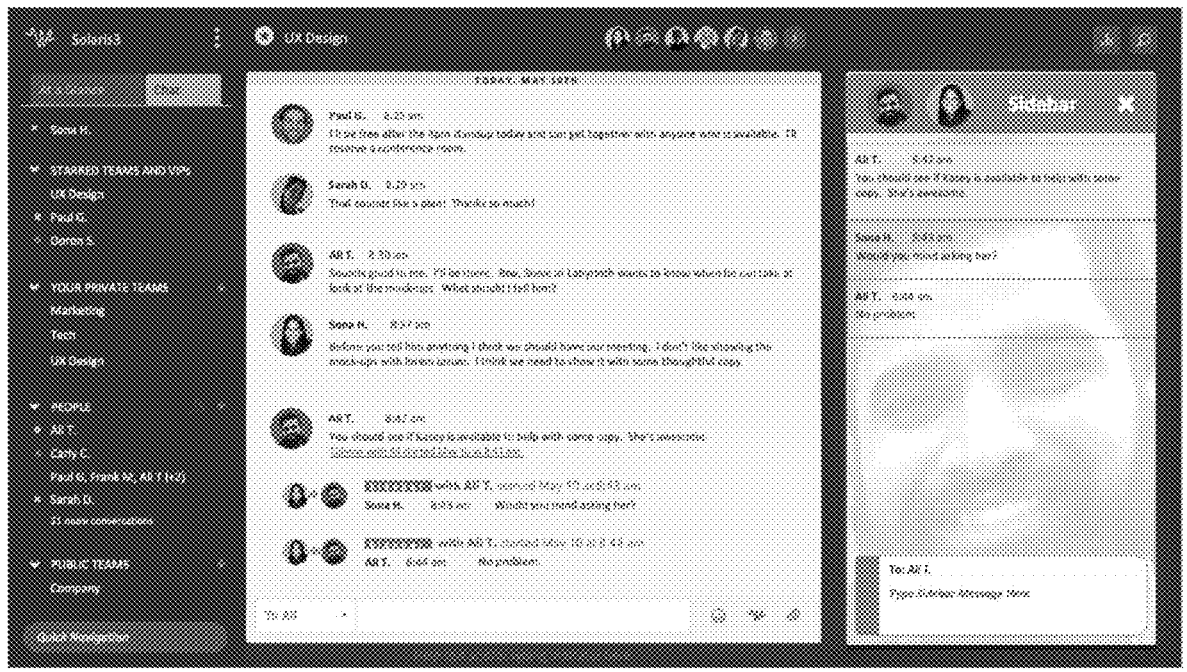
Figure 4G:
Figure 4H:
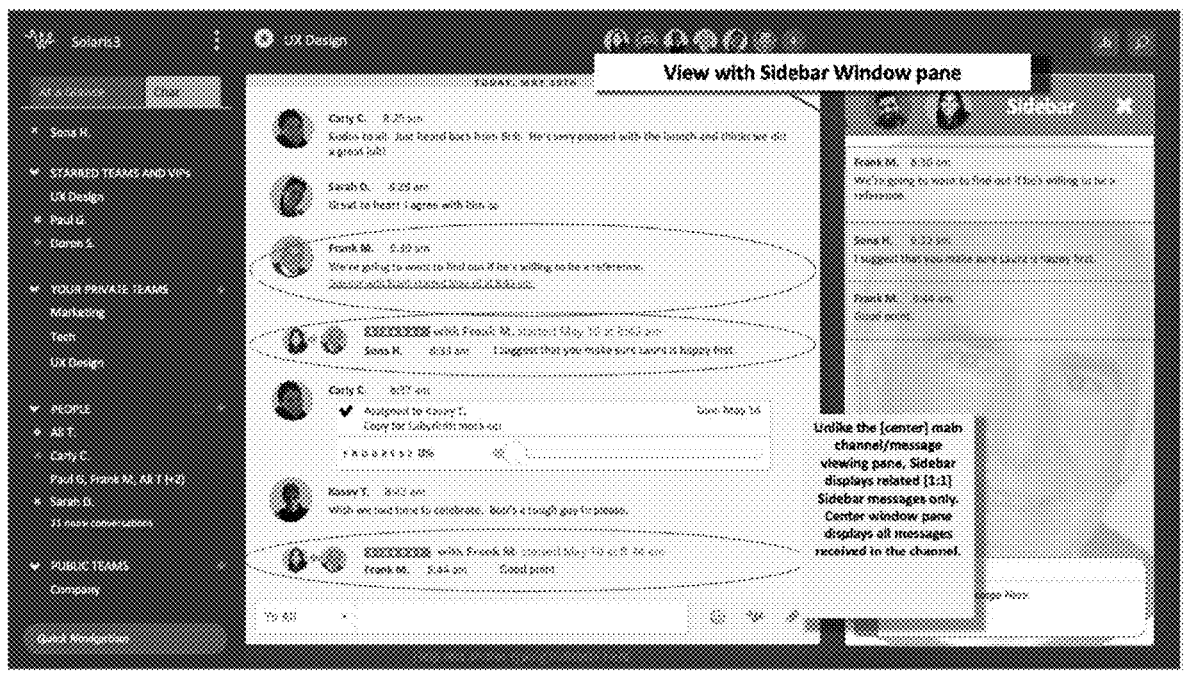
Figure 4I:
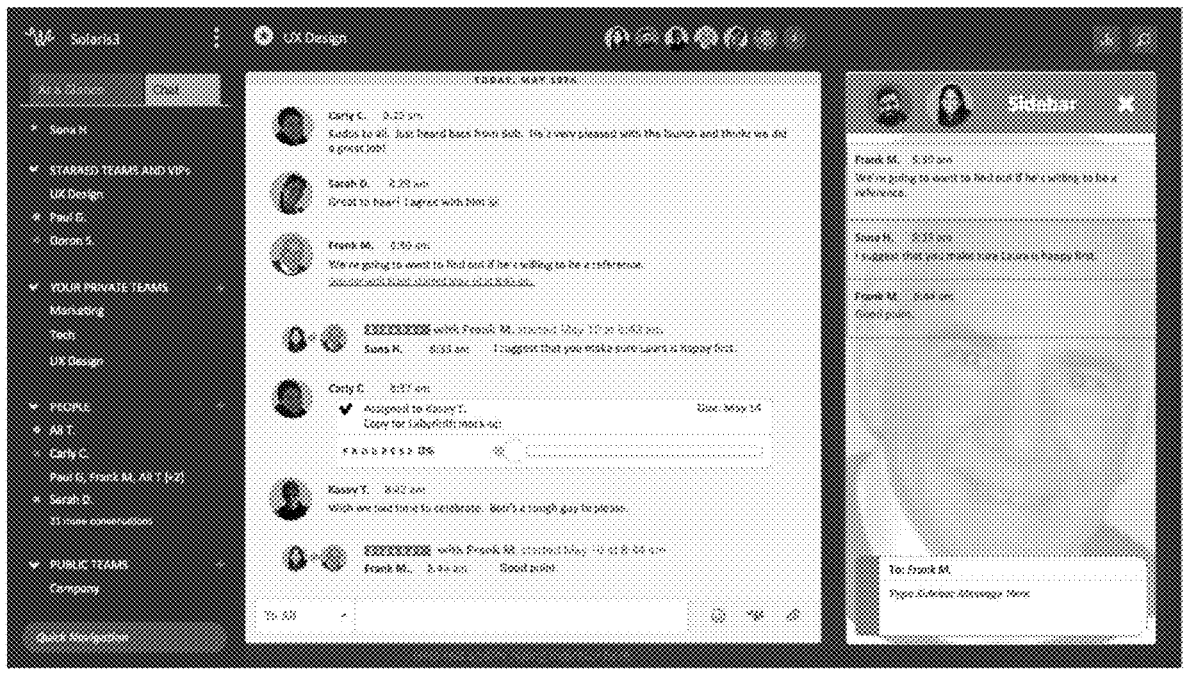

FIGS. 4A-4F are a plurality of screenshots that illustrate operation of an exemplary embodiment of the present invention. FIGS. 4G-4I are a plurality of screenshots that illustrate operation of a further exemplary embodiment of the present invention. Referring first to FIGS. 4A-4F, in FIG. 4A, a plurality of messages that are exchanged between a plurality of participants are displayed. For ease of identification, the messages that are exchanged between the plurality of participants are displayed in a portion of the screen that will be referred to as the main conversation pane. As in standard messaging, all participants of the messaging exchange in the main conversation pane are able to see each other's messages (which includes each other's responses to messages). In FIG. 4A, one of the participants to the message exchange (in this case, Sona, but it could be another participant) desires to have a private conversation with Ali. In this example, Sona and Ali will have a private 1:1 conversation, but in some exemplary embodiments the private conversation may be 1:N, N greater than 1, and the private conversation may exclude at least one person who is participating in the messaging that is displayed on the main conversation pane. Sona thus clicks on the exemplary "arrow" icon. Sona's action results in the message that was sent by Ali at 8:42 AM being designated an "anchor message." As shown in FIG. 4B, in an exemplary embodiment of the present invention, the act of designating Ali's message as an anchor message results in Ali's message being displayed in a separate pane (but this step is optional). For ease of identification, the separate pane displaying Ali's message will be referred to as a sidebar. As shown in FIG. 10B, a text message box appears with the words "type sidebar message here." In FIG. 4C, Sona begins to type a message that will be seen by Ali but will not be seen by the other participants to the messaging. In FIG. 4D, Sona types the message "would you mind asking her?" Upon pressing the enter key (or taking some other step that transmits the characters just typed in) and as shown in FIG. 4E, Sona's response appears in the sidebar and is transmitted to Ali. Again, except for Ali and Sona, none of the other participants to the messaging in the main conversation pane see Sona's response. In FIG. 4F, Ali has typed his response to Sona, and Ali's response appears in the sidebar. Again, except for Ali and Sona, Ali's response is not seen by the other participants to the messaging in the main conversation pane. FIG. 4F illustrates that the conversation that appears in the sidebar can also (optionally) be displayed in the main conversation pane. For purposes of improving visual appearance, the messages that were entered in the sidebar and duplicated in the main conversation pane can be collapsed in the main conversation pane. Referring next to FIGS. 4G-4I, FIG. 4G illustrates the main conversation pane with collapsed sidebar messages. Clicking/selecting one of the links corresponding to a collapsed sidebar message will open the sidebar and allow the conversation to continue in the sidebar (again limited to the participants in the conversation in the sidebar and excluding all other participants in the conversation in the main conversation pane). As shown in FIG. 4H, once a link to a particular message in the main conversation pane has been selected, the conversation associated with that link can continue in the sidebar. As shown in FIG. 4I, Ali is part of the conversation in the sidebar between Sona and Frank (while other participants of the conversation in the main conversation pane are excluded).

As shown, any participant to the conversation in the main conversation pane can respond to a message that has been designated as one version of an anchor message, and the response can appear in the main conversation pane. In this version of an anchor message the response to the anchor message that is entered into the main conversation pane ("a response) is visible to all other participants in the main conversation pane. Throughout this Detailed Description, an anchor message may also be referred to as an anchor element. Furthermore, a response to a message in the sidebar ("a further response") is seen by the participants participating in the sidebar conversation, but participants to the conversation in the main conversation pane that are not included in the sidebar conversation are excluded from seeing the message.

As shown in the figures, this version of an anchor message and the response received to the anchor message in the main conversation pane may be simultaneously displayed. Furthermore, a response to the anchor message in the main conversation pane and a response to the message in the sidebar may be simultaneously displayed. As shown, the messages that appear in the main message pane are displayed one below the other. Furthermore, the messages displayed in the sidebar may be displayed one below the other. This embodiment is merely exemplary, as there does not necessarily need to be a sidebar "pane." In other words, in some embodiments, the sidebar may co-exist within the main stream (and is possibly collapsed or hidden or expanded/made visible).

Aspects of the invention (as described above through the description of exemplary embodiments) may be provided with additional features in order to further improve computer functionality. In particular, additional features may control the sequence with which various users are included, excluded, and later included in messaging that is related to sidebar activity. In this manner, a number of technical advantages are obtained, including a reduction in interaction with a computer system, and the ability for multiple users to communicate with each other and with improved efficiency over the prior art. Simply put, the prior art does not permit multiple users to communicate with each other in the manner contemplated by the following exemplary embodiment of the present invention. Thus, the inventors improve the efficiency of digital communication via the concepts described below.

Before proceeding, several definitions may be helpful to understand exemplary embodiments that correspond to aspects of the present invention.

Bots are apps that can be designed to interact with users of a messaging application; many respond to requests from users, while some operate in the background and chime in to the conversation as needed. When deployed to a messaging environment, bots can perform a multitude of useful tasks, such as gathering feedback from members, posting reminders, facilitating interaction with external applications, or tracking work progress. Others perform less crucial tasks like telling jokes or helping a group decide what to have for lunch.

Bots are pieces of computer code that are associated with an app. In some cases they focus processing power on performing queries and sending messages and/or notifications when triggered. They're often small programs, sometimes without selection buttons or icons. Some Bots are represented by an Avatar while others are not. Instead of tapping a search button, for example, a User, in some cases may instead type a command such as "/giphy happy" to instruct a Bot to locate and post what the User is looking for (a gif from Giphy, reflecting something "happy" in this example). In some cases a structured command line is necessary while in other cases one is not. In some cases the Bot can be programmed to "listen" and may make "decisions" based on its coding to determine what and when to post a message. A Bot's posts are often responsive to a particular query or set of conditions but they do not necessarily have to be, and could even be humorous, nonsensical and/or random. A Bot's actions do not need to be presented as text or even visible in the channel/s, for example, in some cases a Bot's "post" could be presented haptically or audibly. In other cases no discernable "post" is notable within the messaging system at the time a Bot causes a responsive event to occur. For example, the Bot may simply tag, note or update a file outside of the messaging system. In some cases the Bot will kickoff a work flow in another app. In some cases the Bot will post an alert or message in a channel message stream while at other times the Bot will post a message outside of the message stream, for example, in some cases a Bot may cause a notification or message to appear in a box "hovering" (superimposed over) a display of other information such as a stream of channel messages.

Bots don't necessarily join channels in the same way that human Users do. Bots are often proactively added to (or "given access to") a channel or channels by a User although in some cases computer code may be introduced to a messaging system that would allow for a Bot to "join" channels "on its own" by following a set of known, prescribed or learned rules. For example, the messaging application may be programmed in such a way that a Bot will automatically "join" (or request, in some fashion, that it be allowed to join) any channel with a defined User or group of Users. Or, for example, a Bot may be designed to join a channel automatically when a certain instance or pattern of communication is detected. Examples include an instance or pattern based on keywords, metadata or other criteria.

A Base Channel is the underlying active or current channel to which a plurality of Users (including in some cases just one user) have access. Sidebars are usually associated with a particular Base Channel and may exclude one or more Base Channel members (Users).

A Sidebar is a separate (physical or logical) aggregation or association of messages exchanged between a plurality of users which Sidebar and/or the messages therein, is/are visible only to specified participants, which participants are a subset of the participants/members/users of an associated Base Channel. In some embodiments, there can be none, one, or more than one Sidebars associated with a Base Chanel. In some embodiments, there can be none, one, or more than one message in a Sidebar.

A Nested Sidebar is a Sidebar within a Sidebar. For example, a Birthday Card Sidebar that includes one or more further Sidebars among participants.

Anchor Message. (Or "Anchor Element") An Anchor Message is a designated message (or other element) that forms the foundation of a Sidebar. An Anchor Message can be tangible or abstract such as an existing message, a newly created message, an emoji, document, file, gif, notification, pixel, sticker, theme, table, template, link, attachment, card, or event. An Anchor Message (or "anchor message") can be derived from an internal or external source and/or inside or outside of the Base Channel. Once designated, an Anchor message may be perpetuated literally, or otherwise transformed, as a particular use case dictates. Put another way, An Anchor Message is a selected, created and/or designated message or other element that, as a result of said selection, creation and/or designation, triggers or causes a Sidebar to be formed. An anchor message (or its proxy) is usually, but not necessarily, included in the Sidebar channel and may or may not be visible. When included in a Sidebar, an anchor message can be represented literally, such as in the case where a selected message is quoted or represented in the Sidebar verbatim, or derived such as the case where text, an icon or other element is selected, created or designated but is transformed in some fashion into another image or element, in whole or in part, as a result of said selection. For example, in one embodiment text such as "happy birthday" can be selected which selection initiates an interaction with a remote website, which website returns a gif that it associates with "happy" which gif is combined with an audio recording and additional text to form an Anchor Message.

A Further Anchor Message is a Sidebar message that spawns (or initiates) a further Sidebar. A Sidebar within a Sidebar may be referred to as a nested sidebar.

Sidebar Creator. The entity responsible for designating an Anchor Message. The entity may be a human being and/or a bot/application.

A Sidebar Inclusion Notification Message ("SINM") is a message sent to a Sidebar participant notifying that entity that it is being given access to a sidebar. A Sidebar Inclusion Notification message can be linked to the contents of the Sidebar. It can contain meta, descriptive and/or other data such as identification, status or content, related to the Sidebar itself It can be a comprised of one or more posts and can include text, audio, movies, links, emoji, images, gifs, etc. a Sidebar Inclusion Notification Message may be posted inside or outside of a message channel. Put another way, A Sidebar Inclusion Notification Message is an optional notification message sent (posted) to a base channel for example, pinned to [the top] of a channel, inserted into a crawl which crawl may or may not be exclusively associated with a base channel, etc.). in some embodiments to participants of group waves newly added to a Sidebar. SINM are usually derived messages assembled in accordance with a defined structure, which structure can include attributes such as fixed text, variable text, links to internal or external sources of information, font, font size, font color, spacing, shape, images, sound, elements to control or access further actions such as "click here" to display Sidebar, etc.

A Subsequent Sidebar Inclusion Notification Message is a further or expanded or subsequent message and/or prompt (may be combined) that in some cases may be caused to be displayed as a result of a selection associated with an associated Sidebar Inclusion Notification Message. Another example may be a restaurant menu SINM that when selected causes a further message to appear that allows a user to select their lunch items and enter their credit card number.

Sidebar Rules are rules that are associated and applied to a Sidebar such as, for example, when to post, where to post and what to post. Sidebar Rules can also be used to determine the circumstances under which a Sidebar or Sidebar notification is visible and who it is visible to. Sidebar rules can also be applied in determining what action/s to follow under various conditions and circumstances.

A Group Wave is a set of one or more Group Wave Rules (defined below). There may be multiple Group Waves, expressed or inferred, for example, numerically (1, 2, etc.), in ordinal fashion (first, second, etc.) or via some other means.

The Terminal Group Wave is the final or last Group Wave to be given access to a Sidebar. For example, in some embodiments of a Birthday Card implementation, the Terminal Group Wave group participants consist of the Card's intended recipient or recipients.

Group Wave Rules are rules that are associated with and applied to a sidebar. One example of a Group Wave Rule defines the participants (entities) that are given access to a sidebar. When triggered, participant(s) defined by a Group Wave Rule is/are given access to a Sidebar. A Group Wave Rule may also include instructions relating to actions to occur when a participant(s) defined by a Group Wave Rule is given access to a Sidebar. A Group Wave Rule may also include instructions relating to actions to occur before or after participant(s) defined by a Group Wave have been given access to a sidebar and certain conditions satisfied. These are merely examples. Group Wave Rules can help determine certain permissions available to its participants such as the ability to post to a sidebar, the format and position of a post, the visibility of posts, whether or not Nested Sidebars can be initiated by Group Wave participants, etc. Group Wave Rules can help specify certain attributes of Sidebars such as message visibility, format, timing, etc.

Sidebar Rules are generally applied to entire Sidebars, while Group Wave Rules are generally more specific and applied to particular participants to a Sidebar. Group Wave Rules trump in case of conflict with Sidebar Rules. Sometimes a Group Wave rule will merely qualify or refine a Sidebar Rule. For example a Sidebar rule may be "Allow responses in Sidebars=YES" but a Group Wave Rule may be "Group Wave (2): Allow responses in Sidebars Participants=NO"

In certain cases, a Group Wave Rule may define "nul" participants but may trigger events associated with the Group Wave Rules associated with and/or applied to a particular sidebar. In other words, it is possible that applying Group Wave (3) to a Sidebar, for example, by itself gives no participants access to the Sidebar, per se, but triggers certain rules associated with a particular sidebar such as, perhaps, "When applied . . . send a fax or an email to a third party which fax may include a transcript of the Sidebar or "When applied . . . send an email which email may include a link to a [encrypted/secure] web URL where the Sidebar can be monitored and/or participated in by a third party"—handling this functionality via Group Wave Rules definitions is just one approach. Alternatively, there could be Sidebar Rules or other approaches applied.

An Initial Group Wave is the first Group Wave to be applied to the Sidebar and often includes the Sidebar Creator. An Initial Group Wave may be optional, or may be automatically generated based on contents of a subsequent Group wave.

Different Group Waves, for example, can be applied to a Sidebar simultaneously or can be applied to a Sidebar based on a triggering event or condition.

A Cover Comment is a message that is sometimes sent with and associated with an Inclusion Notification Message, a Sidebar Posting. Cover Comments can be generic, system generated, or user created.

Figure 5:
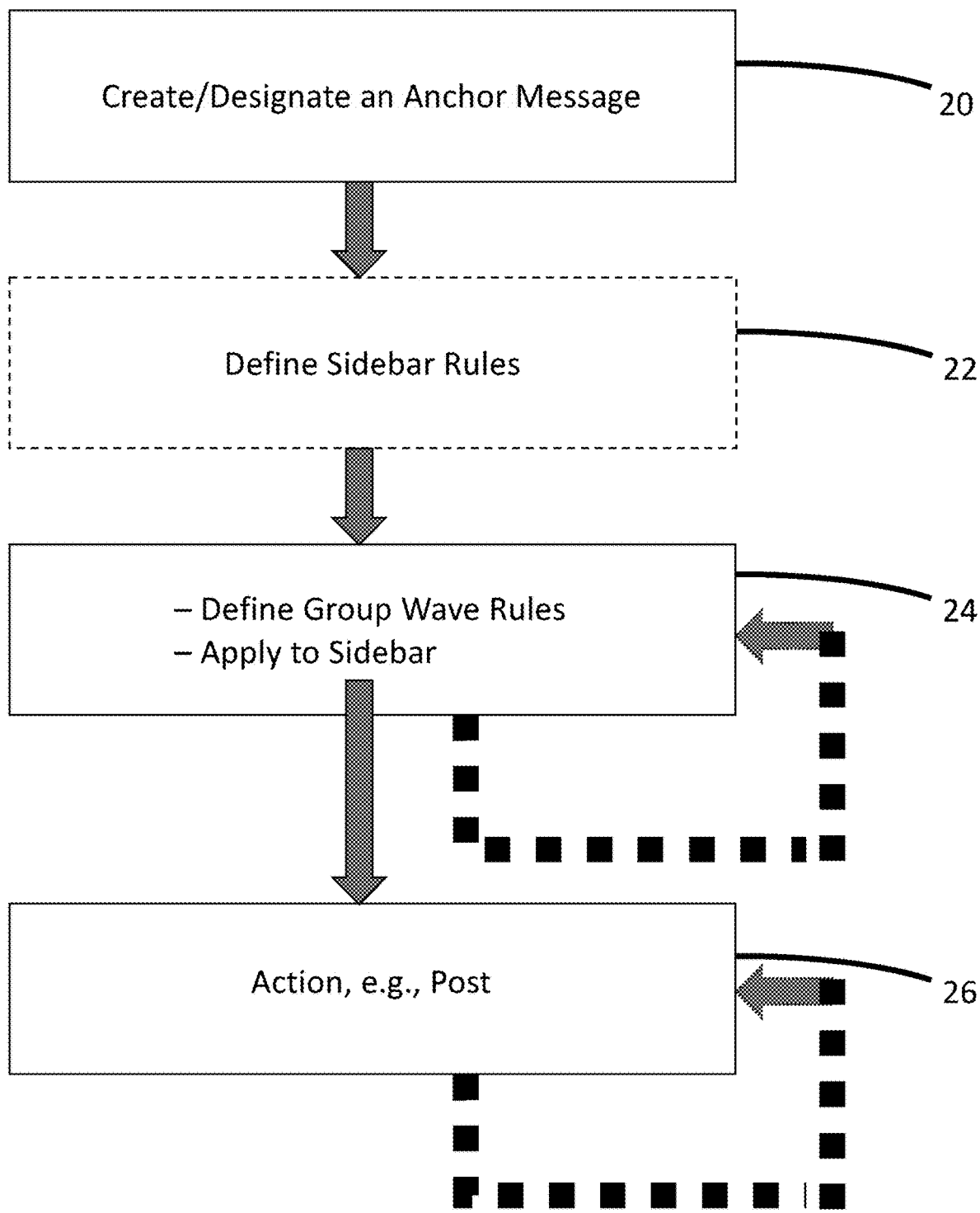
FIG. 5 is a flowchart diagram that illustrates an exemplary embodiment of the present invention.

FIG. 5 is a flowchart diagram that illustrates an exemplary embodiment of the present invention, and is provided herein for illustrative purposes only.

At step 20, an anchor message is created (or designated or selected). An anchor message can be derived from an internal or external source and/or from inside or outside of the Base Channel. The anchor message may be, for example, a message, a link, a form, an image, a sticker, an emoji, a video or a document (or some other type of foundational element and/or other form of data) and the creation (or designation or selection) of the anchor message forms the foundation of the sidebar. In another embodiment, the anchor message may merely be an identification of a sidebar.

As previously explained, some type of data, e.g. a message, an image, a video, a document, is designated (and/or created) and serves as the anchor message of the sidebar. This data may also be called a foundational element. Furthermore:

- Typically only one element (message, etc.) is designated as the foundational element, but more than one element may also be designated. An example of a Sidebar is a channel, sub-channel, super-channel, associated channel, a container, a thread such as a private thread, etc.
- A foundational element can be selected from among existing items, newly created, or a combination thereof.
- A foundational element can originally exist inside (e.g., a message) or outside the channel (for example, selected from a menu or a banner ad)
- A foundational element can originally exist within the messaging system (e.g., a message) or external to the messaging system (e.g., content appearing on an external web site)

At optional step 22, sidebar specific rules are defined (or can be calculated, inferred, looked up if predefined) and applied. These rules, called Sidebar Rules, can be applied to or associated with a Sidebar before, during, or after a sidebar is created. Furthermore, predefined sidebar rules or predefined sidebar parameters can be associated with certain known use cases (i.e. a use case relating to greeting cards may have different predefined sidebar rules than a use case relating to documents).

Many Sidebar Rules will be use-case specific and "baked-in". For example in the use case of some Birthday card embodiments, certain rules can be pre-defined such as:

- Minimum, maximum and/or default number of Group Waves.
- Limit Group Wave participants to Base Channel or allow members to be selected from other channels.
- Sidebar Creator is automatically included in Group Wave (1).
- Automatically calculate Group Wave(1) sidebar participants to include all Base Channel members not manually selected to be in Group Wave(2) (i.e., by choosing the intended card recipient/s (Group Wave2), the remaining channel members are automatically deemed to be in the "From" Group (Group Wave1).
- When (and/or what triggers) a Group Wave to be given access to the Sidebar.
- Allow Sidebar participants to be associated with more than one Group Wave and/or more than one Group Wave Rules.
- Allow Sidebar participants to post a message to the Sidebar?
- Allow Nested Sidebars.
- Send a notification message to participants as they are given access to the Sidebar?

Pin the Sidebar Inclusion Notification Message to the top of the message stream in the Base Channel?
Allow creator to craft a note to successive Group Wave participants which note can be added or associated with the Inclusion Notification message.

At step 24, Group Wave Rules are defined (or can be calculated, inferred or looked up, if previously defined) and applied. Exemplary rules are: a) selecting participants that will be given access to a sidebar and; b) determining when those participants will be given access to a sidebar.

Examples of Group Wave Rules:
Define participants to a sidebar;
Triggering condition for participants to be given access to the sidebar;
Allow participants to post a message to the Sidebar: y/n;
Take an action before, during or after being given access to the sidebar (examples: email a link to a side bar when a condition is met; fax a pdf to the sidebar when a condition is met;
Allow sidebar Creator to craft a note to a group wave participants which note can be added or associated with the inclusion notification message
Post a sidebar message to the base channel (y/n)
If "y" then make the sidebar message visible to [select]
allow users to save the sidebar: y/n
send sidebar inclusion notification messages: y/n
if "y" define format and contents
if "y" allow sidebar creator to craft a note to the participants to a sidebar which note can be added or associated with the inclusion
Notification message: y/n
Pin the Sidebar Inclusion Notification Message to the top of the message stream in the Base Channel: y/n;
Post the Sidebar Inclusion Notification Message to another channel: y/n
if "y" specify channel;
Post the Sidebar Inclusion Notification Message as banner or to crawl: y/n;
Allow nested sidebars: y/n Group Wave specific rules are defined (or can be calculated, inferred or looked up, if predefined) and applied. Exemplary rules include: a) selecting participants that will be given access to a sidebar; and b) determining when participants will be given access to a Sidebar.

Messaging Wave members are usually selected from the Base Channel but they can be from any channel or even an external source. Members can be Bots/Apps.
There can be one or more Group Waves associated with a Sidebar
A Group Wave can apply to none, one or more than one participants to a sidebars
Participants can be associated with more than one Group Wave (though typically just one)
In some embodiments, a Group Wave rule causes an action such as the emailing of a link to a third party, or the Sidebar being saved to a file in pdf format and faxed. In a use case such as "Lunch Time" a bot could be triggered at a scheduled time to update a restaurant's website with lunch orders, payment and delivery instructions.
Group Wave rules may be use-case specific and "baked-in". For example in the use case of a Birthday card, certain rules can be pre-defined such as:
Minimum and maximum number of Group Waves Rules;
Limit participants to Base Channel or allow participants to be selected from other channels
Allow external parties to be to Base Co a group wave via SMS or email (in some embodiments, if given access, $3^{rd}$ parties may be permitted to access the Sidebar via a web link and password)
Whether the Sidebar Creator is automatically included in Group Wave (1)
Automatically calculate Group Wave(1) participants associated with Group Wave (1) to include all Base Channel participants not manually selected to be associated with Group Wave(2)
The timing of when the participants associated with a Group Wave will be joined to the Sidebar
Make all Sidebar messages visible to all Sidebar participants or visible in accordance with permissions such as participants associated with Group Wave 1 can't see posts associated with Group Wave 1, but can see posts associated with Group Wave 2.
When this Group Wave is given access to the sidebar, send a Sidebar Inclusion Notification Message to the participants.
If sending a Sidebar Inclusion Notification Message to sidebar participants, should it be posted in the Base Channel? Pinned? Posted to a crawl? Inserted generally into the Base Message stream? What is the structure of the Sidebar Inclusion Message? What is the format? Should it be persistent or disappear after a time? Should a notification sound or vibration accompany posting?
Allowing communication that to at least some extent is anonymous.
Allowing communication that to at least some extent is ephemeral.
Post Sidebar messages to Sidebar and also post to Base Channel (define format and content in each case)

At least one exemplary embodiment described here is an improvement over the prior art in part:

by allowing a participant of a group messaging channel to create a private side-channel of communication among a selected subset of channel users which Sidebar may exclude one or more of the Base Channel's plurality of users.

by allowing additional successive groups of participants to be defined and added or given access to the Sidebar at different times and in accordance with other defined rules ("Group Wave Rules"). Giving Sidebar participants access to sidebars in waves allows specified Sidebar participants the chance to engage with the Sidebar before subsequent participants are given access to or know of the Sidebar's existence.

by allowing rules and attributes to be ascribed or defined and applied which rules can be associated with specific Sidebar or Sidebar use cases ("Sidebar Rules").

Step 24 may optionally be repeated multiple times for more than one Group Wave. Furthermore, there may be multiple differences between respectively different Group Waves.

At step 26, action is taken, Exemplary action may be a posting (i.e. posting a message to one or more channels). The posting may be to an actor (user, bot, etc.). The actor having access to a posting may be specified by one or more group wave rules. Multiple actions may be taken. Note that each of the above steps may be completed in an order different than shown.

Figure 6:
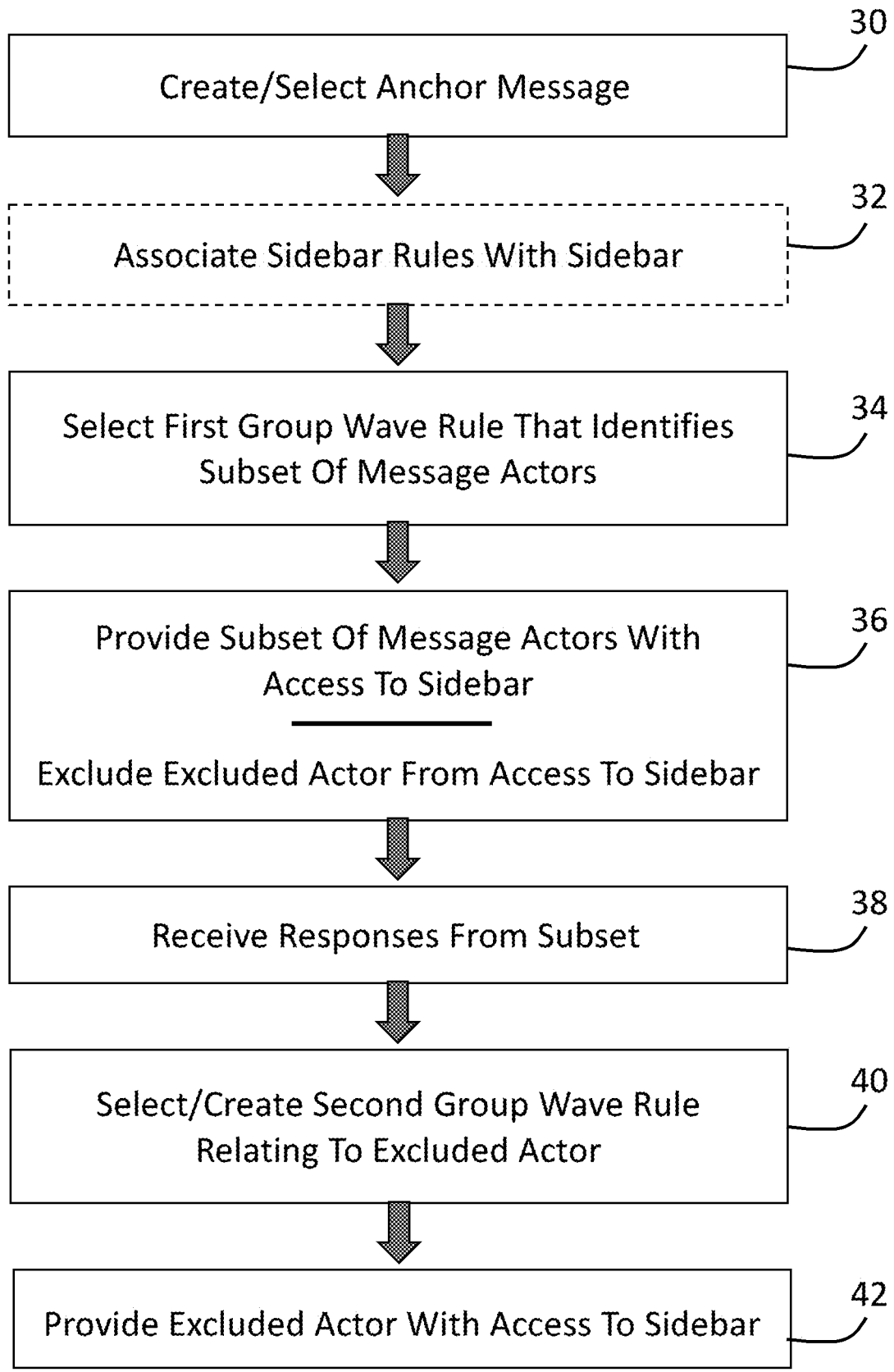
FIG. 6 is a further flowchart diagram that illustrates an exemplary embodiment of the present invention.

FIG. 6 is a flowchart that illustrates a further exemplary embodiment of the present invention.

At step 30, an anchor message is created or selected, thus initiating (which may include reinitiating) the sidebar. At optional step 32, sidebar rules are associated with a sidebar.

At step 34, a first group wave rule is selected (or created) that identifies a subset of message actors. In some embodiments, this step is performed automatically based on actors that are not identified in step 40. At step 36, a subset of message actors are provided with access to the sidebar. An excluded actor is excluded from access to the sidebar. At step 38, responses are received in the sidebar from the subset of message actors. At step 40, a second group wave rule may be selected or created, the second group wave rule relating to the excluded actor. At step 42, the excluded actor is provided with access to the sidebar. The above steps may be performed in a different order than what is described above.

Figure 7:
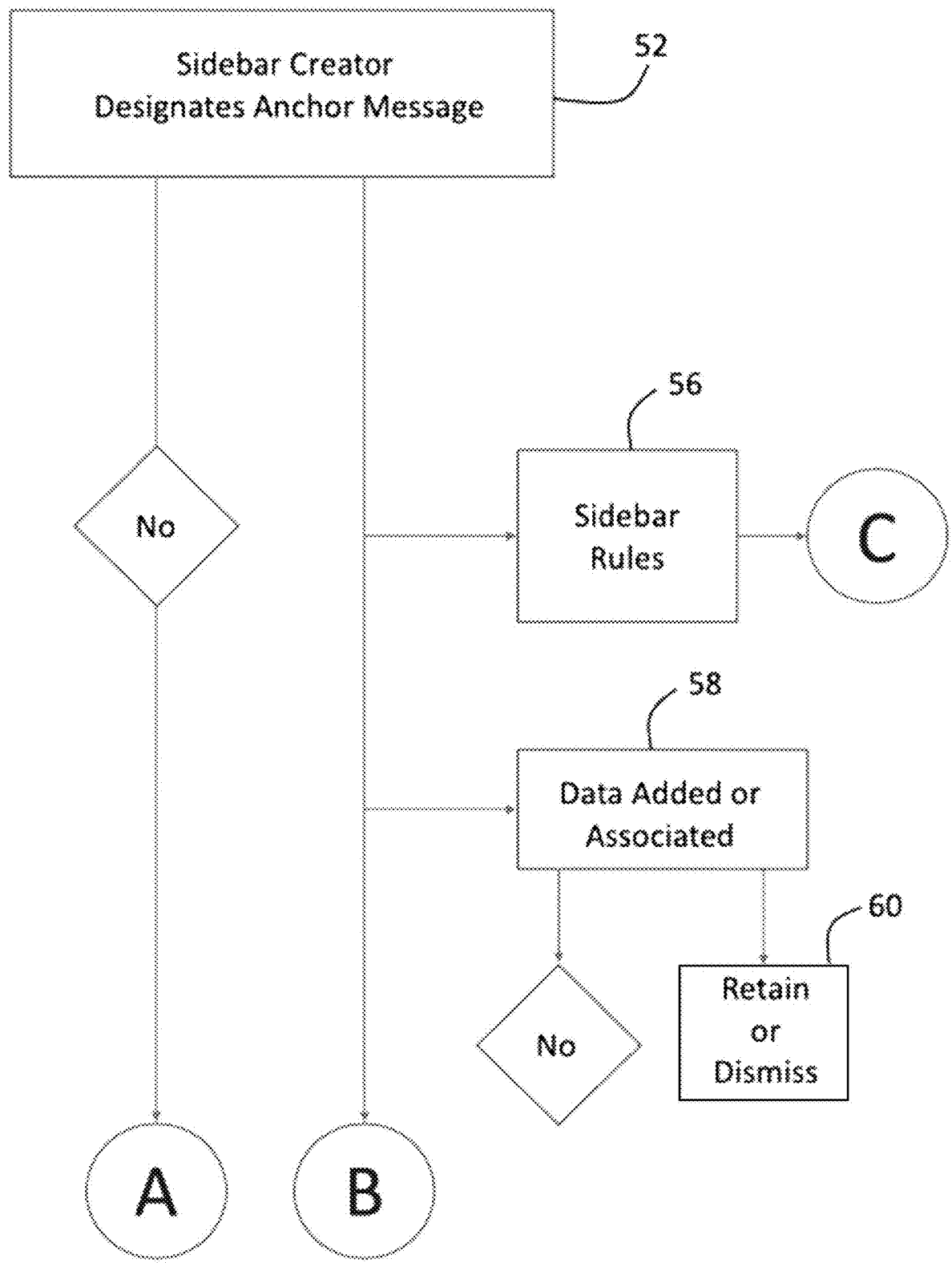
FIGS. 7, 8, 9, and 10a are further flow chart diagrams that illustrate further exemplary embodiments of the present invention.
Figure 8:
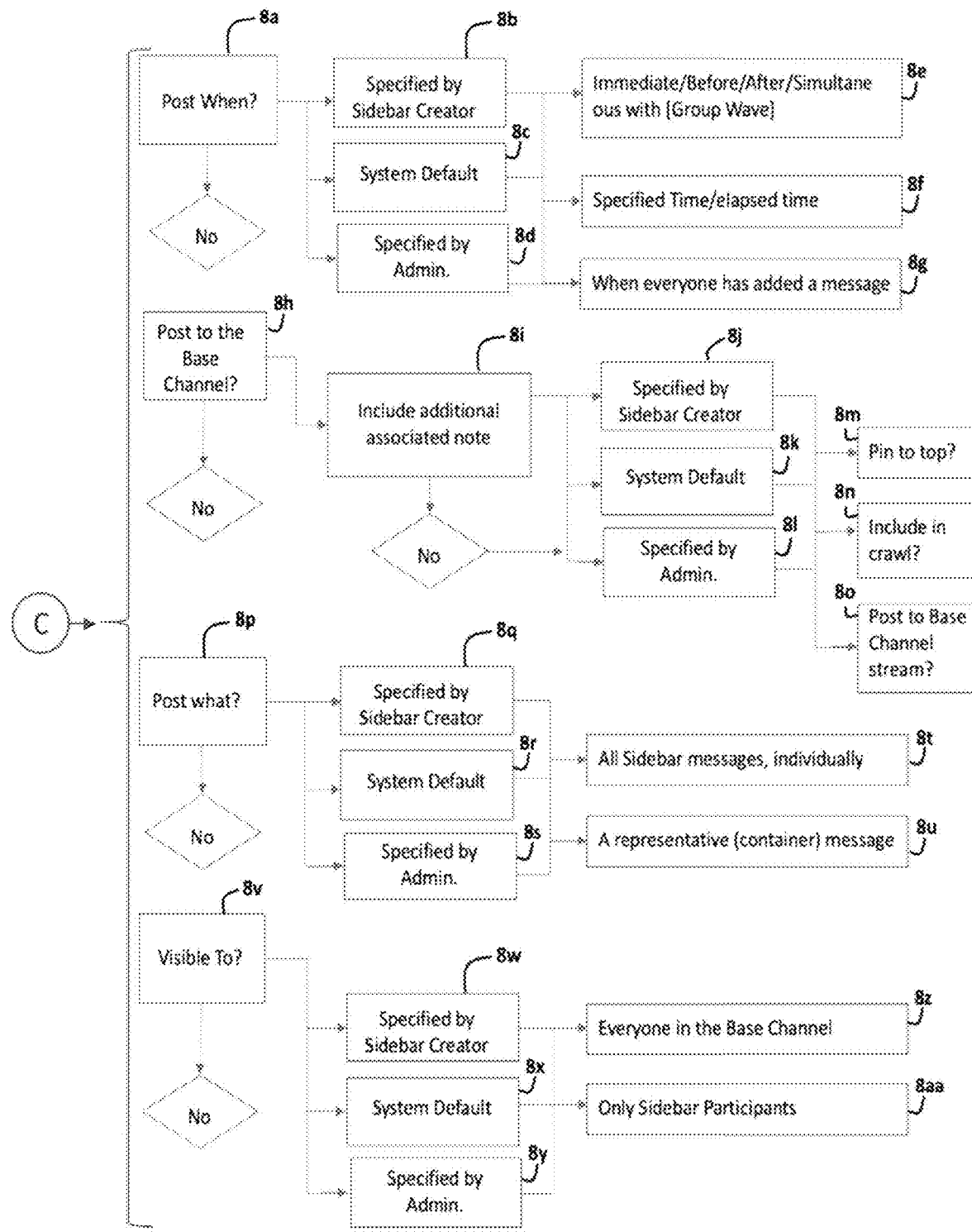
Figure 9:
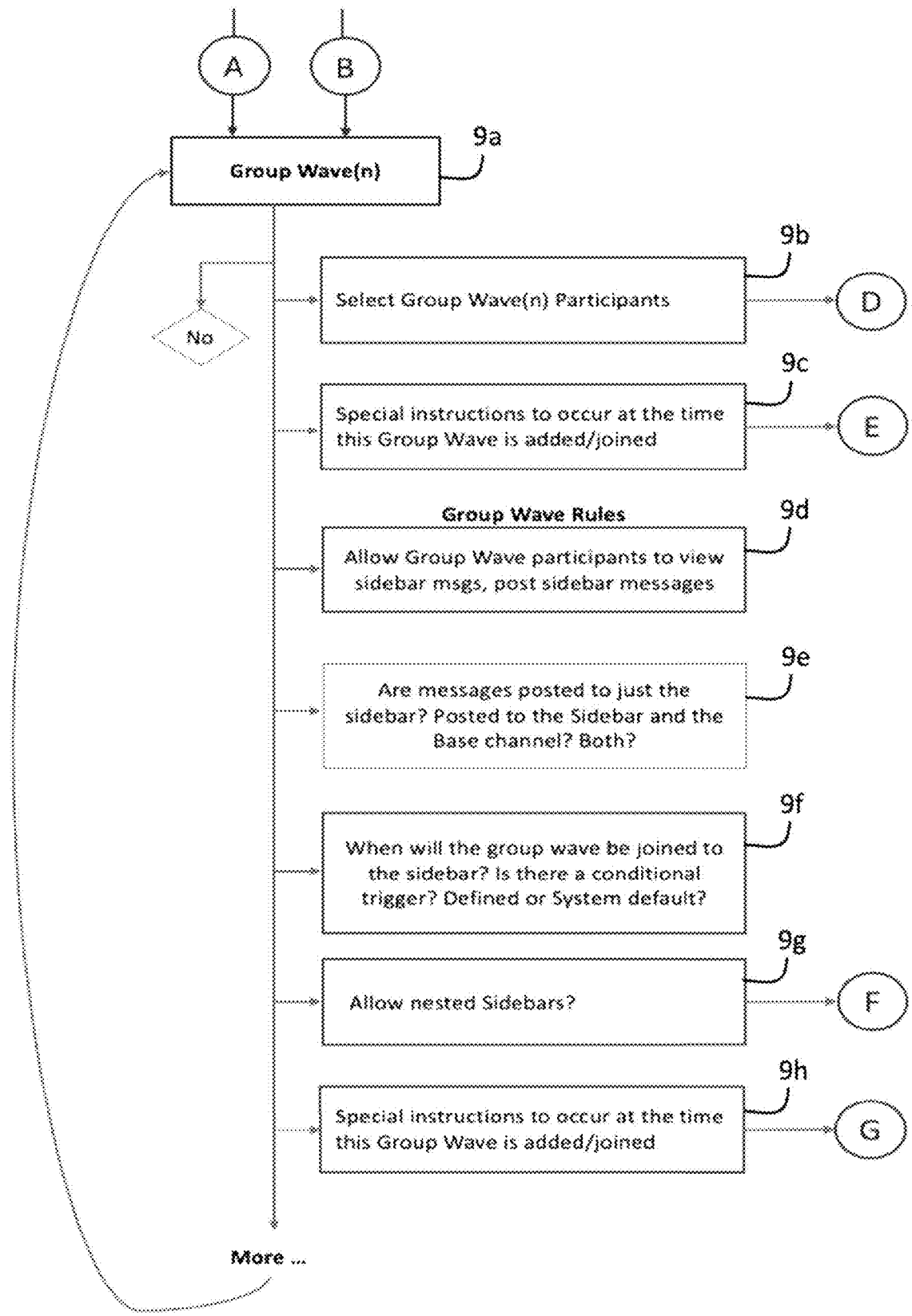

Step 30 and step 32 are further illustrated by the flowchart shown in FIG. 7 and FIG. 8. At step 52, an actor designates an anchor message, which may initiate (or create) a sidebar. If, at step 56, there are sidebar rules, then processing proceeds to step C. At step 58, data may be added, or associated with, an inclusion notification message. The inclusion notification message may indicate to an actor that the actor is a participant in the sidebar. At step 60, the actor may have the option of deciding whether to remain in the sidebar. FIG. 8 illustrates steps what may occur after processing proceeds to off page connector C. As shown in FIG. 8, in some situations, sidebar related rules and attributes may be defined via a sidebar Creator software module. However, in other cases, for example as exemplified below, there are default settings associated with certain parameters the sidebar Creator may not be aware of, or be required to know of. This may include special configuration settings.

As shown in FIG. 8, there are many possible sidebar rules. Several exemplary rules are shown. These rules may or may not actually occur in any specific embodiment. Step 8a is the rule for when a message may be posted. Step 8h is a rule for posting a message to a base channel. Step 8p is a rule for what is posted. Step 8v is a rule for message visibility. Steps 8b, 8c, 8d, 8e, 8f, and 8g may be associated with step 8a. Steps 8i, 8j, 8k, 8l, 8m, 8n and, 8o may be associated with step 8h. Step 8q, 8r, 8s, 8t, and 8u are associated with step 8p. Steps 8w, 8x, 8y, 8z, and 8aa are associated with step 8v.

FIG. 9 and FIGS. 10a, 10b, and 10c provide exemplary details regarding one or more group waves. In some cases, group wave rules may be defined or selected with or without attributes. Thus, in some cases, default settings may be associated with certain parameters that an actor may or may not be aware of.

Step 9a may be reached via off page connector A or off page connector B. Step 9b allows wave participants to be selected for inclusion in a Group Wave Rule. Step 9c allows special instructions to occur at the time participants are given access to a Sidebar. Step 9d allows sidebar participants to view and or post sidebar messages. Step 9e queries whether messages are posted to just sidebar, the base channel, or both. Step 9f queries when will a wave (or wave rule) be associated with or applied to a sidebar. Step 9f also queries whether there is a conditional trigger. Furthermore, is the trigger defined or is the trigger a system default. Step 9g contemplates nested sidebars. Step 9h allows special instructions to occur at the time the group wave is added or given access to the sidebar.

Figure 10A:
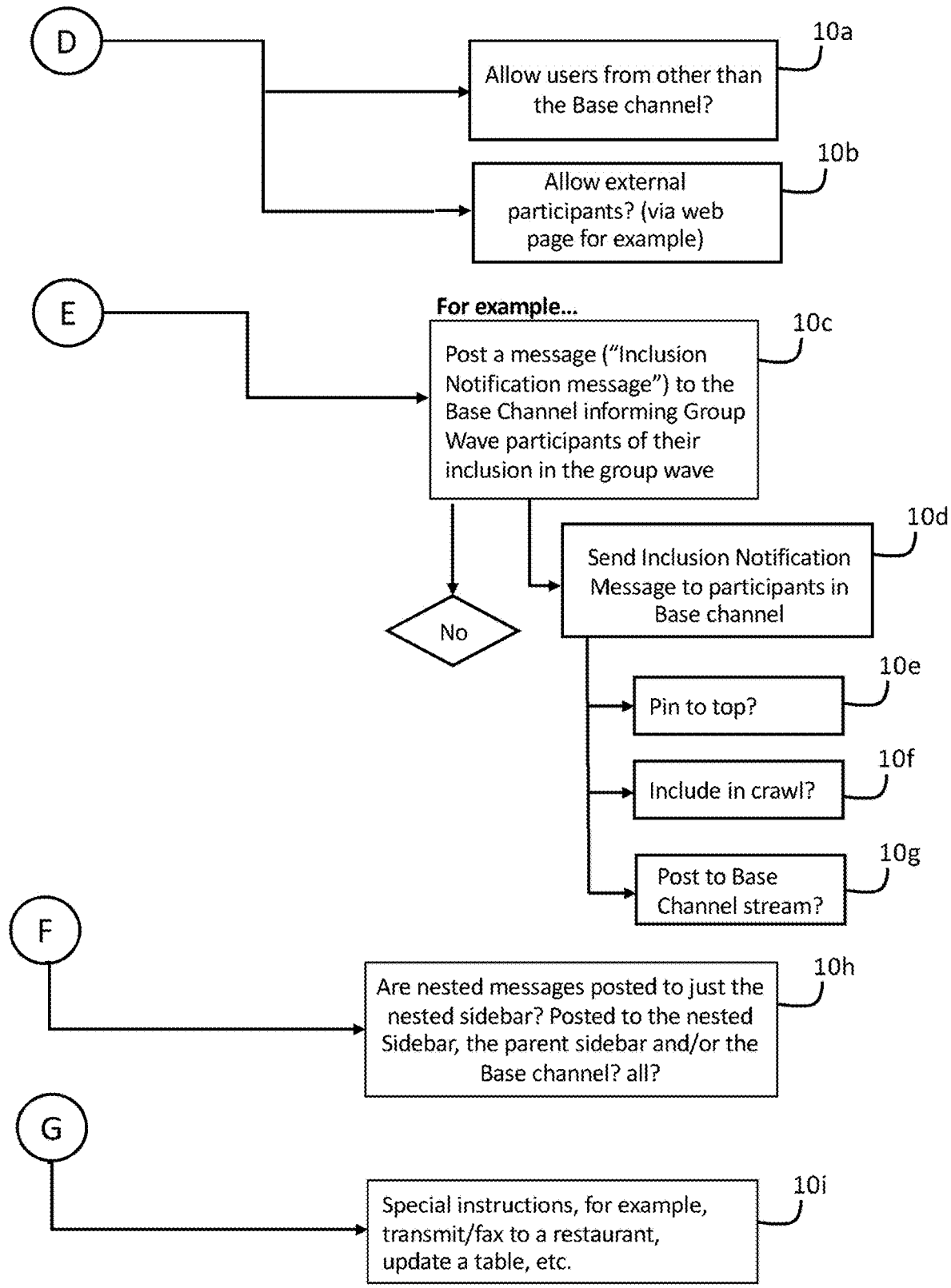
Figure 10B:
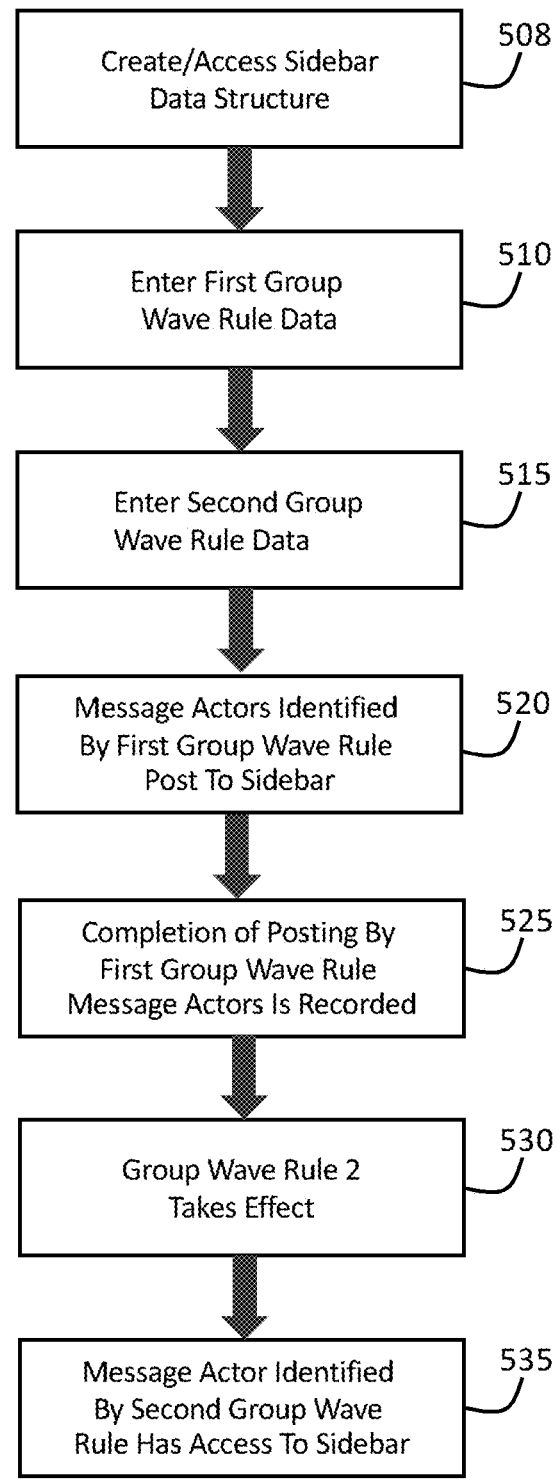
FIG. 10b is a flowchart diagram that illustrates an exemplary embodiment of the present invention.

FIG. 10a may be reached via off page connectors D, E, F or G. Step 10a queries whether users from other than the base channel are allowed. Step 10b queries whether external participants are allowed. Step 10c relates to posting a message to the base channel informing group wave (or group wave rule) participants of their inclusion in the group wave (or group wave rule). Step 10d relates to sending an inclusion notification message to participants in the base channel. Steps 10e, f and g relate to a pin, crawl, or post, respectively. Step 10h queries whether nested messages are posted to just the nested sidebar. Step 10i may include special instructions, for example faxing, updating a restaurant table, etc.

An exemplary embodiment of the present invention follows with regard to a messaging system that manages communications regarding a product such as an electronic greeting card. The management of such communications provides efficiencies in computer processing. For example, the ability to communicate in a sidebar with subsequent messaging to a previously excluded party facilitates communication management. Furthermore, the communication management affects and improves messaging display in a manner that occurs between multiple users at respectively different terminals. More specifically, the "grouping" of messages in a sidebar removes "clutter" from a messaging channel allowing messaging participants to more easily see message "flow." The exclusion and later inclusion of a party to group messaging also maintains temporary confidentiality, a feature that is relevant to computer security.

FIG. 10b is a flowchart diagram that illustrates operation of an exemplary embodiment of the present invention. At step 508 a sidebar data structure is accessed/created. At step 510, first group wave rule data is entered, derived or retrieved. At step 515, the second group wave rule data is entered, derived or retrieved. At step 520, message actors identified by a first group wave rule post messages to their associated sidebar (because a first group wave rule that is part of the first group wave has taken effect). At step 525, completion of posting by first group wave rule message actors recorded. This step may be optional if step 530 is dependent upon another condition being satisfied such as time dependent (i.e. not dependent on whether all first group wave rule message actors have posted to the sidebar) At step 530, group wave rule 2 (part of the set of rules in the second group wave) takes effect. At step 535, the message actor identified by the second group wave rule receives access to the sidebar. This embodiment describes two group waves (with associated group wave rules), but it is understood that there may be further group waves and/or other group wave rules. Also, the steps need not be performed in the order shown FIG. 10c is an exemplary data structure that may be used in combination with the flow chart diagram illustrated in FIG. 10b. Field 550 stores identification of various actors. Field 555 indicates whether an actor is associated with a first group wave rule. Field 560 is used to track whether an actor identified by the first group wave rule has posted to the sidebar. Field 565 indicates whether an actor is associated with a second group wave rule. Field 570 stores the location of an anchor message associated with a sidebar. Field 575 stores the location of message sidebar in memory. Other fields may be included, such as fields for additional group waves.

In the above exemplary embodiment, as step 505 is performed, field 570 can later be populated (for example after certain actors are designated). As step 510 is performed, field 550 and field 555 are populated. As step 515 is performed, field 565 is populated. As step 525 is performed, field 560 is populated. Each participant identified by the first group wave rule may post messages to the sidebar. The sidebar may be accessed by the participant identified by the second group wave rule and available at the location specified by field 575. When such access may occur may be controlled, for example, in an evaluated manner such as within a specified time, after all or a certain number of participants have posted messages to the sidebar, etc. In some embodiments, after the participant identified by the second group wave rule gains access to the sidebar, one or more of the participants identified by the first group wave rule may continue to post messages to the sidebar, and/or have access to the sidebar. In other embodiments, access to the sidebar by participants identified by the first and/or second group wave rule may be continuous, or may be limited. Limitations to access can be based on internal evaluation, time duration, external events, etc.

FIG. 11 illustrates device 100 in accordance with an exemplary embodiment of the present invention. Device 100 is displaying messaging, and in particular messaging within a group messaging channel. FIG. 11 is an image of a display as seen from a particular user ("Sarah") that wishes to initiate a sidebar conversation. In the example shown in FIG. 11, and in subsequent figures, communications management that is suitable for electronic greeting card distribution appears, and will thus be described.

In FIG. 11, as an example and as seen at the top of the screen, at least one message is being viewed. The message is received from a user that may be referred to as a "message actor." At the time that the screen shown in FIG. 11 is being viewed, what is being viewed may be referred to as a "further message channel." Sarah initiates the sidebar via user stimulus with device 100. In the example shown in FIG. 11, user stimulus 101 is a finger that interacts with device 100 with facilitation via icon 102, but other forms of user stimulus are contemplated, such as voice, eye movement, haptic detection, brain waves, etc.

FIG. 12 illustrates an exemplary screen that is displayed after for example, interaction with icon 102 in FIG. 11. In FIG. 12, the screen is divided into different fields 103. There may be differences with regard to each field 103. In one embodiment, fields may be grouped into certain logical relationships based on the respective contents. In other embodiments, fields may be grouped into certain relationships based on rules.

As shown in FIG. 12, each field 103 comprises a plurality of tiles 105. Each tile 105 may be associated with certain rules, content, visual display, etc. In the embodiment shown in FIG. 12, each tile 105 will eventually result in different visual displays as explained further below.

In FIG. 13, user stimulus 101 selects a specific tile 105. Processing then proceeds to FIG. 14. In FIG. 14, a specific visual display appears based on the selection of a specific tile 105 in FIG. 13. In the example shown in FIG. 14, specific visual display 107 appears to user Sarah along with input field 109 for providing additional contents. As will be explained below, input field 109 allows data to be appended to visual display 107.

In FIG. 15, Sara may use her finger (user stimulus 101) to select a further action from three exemplary icons that appear at the bottom of device 100. The three exemplary icons are "from" icon 111, "to" icon 113, and "time" icon 115. In the example shown in FIG. 15, user Sarah has selected "from" icon 111. By selecting a further action, Sara designates tile 105 (FIG. 13) in order to generate/access/select the anchor message. In other words, each tile 105 may be associated with a respectively different anchor message. A sidebar data structure that is illustrated in FIG. 10c is created/accessed/initialized (FIG. 10b, step 508).

FIG. 16 shows the display that appears on device 100 after "from" icon 111 is selected. The display that appears in FIG. 16 is a potential user list 117 that indicates the destination of a message (i.e. the anchor message). FIG. 16 may, in one example, illustrates some or all of the participants of a group channel. For convenience, each recipient may be referred to as an actor. An actor may be a human or a bot. A selection field appears on the right side of user list 117 to select the users that will receive or be given access to the anchor message. In some embodiments, available options include an "all of us" field and an anonymous field.

In FIG. 17, user Sarah has selected which actors will have access to the sidebar associated with the anchor message. When she has finished her selection, or as she is making her selection, she is creating a first group wave (with one or more first group wave rules) that will give the selected message actors access to the sidebar that she is creating. Also, FIG. 10c field 550 of sidebar data structure 540 becomes populated with the identification of actors that are included in the first group wave (FIG. 10b, step 510). FIG. 10c Field 555 is populated to indicate that certain actors are included in the first group wave. She may then select the "to" icon 113.

The action of selecting the "to" icon 113 causes several events to occur. Specifically, selecting the "to" icon 113 and subsequent selection of message actors will create a second group wave (with one or more second group wave rules). This step designates message actor(s) that will have access the sidebar at a time specified by any active rules. This step also populates field 565 to indicate certain actor(s) that are includes in the second group wave.

Specifically, FIG. 18 illustrates an exemplary screen that appears when "to" icon 113 is selected. This user list 117 may be the same or different than user list 117 that appears in FIG. 16. This is an exemplary list that is used to create a second group wave (with one or more second group wave rules).

In FIG. 19, after user Sarah selects Elizabeth as the recipient, user Sarah may then select the "time" icon 115.

The action of selecting the "time" icon, in this example, results in an additional (or modified) first and/or second group wave rule (i.e., scheduling the date and time that the actors associated with a first or second Group Wave rule will be given access to the sidebar.

In the example, each actor associated with the first group wave rule is associated with (or receives access to) the anchor message (or message or element derived therefrom). FIG. 10c Field 570 is updated to indicate where the anchor message (or message derived therefrom) is associated with each actor is stored.

As each actor posts messages in the sidebar, messages may be aggregated for eventual availability (e.g. viewing) by an actor associated with the second group wave rule.

Since FIG. 19 illustrates a birthday card for one individual, Sara elects Elizabeth as the sole member of the second group wave (or group wave 2). In this example, certain group wave rules associated with this use case have been predefined, and are applied. For example, group wave 1 members are given access to the sidebar immediately when the scheduling icon ("time" icon 115) is selected. Tapping on "time" icon 115 causes the screen shown in FIG. 20 to be displayed.

Figure 20:
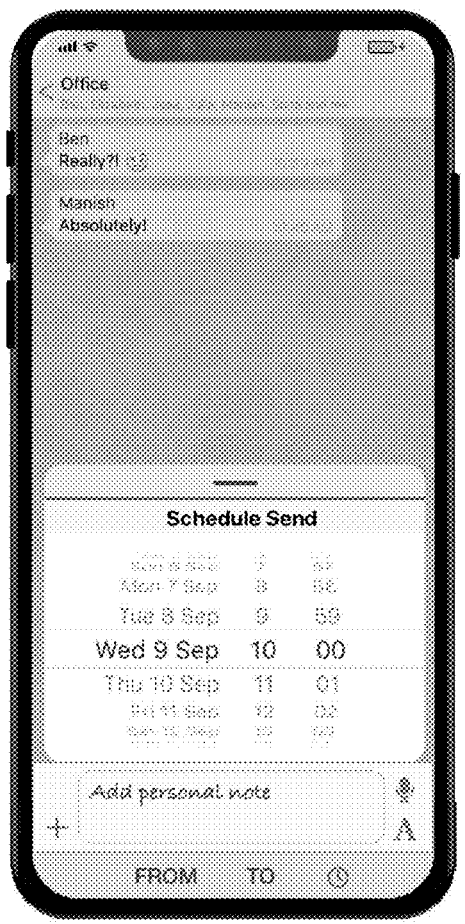

In FIG. 20, user Sarah is able to select the time when the birthday card will be sent to Elizabeth.

Figure 21:
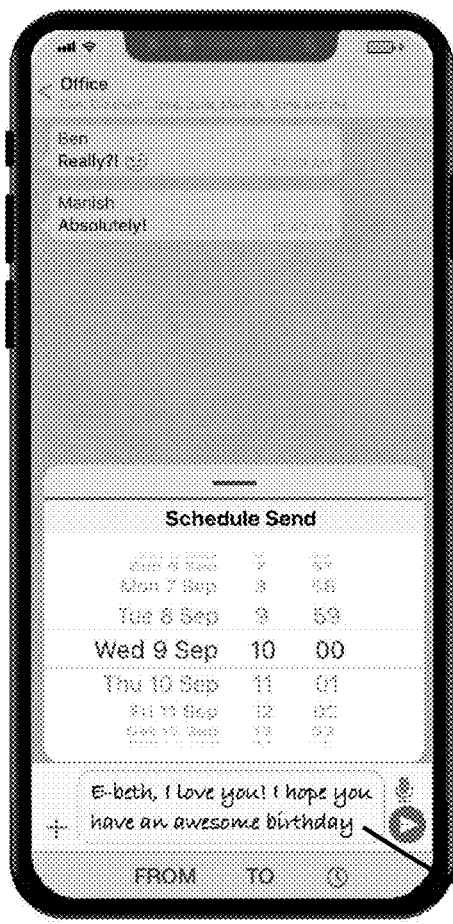

In FIG. 20, Sara may choose to input text in input field 109. Text is entered in FIG. 21. While text is shown, other forms of input may be used such as images, sound, etc.

The sidebar creator optionally adjusts the day and/or time when group wave 2 members will be given access to the sidebar. By applying a rule relating to scheduling, Sarah can ensure that Elizabeth is not given access to the sidebar before the members of group wave 1 had a chance to review and "sign" her card (by posting to the sidebar). Before finalizing and "sending" the card, Sarah adds a personal note to Elizabeth that will be added to the sidebar.

Figure 22:
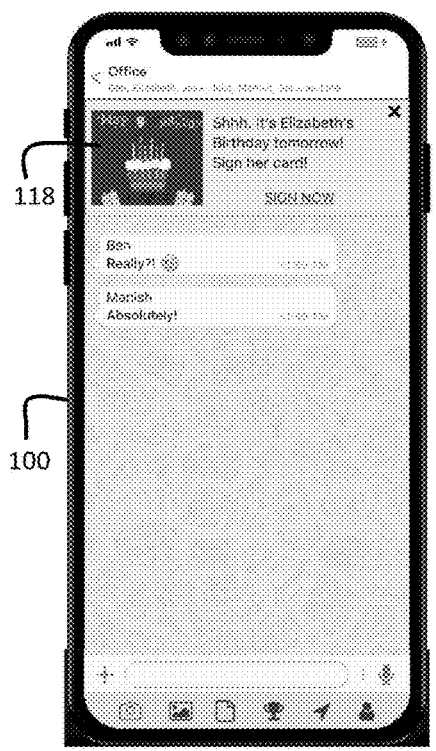
Figure 23:
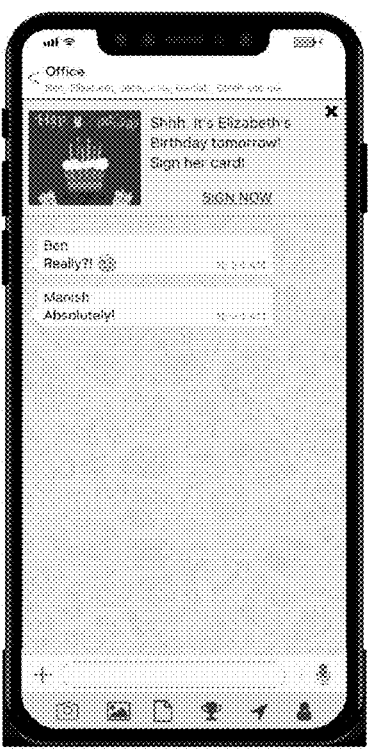

In FIG. 22, group wave 1 rule (or another group wave rule in group wave 1) causes the sidebar inclusion notification message to be posted and pinned to the top of all group wave 1 member displays in the associated base channel. FIG. 22 illustrates sidebar inclusion notification message 118. FIG. 22 illustrates a display on device 100 from the point of view of Sarah, the sidebar creator and member group wave 1. In this example, group wave 1 members are given access to the sidebar immediately. FIG. 23 illustrates display on device 100 from the point of view of someone other than Sarah, for example Sona, a selected member of group wave 1. In this example, group wave 1 members are given access to the sidebar immediately. Tapping on "sign now" causes the screen to update as shown in FIG. 25 and FIG. 26.

Figure 24:

FIG. 24 illustrates device 100 from the perspective of Elizabeth prior to the scheduled time that group wave 2 members will be given access to the sidebar. As shown, Elizabeth does not see any greeting card at this time.

Figure 25:
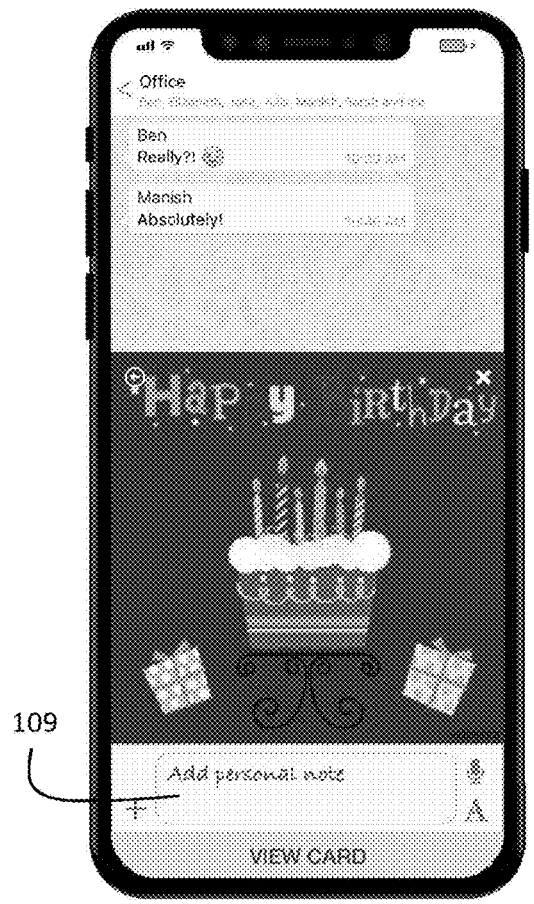
Figure 26:
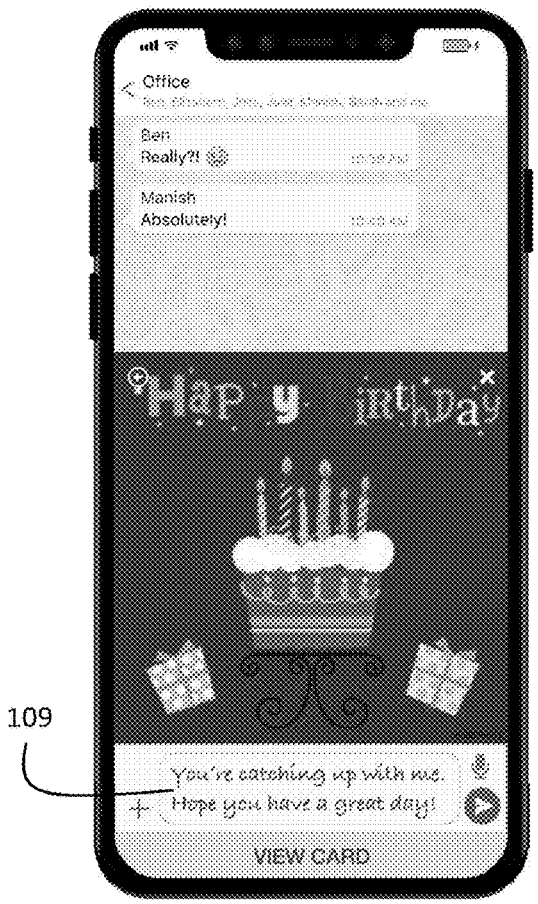

FIG. 25 illustrates display on device 100 after Sona selects "sign now" in FIG. 23. As shown in FIG. 25, the visual display that will be seen by Elizabeth appears, along with input field 109. As shown in FIG. 26, Sona can enter text into input field 109. The text that she enters is posted to the sidebar (FIG. 10b, step 520). Sona's completion of the act of entering text ("first wave data") is recorded (FIG. 10b, step 525). Her completion is also recorded in field 560 (FIG. 10c).

Each member of group wave 1 posts to the sidebar just as Sona did above (in response to being advised that they have access to the sidebar). As each member of group wave 1 posts to the sidebar, field 560 (FIG. 10c) is updated (FIG. 10b, step 525).

At a certain point, group wave 2 will take effect (FIG. 10b, step 530), and the group wave rule 2 participants will have access to the sidebar (FIG. 10b, step 535).

Figure 27:
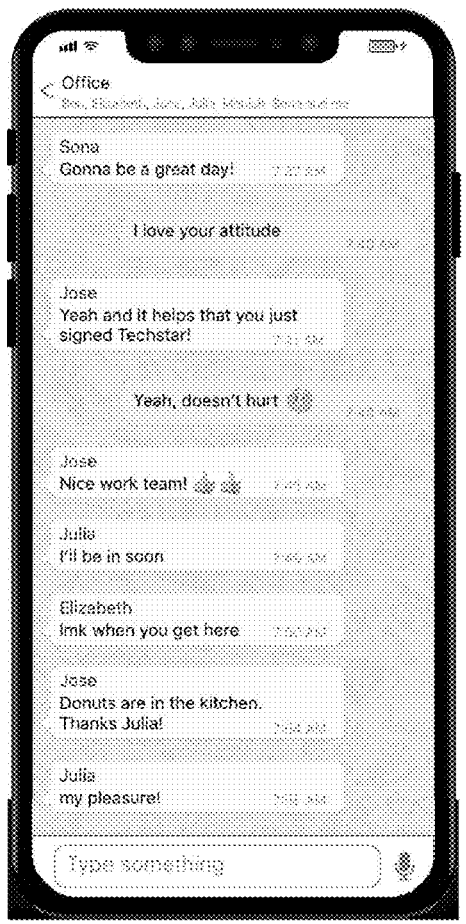
Figure 28:
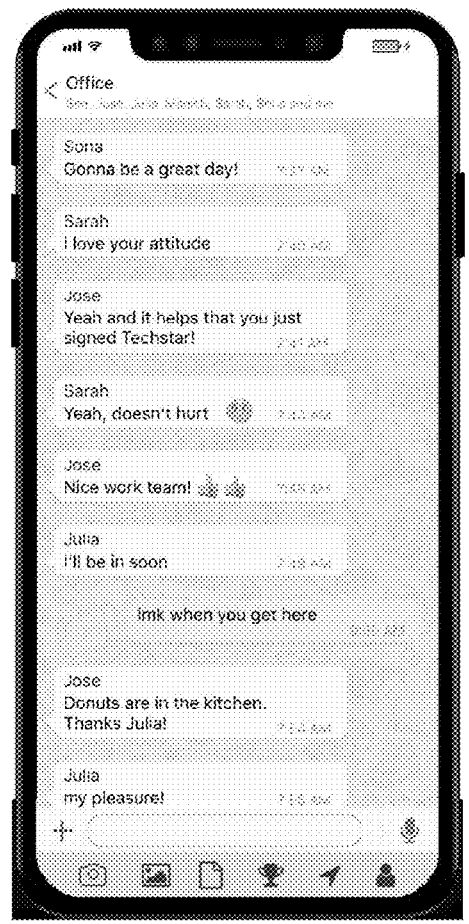

FIG. 27 illustrates a display from the point of view of Sarah, the sidebar creator and member of group wave rule 1 immediately prior to the scheduled time that group wave rule 2 members will receive access to the sidebar. FIG. 28 illustrates the display from the point of view of Elizabeth immediately prior to the scheduled time that group wave 2 member(s) will be given access to the sidebar. FIG. 29 and FIG. 30 show Sarah's and Elizabeth's respective screens just after group wave 2 member(s) have been given access to the sidebar (FIG. 10b, step 535). In this example, one of the predefined rules associated with the group wave is to send a sidebar inclusion notification message that will be posted to all group wave rule 1 members in the base channel message stream at the time that group wave rule 2 members are given access to the sidebar. The form of the sidebar inclusion notification message and certain other attributes may also predefined and associated to the sidebar use case.

Figure 31:
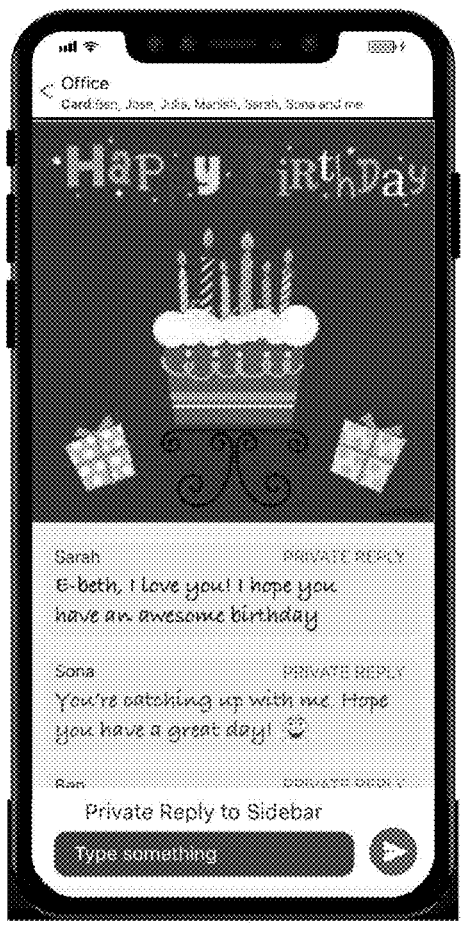

By tapping on the prompt "view" (which prompt has been included as part of the predefined sidebar inclusion notification message as shown in big 30), Elizabeth causes the sidebar to be displayed as shown in FIG. 31. In this example, Elizabeth is able to view and post "reply to all" messages in the sidebar message stream so that messages will be visible to all sidebar participants.

Figure 32:
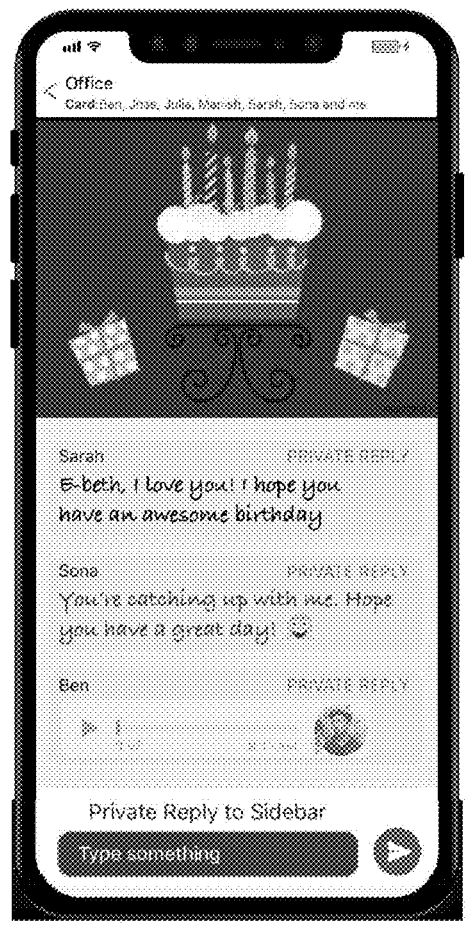
Figure 34:
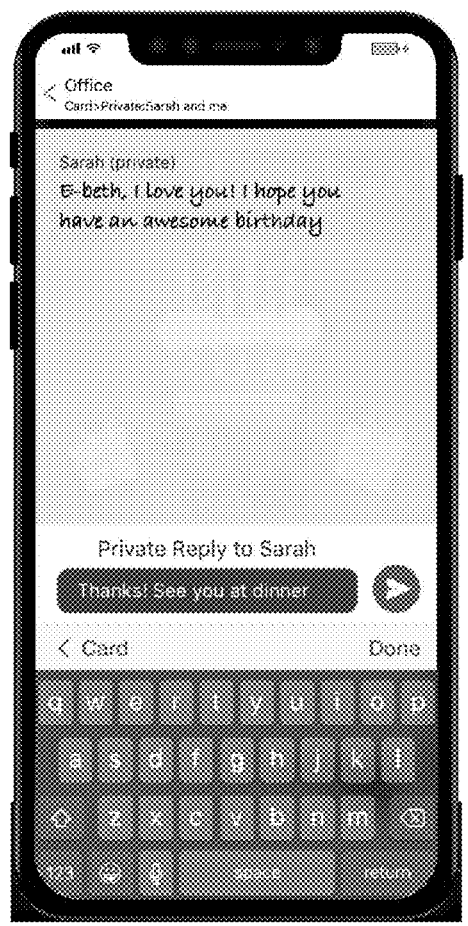
Figure 35:

FIG. 32 shows that the sidebar is scrollable. In addition, in this embodiment, certain sidebar and group wave rules have been predefined that permit nested sidebars to exist as shown in FIGS. 33, 34, and 35.

Figure 33:
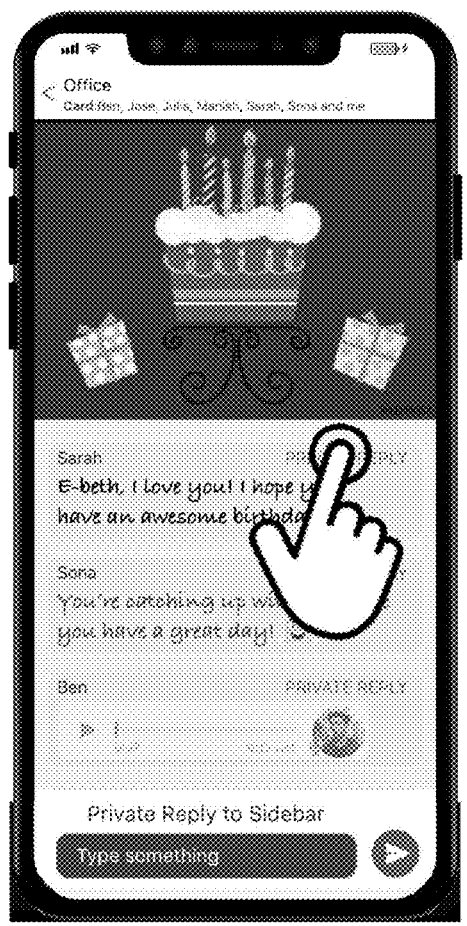

FIG. 33 shows that Elizabeth wishes to send a private reply to Sarah in response to Sarah's message in the sidebar. A private reply within a sidebar is called a nested sidebar because it is essentially a sidebar within a sidebar. In this example, tapping on the prompt's "private reply" embedded in Sarah's sidebar message causes Sarah's sidebar message to be designated a "further anchor message" which spawns a nested sidebar as shown in FIGS. 34 and 35.

Figure 36:
Figure 37:
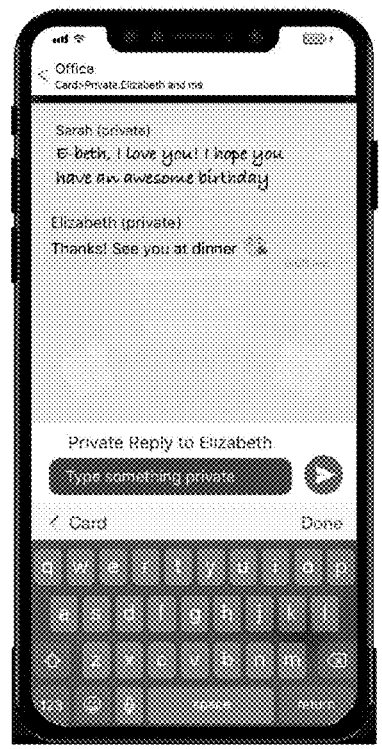

Tapping on the Sidebar notification message as shown in FIG. 36 causes the screen shown in FIG. 37 to be displayed. As shown in FIG. 37, a further Private Nested Sidebar message can be entered or the user, Sarah, in this example, can tap on "<Card" to cause the display of the parent Sidebar.

Figure 38:
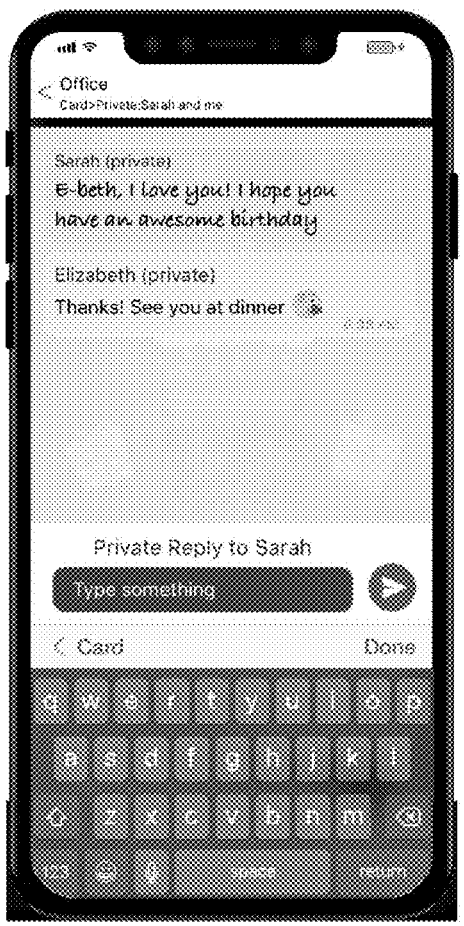

FIG. 38 shows that Elizabeth has posted a private reply to the personal message posted by Sarah in the Sidebar. By opting to respond privately to Sarah's Sidebar message, Elizabeth spawned a Nested Sidebar consisting of, and visible only to, the parties of the nested Sidebar. In some embodiments, the initial posts to the Sidebar may be invisible to everyone other than selected Sidebar participants and/or Group Waves rule members.

In addition to the Nested Sidebar view shown in FIG. 38, Sidebar and Group Wave Rules have been predetermined and applied that cause Sidebar posts to be also posted to the Base Channel, and made visible only to parties to the Sidebar or Nested Sidebar. In this embodiment, the "post to base channel" rule applies only to Group Wave rule members after they have been given access to the Sidebar, to ensure, that Elizabeth, in this case, doesn't see Sidebar messages posted prior to her Group Wave 2 being given access to the Sidebar.

Figure 39:
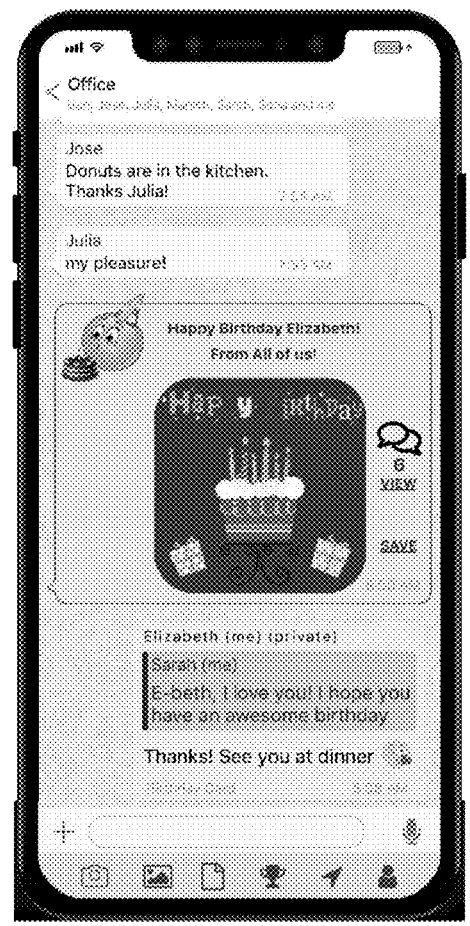

FIG. 39 also shows a display from the point of view of Elizabeth.

In this exemplary embodiment, Sidebar and Group Wave rules stipulate that sidebar messages posted to a Base Channel are marked "private" and made visible only to the participating Sidebar parties.

In some embodiments no notification, or a different notification of a Sidebar post can be included in the Base Channel. For example, in some embodiments, a simple icon, or line, or other subtle indication or reference, could be inserted into the Base Channel to provide an indication to a user that a sidebar message has been posted.

Figure 40A:
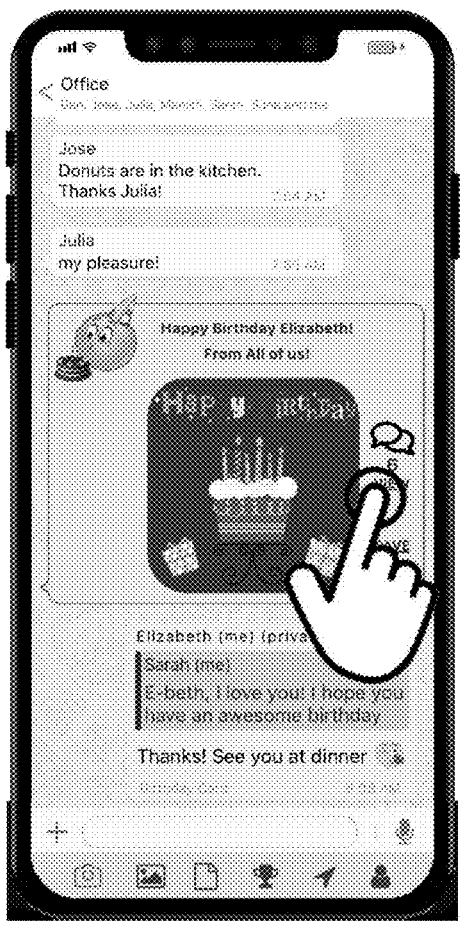
FIGS. 40a and 40b are screen shots that illustrate an exemplary embodiment of the present invention.
Figure 40B:
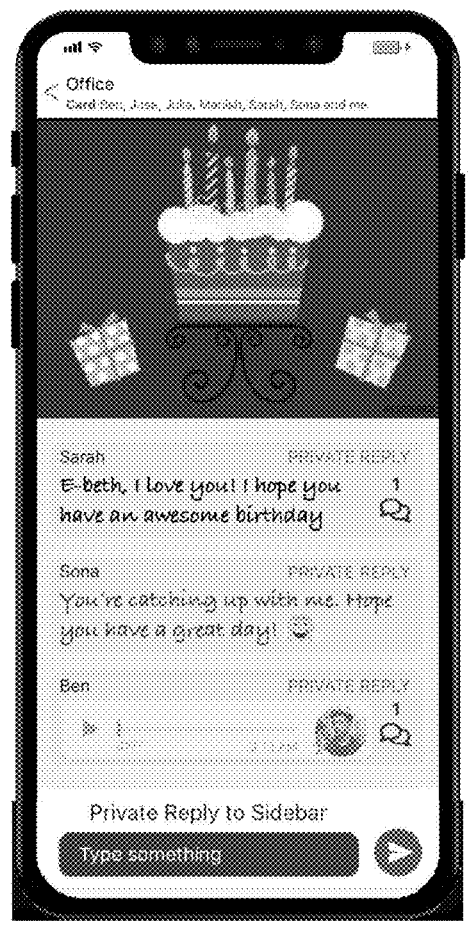

FIG. 40a shows that Elizabeth has tapped on the prompt that includes a message bubbles icon, the number of messages in the sidebar and the text "VIEW". Tapping here as shown causes the Sidebar to be displayed as shown in FIG. 40b.

Among other things, the above embodiment describes a communications management system that provides security in a computer environment. The security features prevent a party from having access to certain data until certain conditions have been met. In the example above, the conditions relate to a time period expiration, after which access to a second group wave actor is provided, but this is merely exemplary. Also, greeting cards have been provided as an example, but this is merely exemplary. In another embodiment, the data to which a party gains access to may pertain to a financial instrument, such as a digital form of funds (i.e. gift card, financial account, etc.), but this is again mere exemplary. As another example, the data that a party gains access to may be a document that is circulated for signature, but this is again merely exemplary.

The above exemplary embodiment describes and illustrates an example in which actors are specified as the "from" and one or more actors are specified as the "to," but this is merely exemplary. In a further embodiment, an actor is specified as the "to" and by default the actors not included as the "to" are designated as part of the "from." In another exemplary embodiment, a group wave rule is applied whereby the selected, derived or created anchor message together with the messages posted to the sidebar are saved together as an image or other file type. An image (contained in a file and/or with access thereto) is then made accessible to an excluded party (i.e., a further group wave consisting of the intended recipient/s in this example) in a channel such as the base channel or via other means. In a further variation of this exemplary embodiment, group wave rules may specify termination of access to the sidebar to the participants of one or more group waves. Such termination may occur once the associated sidebar has been made accessible to an excluded party (i.e., a further group wave consisting of the intended recipient(s) in this example) in a channel such as the base channel or via other means. In another exemplary embodiment, what an excluded party is given access to is not necessarily access to the sidebar itself, but access to content (such as partial content) of the sidebar. For example, if a greeting card (with added messages) is being "built" in the sidebar, the excluded actor may receive access to a "finished" greeting card (or portions thereof) in a place other than the sidebar, such as in another channel, via e-mail, hardcopy via the U.S. mail system, etc.

A second exemplary embodiment of the present invention now follows.

Figure 41:
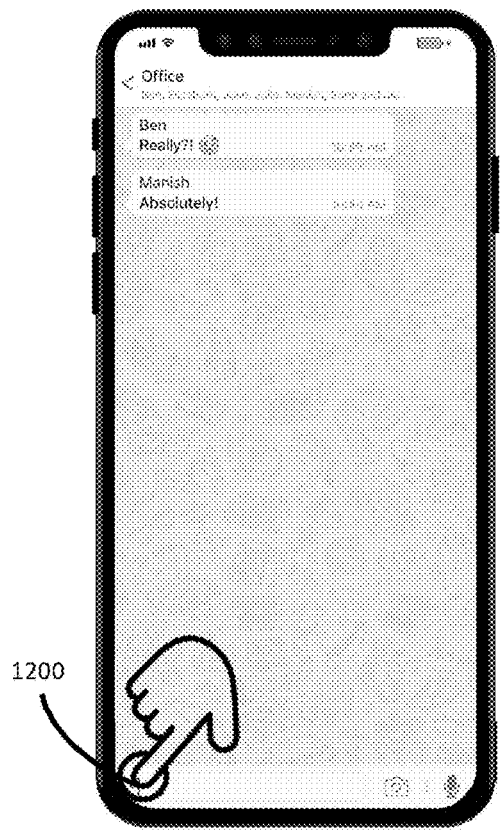
Figure 42:
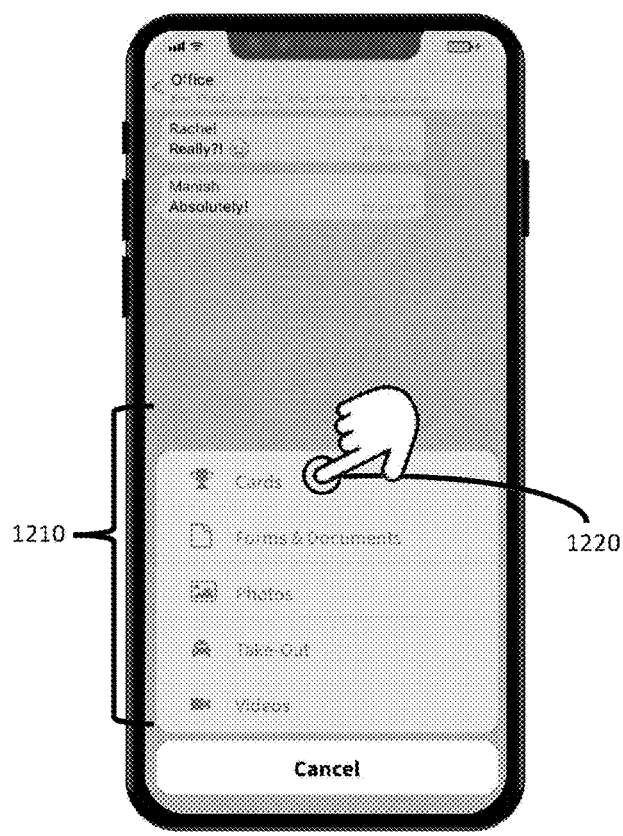

FIG. 41 and FIG. 42 show a display from the point of view of User Sarah in the group channel named Office. In this exemplary embodiment, Sarah is the "Sidebar Creator".

FIG. 41 (1200) shows that User Sarah has tapped an icon on her screen which causes a menu to be displayed as shown in FIG. 42 (1210). In some embodiments the further action selection menu shown (FIG. 41 #1210) would be bypassed and accessed directly.

FIG. 42 shows that User Sarah is presented with a menu of possible further actions. In this exemplary embodiment the user is presented with a options such as Cards, Forms & Documents, Photos, Take-Out and Videos. Many other categories could be added or substituted such as Auctions, Petitions, Signatures, Open Enrollment, Group sign-ups or Group purchasing.

Figure 43:
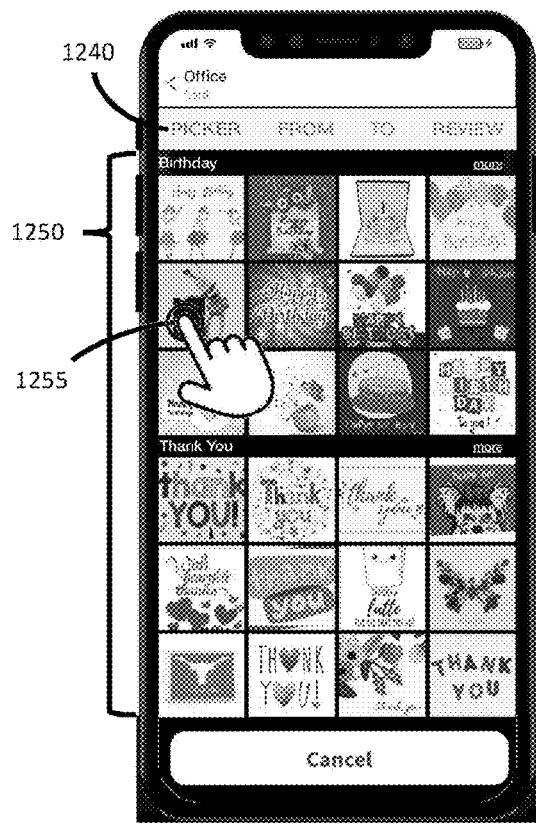

In this exemplary embodiment, Cards is selected FIG. 42 (1220), which causes a further selection screen to be displayed as shown in FIG. 43.

Figure 44:
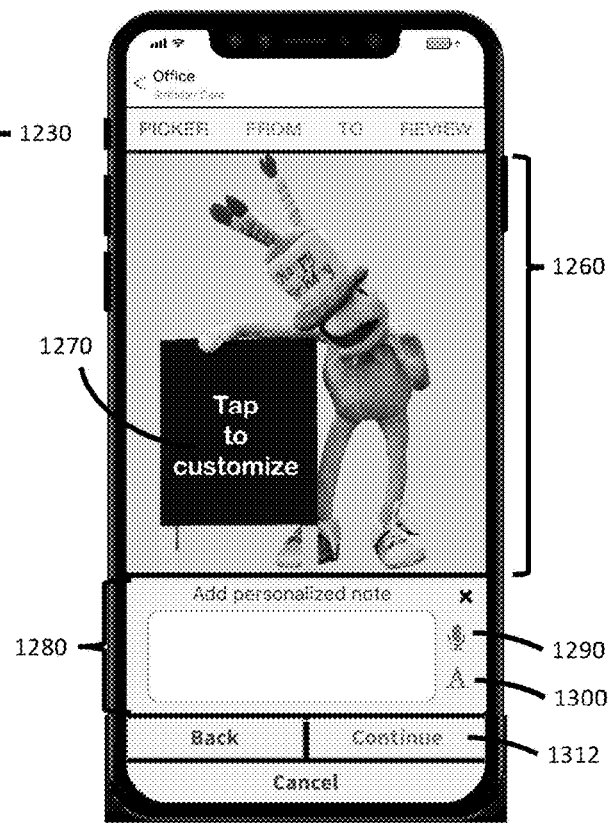

FIG. 43 and FIG. 44 show a display from the point of view of User Sarah (who is the "Sidebar Creator" in this example). In this exemplary embodiment, the Sidebar Creator is automatically included in the first Group Wave rule members to be given access to the Sidebar.

FIG. 43 (1230) shows an optional navigation bar. In this exemplary embodiment, the navigation bar indicates where the user is in the process of creating a card. In this example four steps are displayed: "Picker", "From", "To" and "Review". The highlighted step indicates the current screen being viewed in the process (1240). In this embodiment, a user could tap on any of the steps to cause the screen to update the display to show that screen related to that step. The number of steps in the navigation bar as well as the descriptions can vary. In this exemplary embodiment, two Group Waves are assumed by default. The participants selected as "From" are included in Group Wave(1) (in a rule therein) and the participants selected as "To" are included in Group Wave(2) (in a rule therein). Group Wave(2), in this example, is also considered to be the Terminal Group Wave.

In FIG. 43 (1250) user Sarah is presented with an array of cards from which to choose (e.g., birthday, thank you, congratulations, holiday, get well and gift cards). The selected card (i.e. data associated therewith) serves as the Sidebar "Anchor Message" in this example and serves as the foundational element for the Sidebar.

FIG. 43 (1255) and FIG. 44 (1260) show that user Sarah has selected a Birthday card with a frog on it. Therefore, in this exemplary embodiment, this (the Frog card) selection is the designated Anchor Message (or derivative thereof).

FIG. 44 (1270) shows that user Sarah happens to have selected a Birthday card that can be further customized (e.g., attach a video, add a comment, add a photo, etc.) In this exemplary embodiment, if a "Tap to Customize" option is presented but ignored (i.e., the card picker chooses not to customize) then a generic message is automatically inserted. In this example, the system places "Happy Birthday" and adds the Recipient's name (or names if more than one recipient).

FIG. 44 (1280) shows that one of the system default Sidebar Rules as it relates to this Birthday Card is that the Card Creator is automatically included in Group Wave(1) ("From") and, and such, and in this example the Card Creator is afforded the option to add a personal note to the card (i.e., Sidebar) at this point in the Card Creation (Sidebar) process. In some embodiments the personal note is visible only to further Group Wave members and/or the Terminal Group Wave (e.g., the card recipient/s). In some embodiments the personal note is visible to all or other Group Waves.

FIG. 44 (1290) shows a microphone icon to indicate that the user can record a message that will be included in addition to or in lieu of a typed personal note. FIG. 44 (1300) shows a text icon to indicate that the user may select or modify certain attributes of their typed personal note. Other messaging icons may also be optionally made available to the user such as a camera, video camera, paperclip, emoji or sticker to indicate to the user that he/she may attach a photo, a video, attachment, emoji, sticker and/or gif.

FIG. 44 (1312) shows a Continue button which if selected will cause a further screen (or update to the current screen) to be displayed. In this example, tapping "Continue" causes the screen shown as FIG. 45 to be displayed.

FIG. 45 and FIG. 46 show a display from the point of view of User Sarah.

FIG. 45 (1315) shows that user Sarah is at the "From" step of the card creation process. At the system level, "From" and "To" are just two different ways of describing (or creating, with their respective group wave rules) two distinct "Group Waves". Group Waves are groups of one or more group wave rules that define none, one or more users/participants that are given access to the sidebar (for example together and at the same time). The first Group Wave rule members ("From" Group Wave rule 1 in this example) will be given access to the Sidebar first and the "To" Group Wave rule members will be given access to the Sidebar second. There can be any number of Group Waves. In this exemplary embodiment there are two Group Waves. Successive Group Waves members can be given access to the sidebar in accordance with a rule or rules such as; after everyone has seen a message or at a prescribed time. In this exemplary embodiment a rule is applied (a specified Date) that triggers when to give Group Wave 2 ("To") members access to the Sidebar. In this example, Group Wave 2 ("To") is also the "Terminal Group Wave" (final Group Wave) to be executed and as such, causes the Document/Card/Sidebar to be posted to the Base Channel.

FIG. 46 (1340) shows that Sarah has selected Ben, Jose, Julia, Manish and Sona as participants of the "From" group. In this example, because she is the Sidebar Creator, Sarah was automatically selected as a participant in the "From" Group Wave rule.

Figure 47:
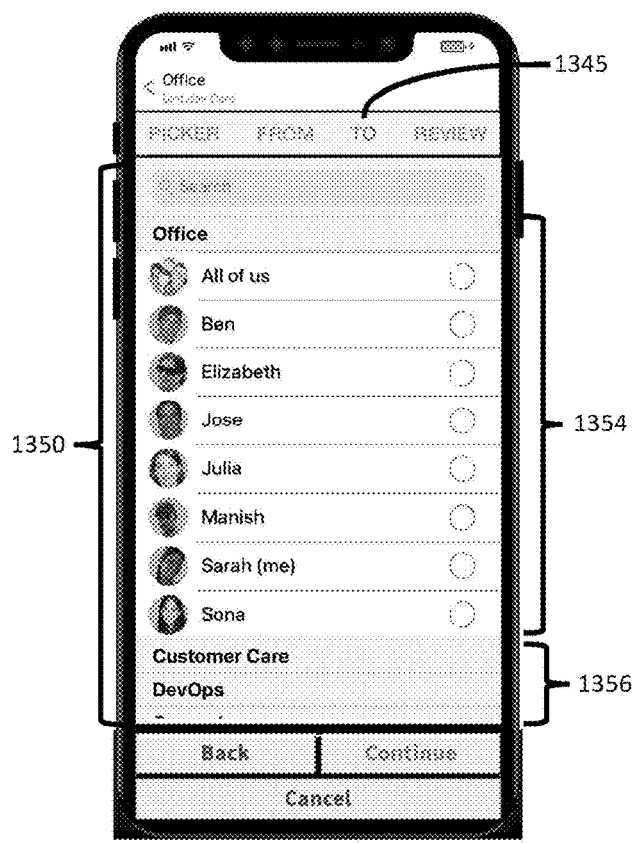

FIG. 46 (1342) tapping "Continue" in this example, causes the screen shown as FIG. 47 to be displayed.

Figure 48:
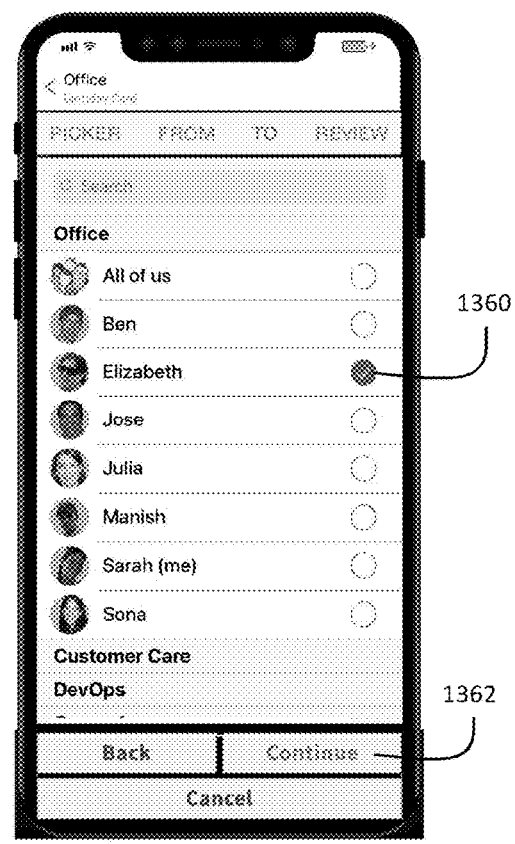

FIG. 47 and FIG. 48 show a display from the point of view of User Sarah (the "Sidebar Creator").

FIG. 47 (1345) shows that the Sidebar Creator (card creator) User Sarah, is at the "To" step of the card creation process. In this exemplary embodiment Group Wave(2) participants selected from a list of Channels/Users as shown in FIG. 48.

FIG. 47 (1350). In this exemplary embodiment, user Sarah is presented with a list of members from which she can designate (select) who the card the card is for (or "To"). In this exemplary embodiment the users defined in the group "To" are by default members in Group Wave (2), which, in this example is also the Terminal Group Wave. In this exemplary embodiment one of the Group Wave rules associated with Group Wave (2) is that a message associated with the (card) Sidebar will be posted to the Base Channel at the time Group Wave (2) is triggered to be posted. In this example, and in accordance with the system's default Sidebar Rules as they relate to the Cards use case, the posted message includes a thumbnail image of the selected card, a link to the sidebar and an additional option to "Save" the card. If the user chooses to Save the card it will be saved in such a way as to provide access to it via a link which link is outside of the message stream in which it was posted. In other words, the user will not have to search through hundreds or thousands of messages in the Base Channel in order to retrieve the card in the future.

FIG. 48 (1360) shows that Sarah has selected Elizabeth as the sole participant in the "To" Group Wave. In this exemplary embodiment the "To" Group Wave is, by default, the Terminal Group Wave.

Figure 49:
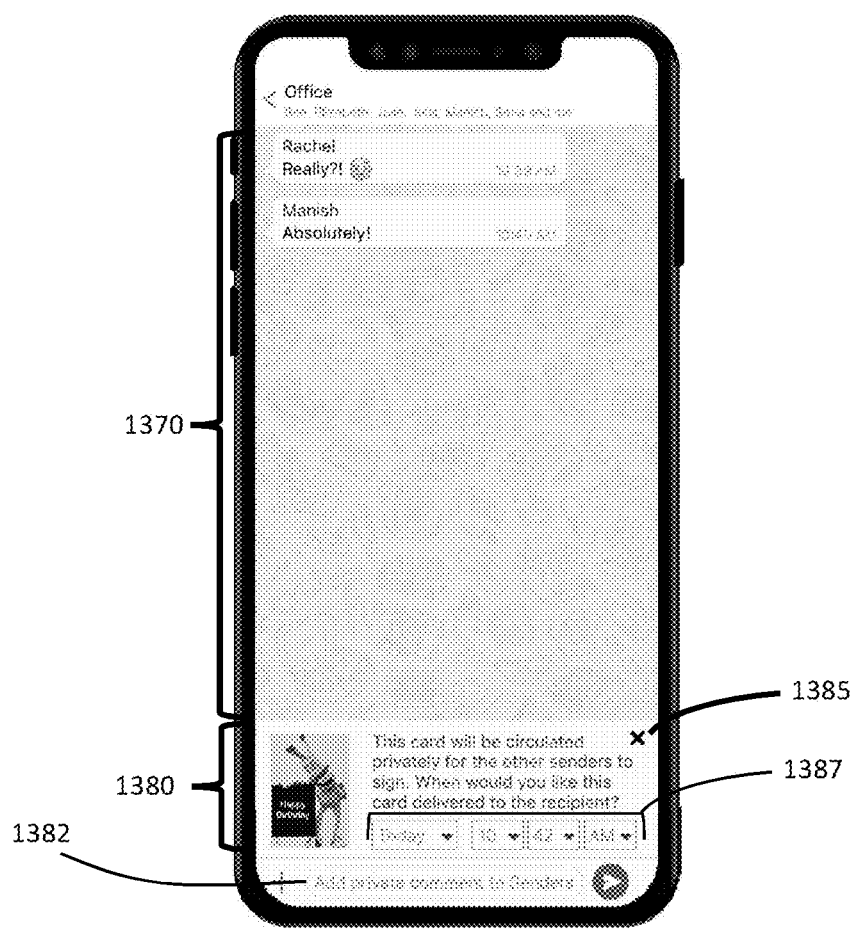

FIG. 48 (1362) tapping "Continue" in this example, causes the screen shown as FIG. 49 to be displayed.

FIG. 49 (1370) shows an exemplary message stream in the Base Channel named "Office".

FIG. 49 (1380) is displayed to User Sarah (the Sidebar Creator). In this exemplary embodiment user Sarah is shown a thumbnail of the card she selected along with a Date and Time selection prompt, displaying by default, current date and time. In this exemplary embodiment, leaving the date and time unchanged will cause Group Wave (2) members to have access to the Sidebar immediately upon creation of the Sidebar.

In this exemplary embodiment, a default Sidebar Rule associated with the Birthday card use case affords the Sidebar Creator the ability to add a comment that will be associated and included with the Inclusion Notification Message sent to Group Wave (2) participants at the time that they are given access to the Sidebar (i.e., in this example, "Add a private comment to senders") FIG. 49 (1382). By adding a comment, the Sidebar Creator (Sarah), is able to add a message (an orienting message in this case) to the Group Wave (2) participants to provide some further context or description to the recipients of the Sidebar Inclusion Notification. In this example, Sarah adds a comment to be sent along with the Inclusion Notification Message that reads, "Shhh. It's Elizabeth's Birthday tomorrow! Sign her card!" [FIG. 54 (1448)]

FIG. 49 (1382) This invention anticipates the application of one or more Sidebar Group Waves. When a Group Wave results in members (actors) given access to a Sidebar, and in accordance with a defined Sidebar Rule, the Group Wave members may be notified via a private message ("Inclusion Notification Message") posted and visible [only] to the Group Wave members in the Base Channel. In some cases, and if a Sidebar Rule is defined as such, a comment, explanatory or orienting message can be sent along with the Inclusion Notification Message to members of the Group Wave in the Base Channel. In the Birthday card use case described in this example, the Sidebar Creator is, by default, afforded the ability to add a comment that will be associated and included with the Inclusion Notification Message when said notification is sent to Group Wave (2) members. Different embodiments can facilitate the adding of a private comment to successive (or concurrent) Group Waves in different ways.

In this exemplary embodiment, User Sarah can cancel the card creation process by tapping on the cancel "x" shown as FIG. 49 (1385). Tapping on the "x" in this example will cancel the card creation process and reset the screen display.

In this example, the area shown as FIG. 49 (1387) can be modified by the Sidebar Creator (sidebar creator) to define a Group Wave (2) rule. In this example, the sidebar creator can specify the time that the Group Wave (2) participants (only Elizabeth in this example) will be given access to the Sidebar. In this example, Group Wave (1) participants are, by default, given access to the Sidebar immediately upon the completion of the creation of the sidebar. In this exemplary embodiment a further Group Wave (1) default rule causes a Sidebar Inclusion Notification message to be sent to all Group Wave (1) participants once they are given access to the Sidebar with said notification posted to a crawl and pinned to the top of the associated Base Channel of all Group Wave (1) user displays. Joining Sidebar participants in waves allows specified Sidebar participants the chance to engage with the Sidebar before subsequent participants are given access or know of the Sidebar's existence. In the use case of a birthday card, co-workers get have the opportunity to circulate and sign the card before the recipient knows of its existence. In addition, since all of the Sidebar messages can be aggregated and responded to in a sidebar, the use of Sidebars can help to avoid or minimize Base channel clutter.

In this example, this date and time specification shown in FIG. 49(1387) serves a dual purpose by defining both Sidebar Rules and Group Wave (2) Rules. In this example, in addition to the aforementioned Group Wave Rules, specification of a date and time also defines a Sidebar Rule which will cause the Sidebar to be posted to a crawl and pinned to the top of a user's display, of the base channel, at the time specified.

FIGS. 50-54 show a display from the point of view of User Sarah.

Figure 50:
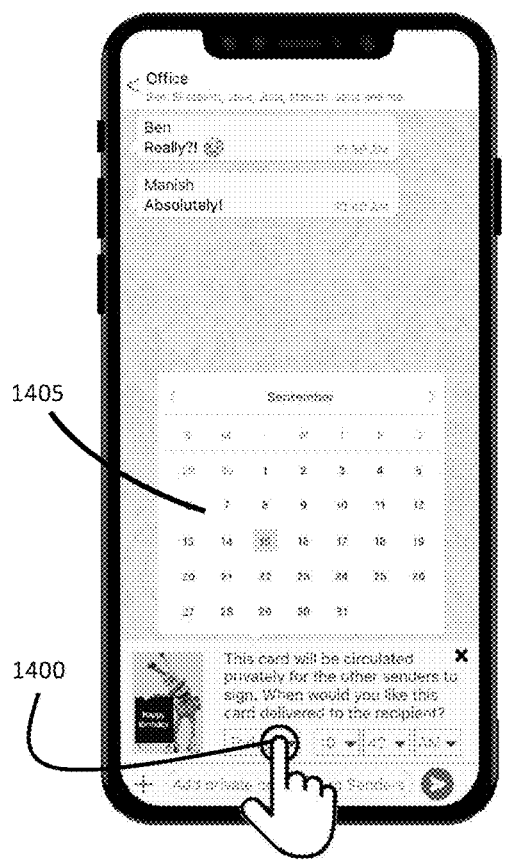
Figure 51:
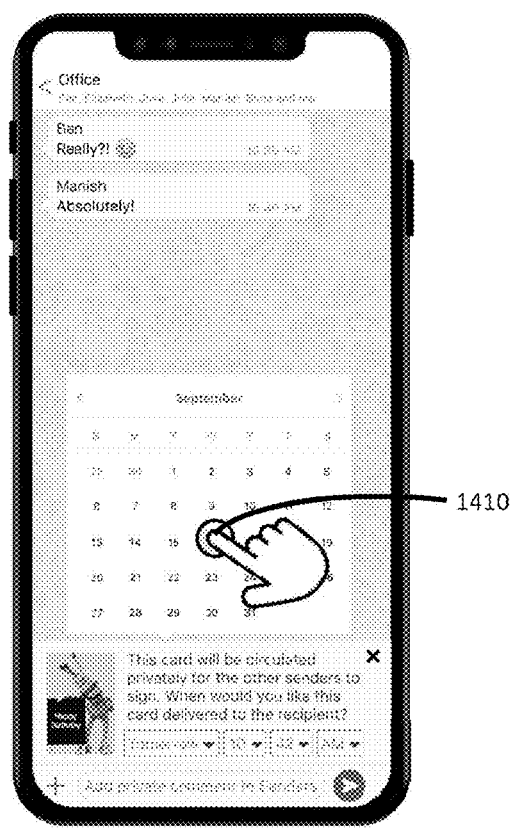

In this exemplary embodiment, tapping on Date FIG. 50 (1400) causes a selection calendar to appear (1405). FIG. 51 (1410) shows that User Sarah has changed the specified date from the default date shown in FIG. 50 (1405) to September 16$^{th}$ (which is "tomorrow" in this example). In this example the current date and time are shown by default. If the date/time are not modified (and if there are no further rules defined) then the associated Group Wave (Group Wave (2) in this example) will be added simultaneously with the completion of the card creating process.

Figure 52:
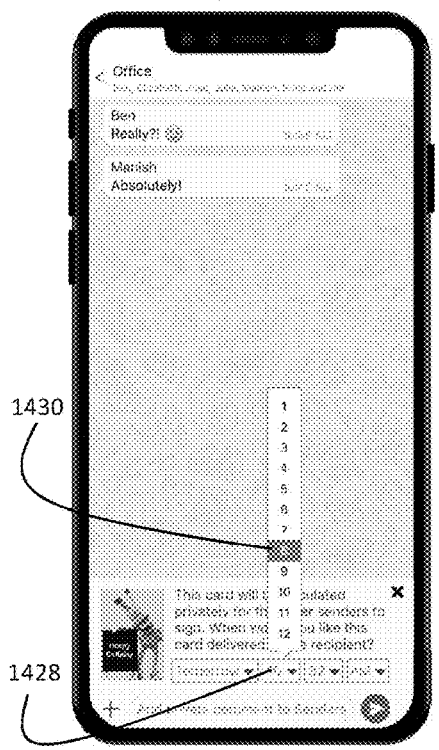
Figure 53:
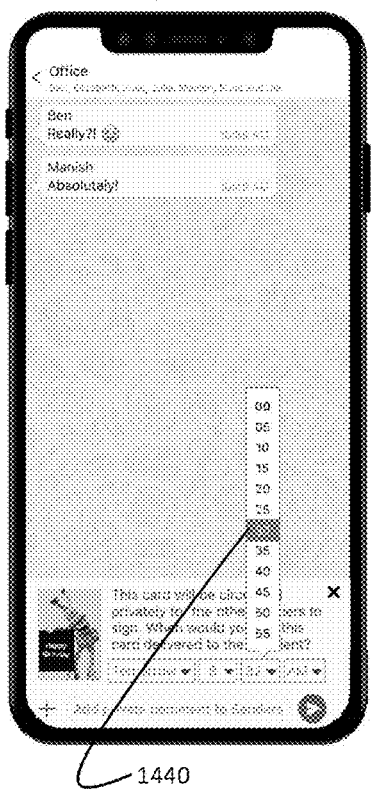

In this exemplary embodiment, tapping on Hour FIG. 52 (1428) causes an hour selection menu to appear. FIG. 52 (1430) shows that user Sarah has selected "8". FIG. 53 (1440) shows that User Sarah has selected minutes after the hour as "30".

Figure 54:
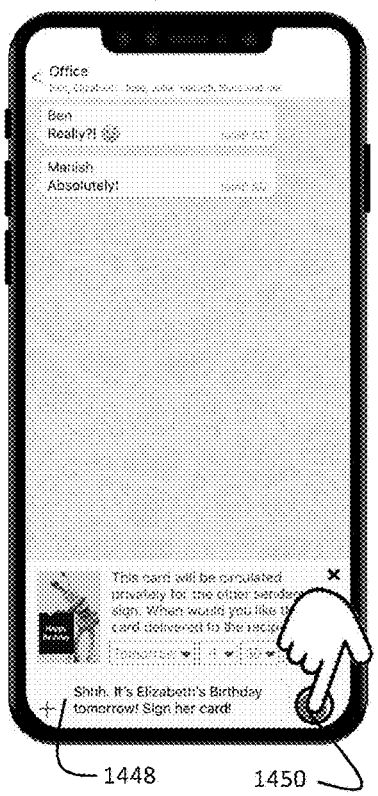

FIG. 54 (1448). The Sidebar Creator (Sarah) added an optional private comment that will be sent to Group Wave 2 members simultaneous with the sending of the Inclusion Notification Message.

Figure 55:
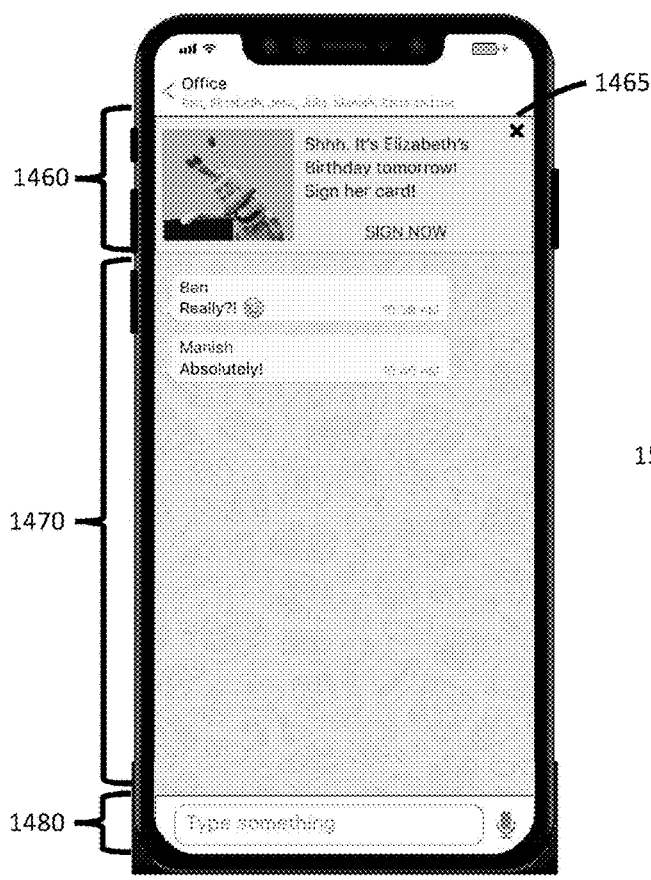

FIG. 54 tapping the send icon (1450) in this example, causes the screen shown as FIG. 55, 115B and 115C to be displayed.

Base channel user views are asymmetric and can vary depending upon which user account is being viewed.

FIG. 55 shows a display from the point of view of User Sarah (Group Wave 1) (Card creator, Sender).

Figure 56:
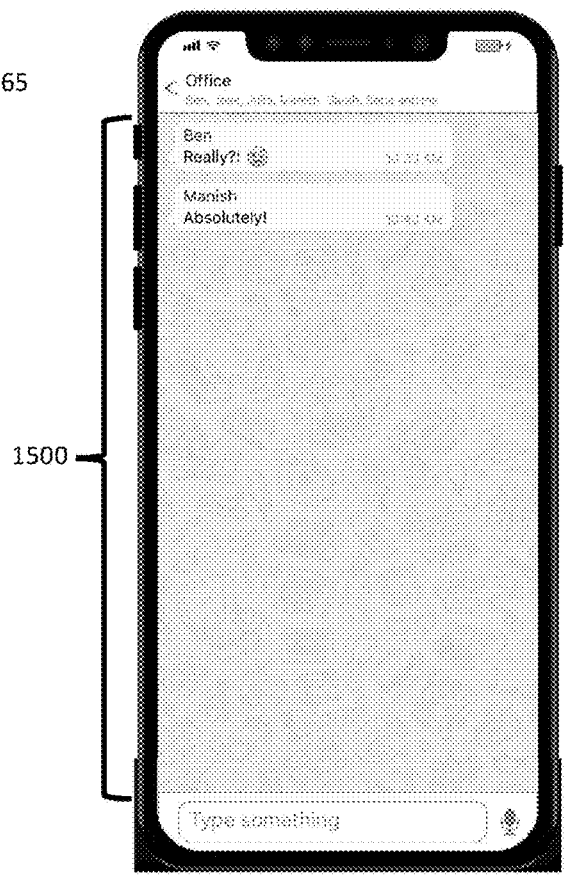

FIG. 56 shows a display from the point of view of Group Wave (2) Members (only User Elizabeth in this example) In this example Group Wave (2) is the Terminal Group Wave. This exemplary embodiment shows that user Elizabeth has not yet been given access to the Sidebar (which means the conditions have not yet been met that would trigger the joining of Group Wave (2) to the Sidebar). In this example, only Group Wave (1) members have already received a notification of their inclusion in the sidebar, as shown in FIG. 55 (1465). The fact that a private Sidebar Inclusion Notification message and an associated private comment have been posted to Group Wave (1) members is unknown to Elizabeth (1500).

Figure 57:
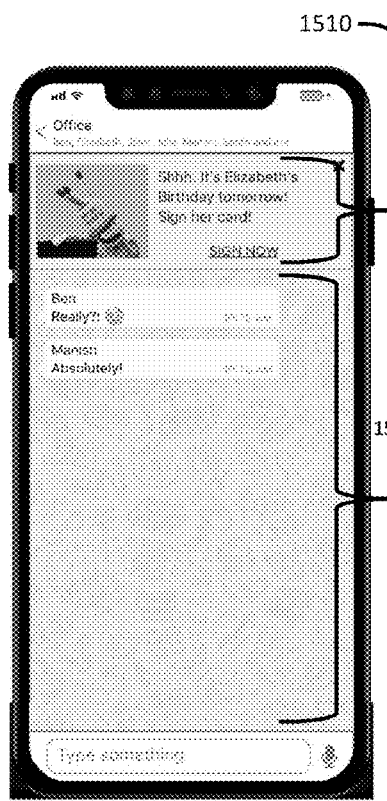

FIG. 57 shows a display from the point of view of User Sona (Group Wave 1) (Sender)

FIG. 55 shows a display from the point of view of User Sarah (Sidebar Creator and member of Group Wave (1)). In this exemplary embodiment, members of Group Wave (1) receive a private notification of their inclusion in the Sidebar in the Base Channel. In this example, Group Wave (1) members are notified immediately upon the creation of the Card (i.e., the Sidebar) which creation is shown to have occurred in this example when user Sarah tapped the Send icon shown in FIG. 54 (1450).

FIG. 55 (1460). There are many ways to present the Sidebar Inclusion Notification message. It can be displayed within the channel (for example, in chronological order, pinned to location relative to the base channel message stream, as part of a crawl, etc.) or outside of the channel (for example sent to a different channel, emailed, posted to a banner, as part of an out-of-channel crawl, hover, etc.). It can be visible or invisible (for example, known to exist, and accessible, but not overtly indicated). In this exemplary embodiment the Sidebar Inclusion Notification message is posted to a crawl, which crawl is pinned at the top of the Base Channel message stream (1470) and remains positioned at the top of the display even as further messages are posted to the base channel that push preceding messages off the top of the screen.

FIG. 55 (1465). In this exemplary embodiment user Sarah can cause the Sidebar Inclusion Notification message to be dismissed, unpinned or removed from its position at the top of the display. She can do so by tapping on the "x" icon (1465). In this exemplary embodiment an unpinned message remains in the Base Channel message stream and is placed in the chronological order in which it was received relative to the other messages in the Base Channel. In other embodiments various other actions can be taken such as hiding the message altogether, placing it in another channel, collapsing the message or otherwise changing its form, etc.)

FIG. 55 (1480). In this exemplary embodiment, user Sarah may post messages to the Base Channel by typing and/or speaking (1480).

Figure 58:
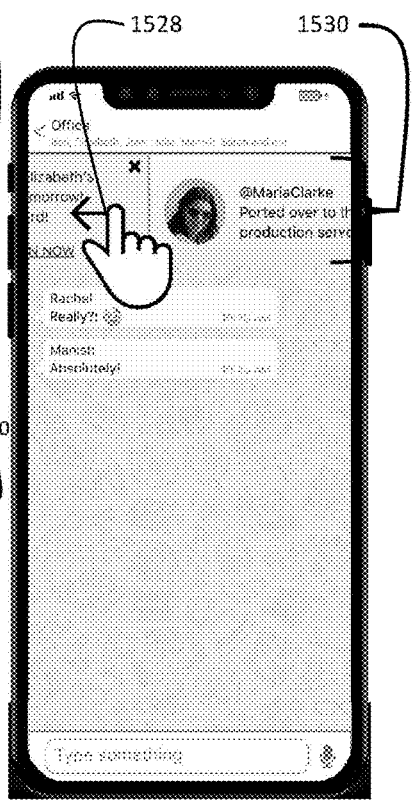
Figure 59:

FIGS. 57-59 show a display from the point of view of User Sona. User Sona was previously selected by the Sidebar Creator (Sarah) to be a member of Group Wave (1))

FIG. 57. In this example the Sidebar Inclusion Notification message is posted to a crawl which crawl is "pinned" to the top of the display. In other words, the Sidebar Inclusion Notification message remains at the top of the display even as further messages are posted to the Base Channel and push preceding messages off the top of the screen. In this example the Pinned Sidebar Proxy message is part of a "crawl" which in some embodiments allows the user to swipe the pinned message to the right or to the left to be replaced with other crawl messages.

FIG. 57 (1515). In this exemplary embodiment the Sidebar Inclusion Notification message includes a prompt "SIGN NOW" (1510) which when selected will cause the display to be updated. In this example, if the user taps "SIGN NOW" a further screen (FIG. 60 in this example) is displayed.

FIG. 58 (1528). In this exemplary embodiment a "Crawl" is an area pinned to the top of the display, which crawl consists of other messages that are also designated to be or are otherwise determined to be associated with the Crawl and pinned to the top of the display. In this exemplary embodiment Sidebar Inclusion Notification messages are posted to the Crawl by default. Other messages associated with the crawl (if any) may be viewed by swiping left or right on a visible crawl message. In some embodiments the crawl messages will cycle, progress or update automatically (i.e., without the user having to swipe or perform an action). In some embodiments the crawl messages relate to a specific channel such as the Base Channel. In other embodiments the crawl can consist of messages/notifications from other channels and/or internal and/or external sources. [Not all embodiments support certain functionality such as Pinning messages or Crawl]

FIG. 59. In this exemplary embodiment, User Sona opts to "sign" the card (i.e., add a message to the "Card" sidebar) by tapping on the text that reads "SIGN NOW" (1540). Tapping on "SIGN NOW" case the screen shown as FIG. 60 to be displayed.

Figure 60:
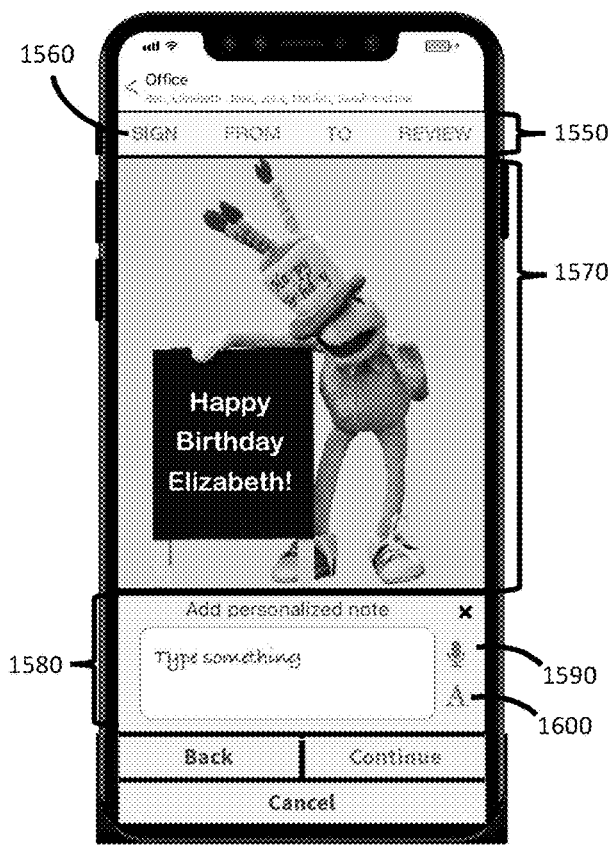
Figure 61:
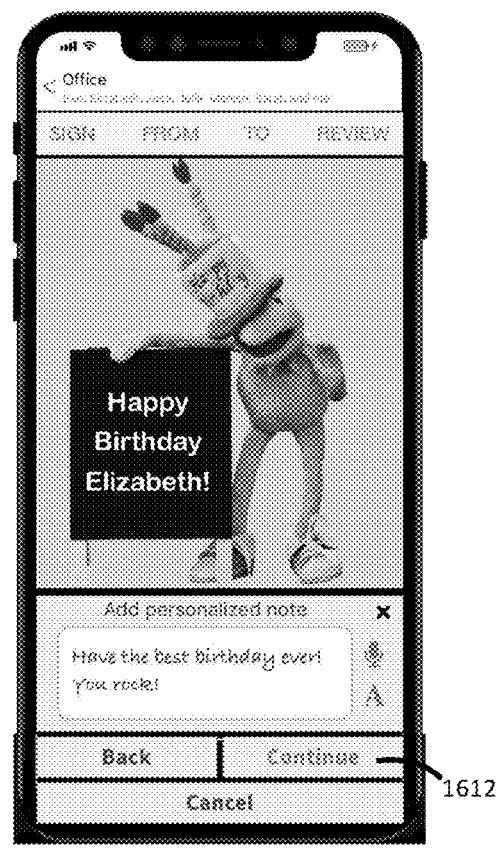

FIGS. 60 and 61 show a display from the point of view of User Sona (Group Wave (1) the "From" Group in this example)

FIG. 60 (1550) shows an optional navigation bar. In this exemplary embodiment the navigation bar indicates where the user is in the process of signing a card (i.e. adding a message to the Sidebar). In this example four steps are displayed: "Sign", "From", "To" and "Review". The step highlighted in Blue indicates the current screen being viewed in the process (1560). In this exemplary embodiment a user could tap on any of the steps to cause the screen to update the display to show that screen related to that step. The number of steps in the navigation bar as well as the descriptions can vary.

FIG. 60 (1570) In this exemplary embodiment the area shown as (1570) displays an image of the card selected by the Sidebar Creator (Sarah).

FIG. 60 (1580) shows that user Sona is afforded the option to add a personal note to the card. In this embodiment of the Birthday Card example, a Sidebar Rule is predefined that allows Group Wave (1) users to view and add messages posted to the Sidebar (Card). In some embodiments the personal note is visible only to specified users and/or or Group Waves.

FIG. 60 (1590) shows a microphone icon to indicate that the user can record a message that will be included in addition to or in lieu of a typed personal note. FIG. 60 (1600) shows a text icon to indicate that the user may select or modify certain attributes of their typed personal note. Other messaging icons may also be optionally made available to the user such as a camera, video camera, paperclip, emoji or sticker to indicate to the user that he/she may attach a photo, a video, attachment, emoji, sticker and/or gif.

FIG. 61 (1612) shows a Continue button which if selected will cause a further screen (or update to the current screen) to be displayed. In this example, tapping "Continue" causes the message to be added to the card (i.e., message to be posted to the Sidebar) and updates User Sona's display to her Base Channel message stream view.

In FIG. 54 the rule specifying the Date/Time that Group Wave (2) would be given access to the Sidebar was defined as [tomorrow] September 16$^{th}$ at 8:30 AM. In FIG. 48 (1360) Elizabeth was specified as the "To" user recipient (the sole Group Wave (2) member). FIG. 62 shows a display from the point of view of User Elizabeth. (Group Wave (2), Terminal Group Wave). This exemplary embodiment shows user Elizabeth's display before 8:30 AM on September 16$^{th}$.

FIG. 63 shows a display from the point of view of Group Wave (2) members (just user Elizabeth in this example).

FIG. 63 (1630) In accordance with the earlier defined rule (FIG. 54), Group Wave (2) member(s) is given access to the Sidebar at 8:30 AM on September 16$^{th}$. In this exemplary embodiment of the Birthday Card use case, a default Group Wave Rule is applied to Group Wave (2) that causes a Sidebar Inclusion Notification message to be posted to the Base Channel (the "Office" channel) in the form and format shown in FIG. 63 (1630). Additional default Group Wave (2) Rules were also applied such as: Sidebar Inclusion Notification visible to everyone in the base channel; Sidebar may be Saved and Sidebar may be viewed.

A Sidebar Inclusion Notification message can be linked to the contents of the Sidebar and can be a comprised of one or more posts and can include text, links, emoji, images, gifs, etc.

In this exemplary embodiment, a set of Group Wave Rules that are part of Group Wave (2) which rules caused a Sidebar Inclusion Message to be posted to the Base Channel at a specified time. However, there are many other actions that could be additionally or alternatively specified to occur in connection with Sidebar Rules, Group Wave Rules or other rules. For example, in some embodiments, an email, SMS or RMS could also or alternatively be caused to be sent to specified Group Wave or non-Group Wave members when certain conditions are met. In some embodiments a weblink could be generated and sent. In some embodiments the Sidebar messages could be printed onto a physical card that approximates the selected birthday card and mailed to specified recipients and/or Group Wave members. In some cases the card could be faxed or exported to a specified file format and sent to specified Group Waves or users or related or unrelated third parties.

FIG. 63 (1640) In this exemplary embodiment Users are presented with the option to view the Card (Sidebar). By tapping on the Text that reads "View" users cause the screen shown as FIG. 64 to be displayed. There are many other forms and formats that could be applied to display the Sidebar Inclusion Notification Message.

FIG. 63 (1650) In this exemplary embodiment a Group Wave Rule was defined as part of Group Wave (2) that described the attributes (such as, format, placement and contents) of the default Sidebar Inclusion Notification message, which, in this example, was based on certain known sidebar attributes (e.g., Birthday Card and Group Wave (2) member names). In some embodiments there is not a default message included and in other embodiments there may be a customized message included.

The form and content of a Sidebar Inclusion Notification message can vary based on certain criteria such as whether it is to be posted to a crawl, statically pinned, shown as a hover, or placed in the Base channel message stream, emailed, time of year, month or day, or user, etc.

FIG. 63 (1660) In this exemplary embodiment Base Channel users are presented with the option to "Save" the Card (Sidebar). In some embodiments only specified users or specified Group Waves, for example, may be offered the option to Save the Card. In this embodiment if a user taps the "Save" text (1660) the Card will be saved to the user's Card Gallery. In other embodiments the card could be saved in other manners and/or to other specified locations. In some embodiments Saved cards are hidden from the base channel. In some embodiments, once saved, the form of the card in the Base channel or elsewhere is modified. In some embodiments Cards (Sidebars) are automatically saved, aggregated, tagged and/or made to be uniquely identifiable.

Figure 64:
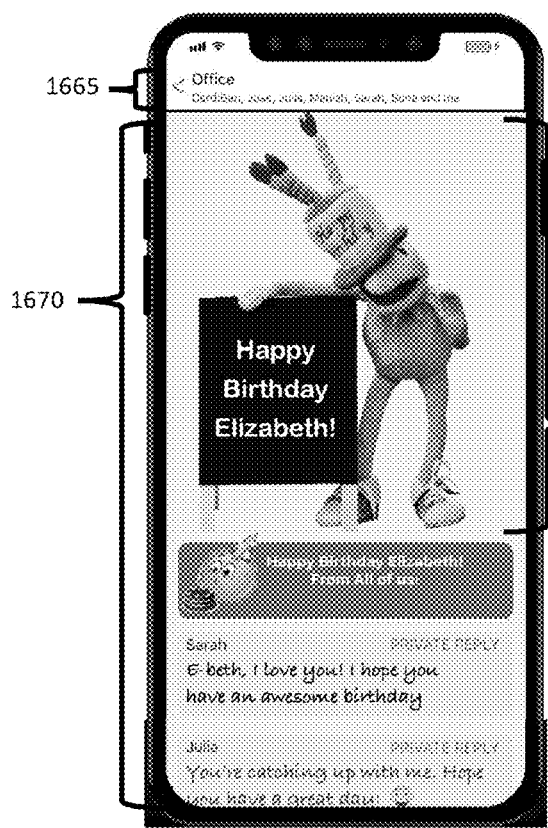
Figure 65:
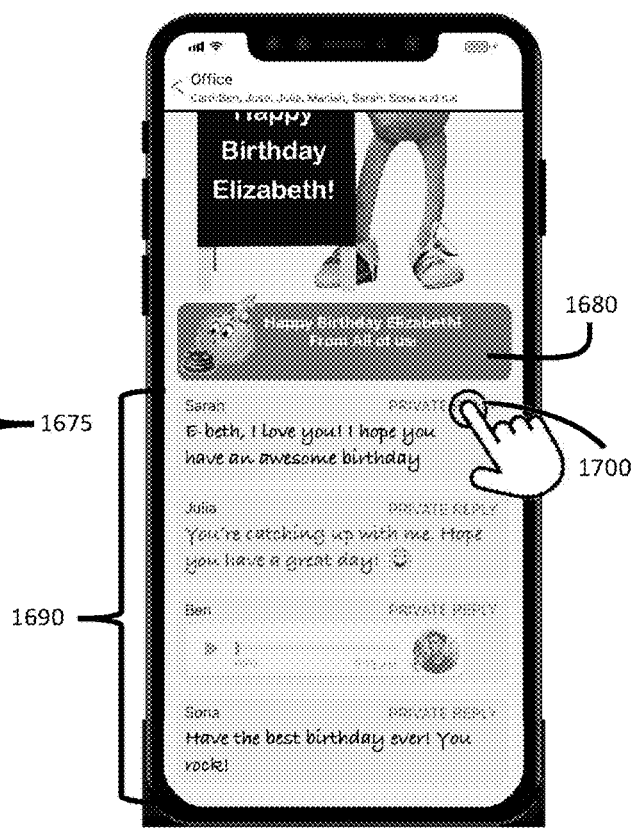

FIG. 64 and FIG. 65 show a display from the point of view of User Elizabeth (Group Wave (2), Terminal Group, "To", Card Recipient)

FIG. 64. In this exemplary embodiment, tapping "View" as shown in FIG. 63 (1640) causes the screen shown in FIG. 64 to be displayed. In this exemplary embodiment FIG. 64 the top of the display (1665) is updated to assist the user with navigational orientation. In this example the Base Channel ("Office") is identified. In addition, text is displayed below the Base Channel name that reads "Card:Ben, Jose, Julia, Manish, Sarah, Sona and me". The text is exemplary and is optionally presented. In some embodiments other text, emojis, links, images, etc. could be presented. In this example the word "Card" is displayed to indicate that the user is viewing a Sidebar of a type "Card".

FIG. 64 and FIG. 65. In this exemplary embodiment, the Card (Sidebar) is presented with an image of the selected Birthday card [FIG. 64 (1675)] under which is an optional system generated Happy Birthday message [FIG. 65 (1680)], under which are the personal messages posted by the preceding authorized Group Wave members [FIG. 65 (1690)].

FIG. 65 (1680) In this exemplary embodiment a Group Wave Rule has been defined as part of Group Wave (2) such that immediately upon the access of Group Wave (2) members to the Sidebar, a generic message is posted to the Sidebar with the contents and attributes shown in this example. The system generated message can include text, images, sound and/or other media. The message can be formatted and presented in many different ways, for example in some embodiments a festive graphic could be accompanied by the sound of fireworks. The message can be static, dynamic e.g., animated). The message can vary based on application coding. The message can be predefined or dynamically generated. The message could be sourced locally or remotely. The message can be different for each user. The message can be different each time a particular user views it. In some embodiments a generic message is not provided. In some embodiments a message is conditionally displayed.

FIG. 65. In this exemplary embodiment, FIG. 65 shows that the sidebar is scrollable to allow viewing of messages that extend above or below the top or the bottom of the visible display.

FIG. 65. In this exemplary embodiment only the recipient of the Card (Group Wave (2) members) can reply to a personal message. Only Elizabeth, in this example, is provided with the option to "Private Reply" FIG. 65 (1700). In some embodiments the option to Reply is not offered. In some embodiments anyone or selected users can post further messages in the Sidebar.

FIG. 66 and FIG. 67 show a display from the point of view of User Elizabeth (Group Wave (2)). In this exemplary embodiment a Group Wave rule is defined such that Group Wave (2) participants are permitted to reply privately to messages posted in a parent Sidebar. In other words, Nested Sidebars are permitted.

In this embodiment, user Elizabeth (Group Wave (2)) taps on "PRIVATE REPLY" as shown in FIG. 65 (1700) to initiate a further private interaction between herself and Sarah (a member of Group Wave (1)). Tapping on "PRIVATE REPLY" causes the screen shown in FIG. 66 to be displayed. There are many ways to present a Nested Sidebar and FIG. 66 presents just one possible approach. FIG. 66 (1720) shows an area that aggregates and displays the messages associated with the Nested Sidebar. In this exemplary embodiment a partially transparent image of the selected card appears beneath the messages. In this exemplary embodiment the top of the display FIG. 66 (1710) is updated to assist the user with navigational orientation. In this example the Base Channel ("Office") is identified. In addition, text is displayed below the Base Channel name that reads "Card>Private:Ben, Jose, Julia, Manish, Sarah, Sona and me". The text is exemplary and is optionally presented and intended to convey to the user that she is viewing a Nested Sidebar consisting of participants "Sarah and me" which Nested Sidebar is subsidiary to the Card sidebar, which Card Sidebar is associated with the Base Channel "Office". In some embodiments no or other text, emojis, links, images, etc. could be presented.

FIG. 66 (1745) shows an exemplary display of a Nested Sidebar. A Sidebar within a Sidebar. An optional indication serves to inform user Elizabeth that she is Replying Privately and that the Private response will be visible only to user Sarah.

FIG. 66 (1730) shows a text entry area that has been optionally modified to further indicate to the user that any message entered will be "Private" and visible only to herself and to Sarah (the author of the message that is being replied to. In this example, Sarah's message, the message being replied to, (1748) is referred to as a "Further Anchor Message" because it forms the basis of and is the foundational message of the Nested Sidebar. In this example text is added immediately above the Text Entry bar that reads "Private Reply to Sarah". In addition, in this example, the text entry bar is modified to contrast with a the messaging system's general purpose text entry bar—in this case the private message text entry bar is presented with white text on a dark background in contrast with the usual dark text on a white background. FIG. 66 (1740) also shows an optional navigation bar which in this exemplary embodiment includes the option to return to a previous display of the Card or the option to select "Done" which would cause the display to be further updated.

FIG. 67 (1750) shows the message stream associated with the Nested Sidebar. The messages exchanged and associated with this Nested Sidebar are private messages visible only to the Nested Sidebar participants (Sarah and Elizabeth in this example).

FIG. 67 (1760) shows an optional navigation bar which in this exemplary embodiment includes the option to return to a previous display of the Card (1760) or the option to select "Done" which would cause the display to be further updated. FIG. 67 (1760) shows user Elizabeth tapped "<Card", which causes "sends" the user back to a previous display of the Sidebar (FIG. 68), which Sidebar includes all of the messages associated with the Card Sidebar.

Figure 68:
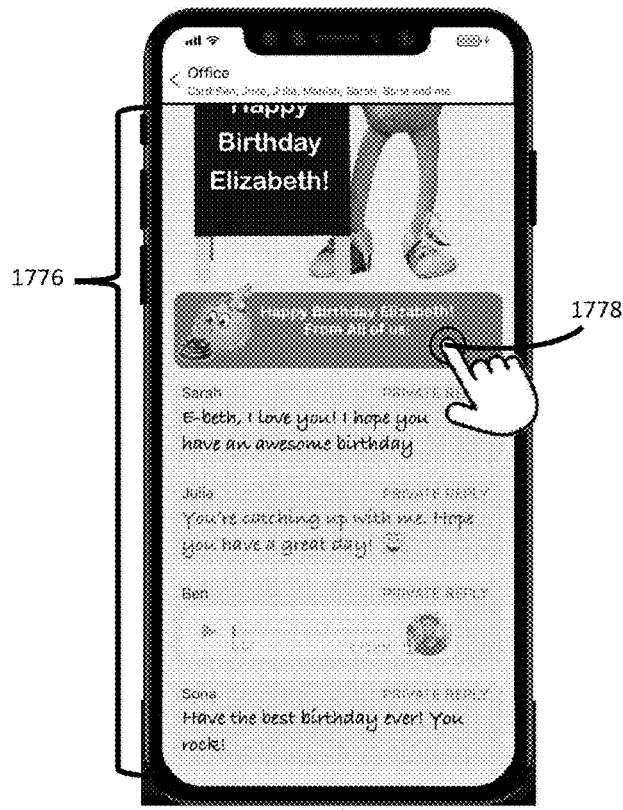
Figure 69:

FIG. 68 and FIG. 69 show a display from the point of view of Group Wave (2) Sidebar participant Elizabeth.

FIG. 68. In this example, Group Wave (2) user Elizabeth taps on "REPLY TO ALL" text (1778) displayed with the system generated message in order to Reply to All messages posted in the Sidebar (Card). In this example, tapping the REPLY TO ALL updates the display and isolates the system generated message, however this is just one example of how to initiate and effectuate a REPLY TO ALL. In other embodiments the system generated message may not include "REPLY TO ALL" or similar text and the user may simply type a response in the text entry box. In some embodiments no text entry box is presented or required.

In this exemplary embodiment FIG. 69 the top of the display (1780) is updated to assist the user with navigational orientation. In this example the Base Channel ("Office") is identified. In addition, text is displayed below the Base Channel name that reads "Card>All:Ben, Jose, Julia, Manish, Sarah, Sona and me". The text is exemplary and is optionally presented and intended to convey to the user that she is viewing a Nested Sidebar consisting of participants "Ben, Jose, Julia, Manish, Sarah, Sona and me" which happens to represent the plurality of users in the Bae Channel, which Nested Sidebar is subsidiary to the Card sidebar, which Card Sidebar is associated with the Base Channel "Office".

FIG. 69 (1782) shows a "Further Anchor Message" (1782). In this example the Further Anchor message is the generic Happy Birthday message included automatically by the system. Any message entered by Elizabeth will be posted and visible to "All" in the Nested Sidebar. In some embodiments, and under certain conditions, responses to certain sidebar and nested sidebar messages, such as a generic anchor message, are also or optionally exclusively posted in the Base Channel, and/or parent Sidebar and can be optionally visible to all or certain Users.

Figure 70:
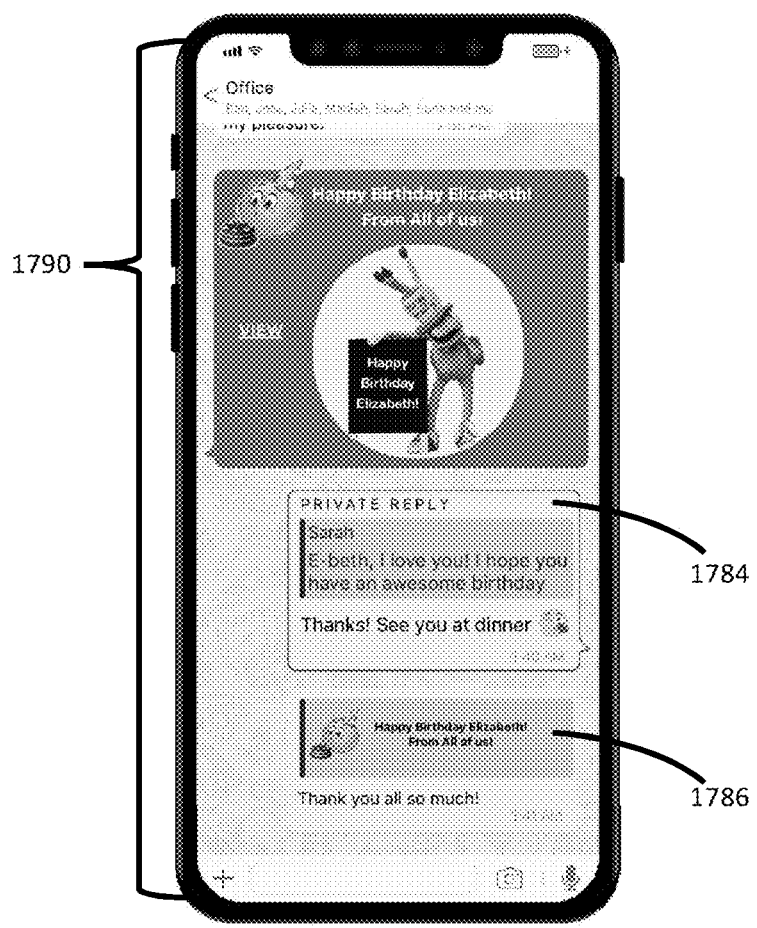

FIG. 70 shows a display from the point of view of User Elizabeth.

FIG. 70. In this exemplary embodiment messages that Elizabeth (Terminal Group Wave) posted to a Sidebar also appear in the associated Base Channel message stream ("Office" channel). Sidebar messages posted in the Base Channel stream can be presented in such a way as to convey to user Elizabeth that the messages are Private and/or are associated with a Sidebar. Sidebar messages posted to a Base Channel are visible only to the sidebar participants and/or other selected or identified users.

Figure 71:
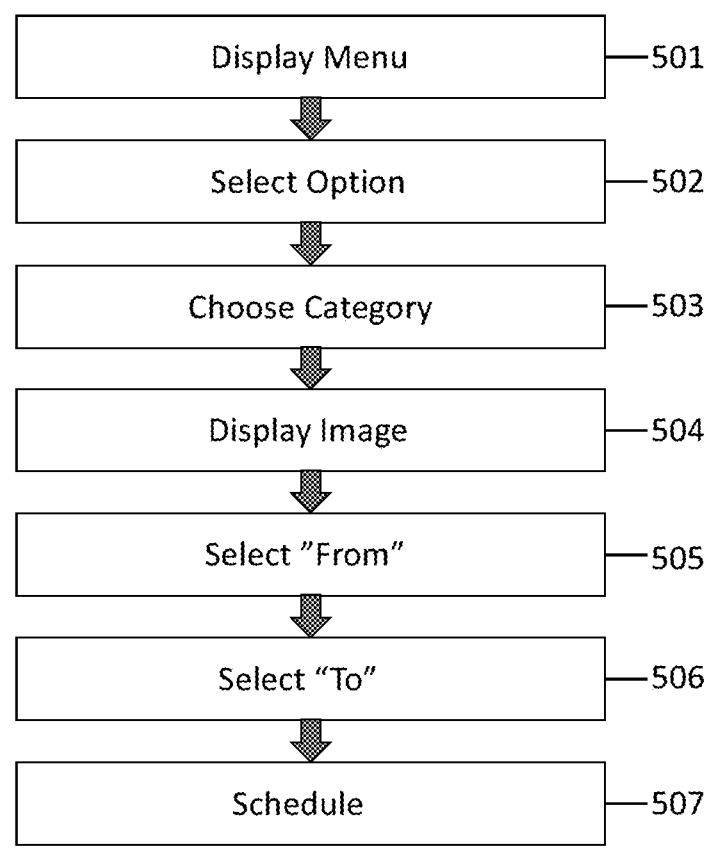
FIG. 71 is a flow chart diagram that illustrates an exemplary embodiment of the present invention.

FIG. 71 is a flow chart diagram that illustrates an exemplary embodiment of the present invention. At step 501, the menu is displayed. At step 502, an option is selected. At step 503, a category is chosen. At step 504, an image is displayed. In one example, the image is chosen from a plurality of available images. At step 505, the "from" is selected. At step 506, the "to" is selected. At step 506, delivery (or availability) of a message is scheduled.

FIG. 72 and FIG. 73 show a display from the point of view of User Sarah in the group channel named Office (918).

FIG. 72 (920) shows user Sarah tapping on an icon in order to cause the display of a menu, which menu is shown in FIG. 73 (923). In this embodiment user Sarah taps on an icon shown in FIG. 72 (920) which causes a menu consisting of further options to be presented. In other embodiments no further menu is necessarily presented and the initial tap/selection itself could cause a further action to occur directly. In some embodiments other forms of selection could be applied such as verbal commands or use of acceleration detectors used to cause an action (e.g., shaking a device).

FIG. 73 shows that user Sarah taps on the option named "Cards" (925). By tapping on "Cards", user Sarah causes a further menu to appear. In this embodiment, the menu consists of categories of types of cards. This embodiment uses cards as an example, but many different or additional options could be added or substituted such as petitions, other types of documents, lunch menus, schedules, etc. In this embodiment the user taps on Cards (924) to cause a further selection menu to appear. In some embodiments no further menu is necessary and the tap is the selection in the first instance. For example, the menu depicted by (923) could consist of a scrollable display of images of many different types of cards, and the selection of the card could take place at this step without requiring an additional menu.

FIG. 74 shows a display from the point of view of User Sarah in the group channel named Office.

In this embodiment, user Sarah is presented with a choice of card categories (925) such as Birthday cards, Congratulations cards, Thank you cards, Happy anniversary cards and Gift cards. In other embodiments other categories could be offered. In this example, Sarah selects Birthday cards by tapping on an area associated with the words "Happy Birthday" which, in this example, appears on the display (926). In other embodiments the selection menu (925) may appear in a different form, or not at all.

FIGS. 74, 75, 76 and 77 show a display from the point of view of User Sarah in the group channel named Office.

In this embodiment, as a result of selecting Birthday cards, user Sarah is presented with an image of a birthday card. In other embodiments other methods of presenting birthday cards could be utilized. For example, in some embodiments, multiple images could be presented at once, or in another embodiment a text list of cards could presented and combined with gifs. In addition the format and placement of the text/image/media corresponding to a card/the cards can vary. In some embodiments the birthday cards could be listed as text. In some embodiments links to external or other sources could be utilized. In some embodiments representations of the card options may be in the form of music, video, images, gifs, stickers, text and/or any combination thereof.

In some embodiments different cards could be presented. In some embodiments the options could be filtered or sorted differently. In some embodiments the type, quality (e.g., resolution), quantity, medium (e.g., audio, video), availability or other attributes of the cards will vary. For example, one user within a channel may purchase a set of cards that only he can select. In another example, the order of the cards will be presented based on popularity of the card or by users known preferences. In some embodiments all users in a channel will have the same choices, but in other embodiments the users can have respectively different choices. In some embodiments users can design and/or create their own card.

This embodiment envisions a multi-level selection process. First, a user selects a category. Then the user selects a card from within that category. However, in other embodiments there may be fewer or more levels and/or sub-levels.

Figure 75:
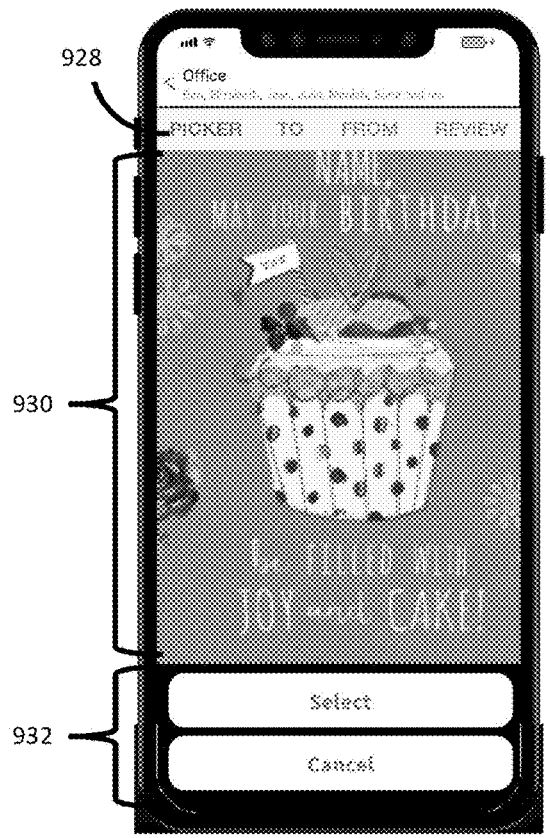

In this embodiment, as a result of selecting "Birthday cards", user Sarah is presented with a first image of a birthday card FIG. 75 (930).

Figure 76:
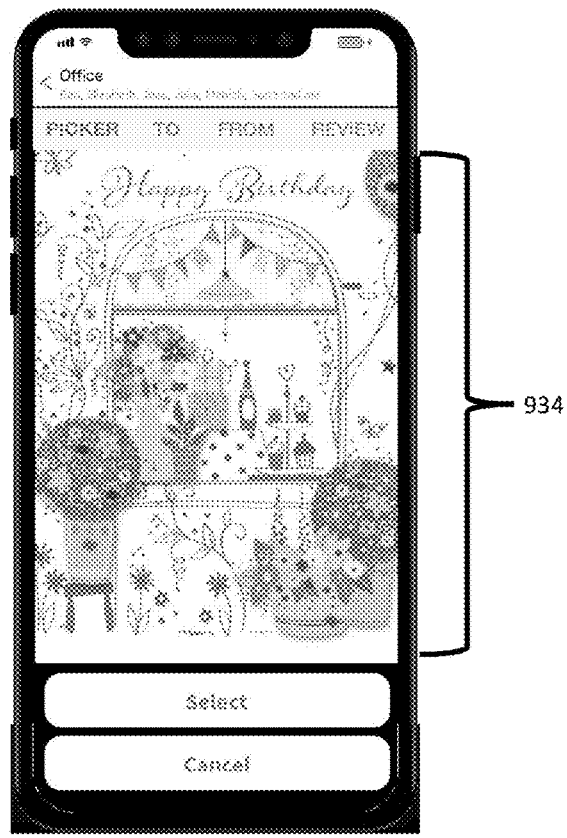

By swiping on the image of the card from right to left, she is presented with a next image of a different birthday card FIG. 76 (934).

Figure 77:
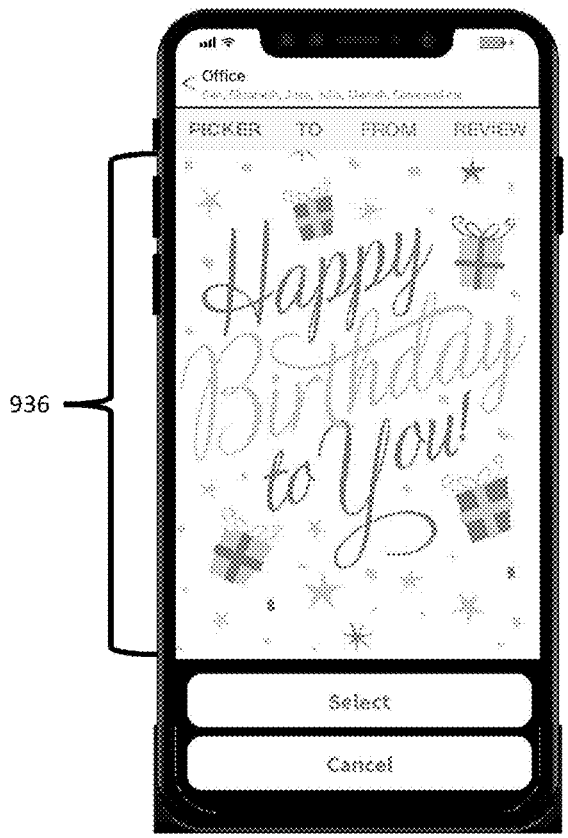
Figure 78:
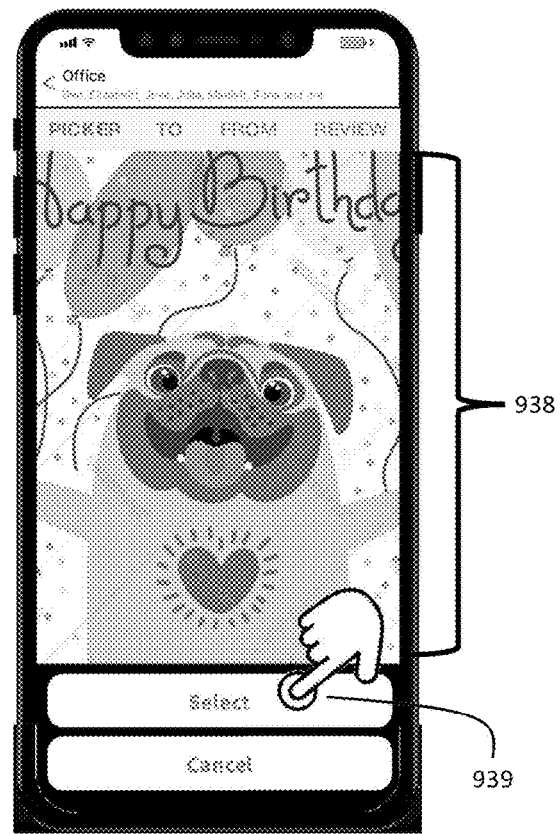

In this example, user Sarah may continue to swipe from right to left to reveal further images of further birthday card options FIG. 77 (936) and FIG. 78 (938).

By swiping, in the opposite direction, from left to right, in this example, user Sarah can return and view a previous card.

In this embodiment, we describe swiping as the method by which user Sarah moves between card options, however in other embodiments various other navigation approaches could be utilized. In some embodiments, such as an embodiment where all of the choices are presented together, navigation between screen may be unnecessary. In some environments other methods such as voice commands could be utilized.

In this embodiment we show that user Sarah, herself, selects the card that will be sent to the selected recipient/s. In other embodiments more than one user may have a say in which card is selected and sent.

FIG. 78 (939) shows that user Sarah has selected a birthday card (938).

Figure 79:
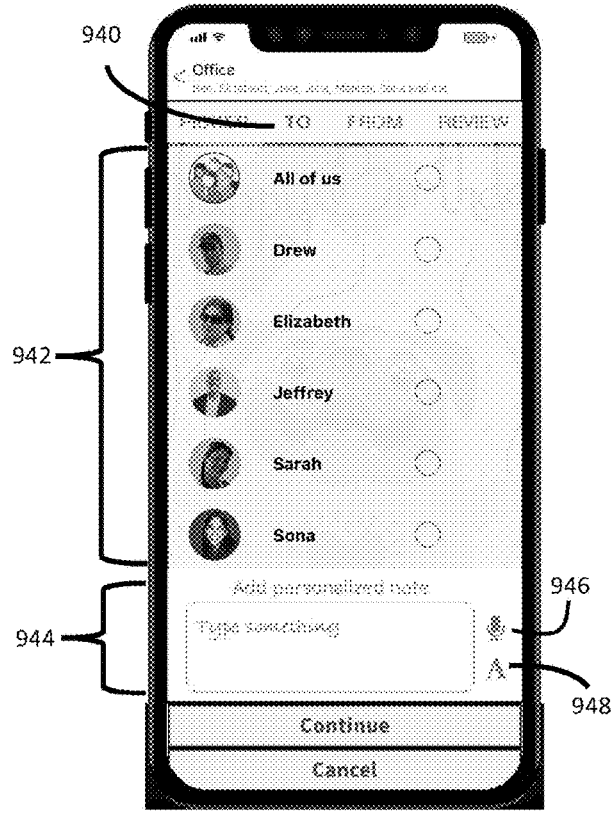

FIG. 79 shows a display from the point of view of User Sarah in the group channel named Office.

In the example shown here, selecting a card as shown in FIG. 78 (938) causes a "To" screen to appear as shown in FIG. 79. The "To" screen is used by the user to identify the intended recipient or recipients of the card. This embodiment uses "Cards" as an example, but many other types and forms of "things" could be substituted for cards such as petitions, documents and other forms and types of communications where a user or users are selected to receive the thing, but only after the thing has first been privately reviewed and possibly acted upon (e.g., notes added) by selected others. In some embodiments the intended recipient is also part of the selected group of users who review the thing before it is ultimately sent to the selected recipients. For example, a document is circulated to a subset of users in a group which subset includes one of the ultimate recipients of the reviewed and commented upon item. For example, a subset of users in a channel privately collaborate on a document within a channel, which document is ultimately posted to "everyone" within the channel. In some embodiments there is a delay between the time that a [card] is sent to a subset of "senders" and the time the [card] is acted upon and ultimately sent/posted to the selected recipients. In some embodiments there is no delay between the time that the "senders" are selected and the [card] is sent to the intended recipient/s. For example, if Sarah wants to send a birthday card to Elizabeth from herself, Julie and Drew . . . but doesn't wish to allow Julie or Drew to add a comment, she could elect to do so.

FIG. 79 (940) shows the progress bar. In this embodiment there are four steps that can be followed. "Picker" is the step where a card is selected. "To" is the step where the intended recipient/s are selected, and a personal message is optionally added. "From" is the step where the intended "senders" are selected. "Review" is the step where a private note to the senders is optionally added. It is also where a delivery date and time is optionally defined. In this embodiment, the card will be posted immediately if not overridden by a scheduled date and time selection.

FIG. 79 (942) shows a scrollable list of users in the Office cannel. In other embodiments the list could include other entire channels and/or subsets thereof. If some embodiments the recipient can include people or bots external to the messaging system. For example, the plurality of users in the Office channel could send a card to or that includes a third party (or parties) via email, SMS, RCS, etc. This example shows a scrollable list but there are many other ways that the list could be perused and/or acted upon, including for example voice commands and other gestures or navigation and/or selection options.

FIG. 79 (944) shows an optional "Add personalized note" entry box. In this embodiment the person selecting the card is provided with an option to add a personal note to the intended recipient/s of the card. In this example a "handwriting" font is implemented as the default font in an attempt to make the note feel more personal. In this example the user can change the font or font format (948) and/or can add an audio message (946).

Figure 80:
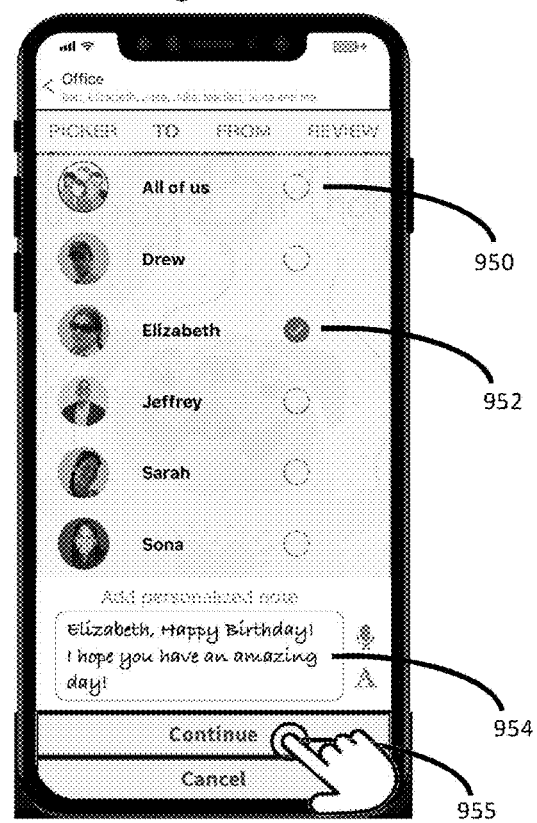

FIG. 80 shows a display from the point of view of User Sarah in the group channel named Office.

FIG. 80 (952) shows that user Elizabeth has been selected as the recipient of the card.

FIG. 80 (950) shows that "all of us" can be optionally selected. If this selection is made then the card will be "To: All of Us" i.e., to the plurality of users in the channel. There are many scenarios for when this option would be desirable, for example, if a subset of the channel wished to send a note of congratulations for a great year to everyone in the channel. In that example, perhaps a subset of users in a channel wish a create a card from the subset of users but wish it to be posted for all to see.

FIG. 80 (952) shows that user Sarah has selected Elizabeth as the intended recipient of the card.

FIG. 80 (954) shows that Sarah has added a personalized note to the card.

FIG. 80 (955) shows that Sarah has finished selecting the card recipient and has added a personalized note. By tapping on (955) she is choosing to Continue to the next step.

FIG. 81 shows a display from the point of view of User Sarah in the group channel named Office.

FIG. 81 (956) In this embodiment there are four steps that can be followed.

"Picker" is the step where a card is selected. "To" is the step where the intended recipient/s are selected, and a personal message is optionally added. "From" is the step where the intended "senders" are selected. "Review" is the step where a private note to the senders is optionally added. It is also where a delivery date and time is optionally defined. FIG. 81 (956) indicates that the user is at the "FROM" step. In some embodiments the user can navigate between steps by selecting an area associated with a particular step. This embodiment shows four steps. Other embodiments may have fewer or more steps.

FIG. 81 (958) shows a scrollable list of users in the Office cannel. In other embodiments the list could include other entire channels and/or subsets thereof. If some embodiments the senders can include people or bots external to the messaging system. For example, a card could be sent from a group that includes a third party (or parties). This example shows a scrollable list but there are many other ways that the list could be perused and/or acted upon, including for example voice commands and other gestures or navigation and/or selection options.

FIG. 81 (962) shows that the check box for Elizabeth has been "grayed out" in order to discourage selection. In this embodiment the system assumes that the senders don't wish to accidentally inform Elizabeth of her card before it has been reviewed and "signed" by everyone. The system, in this embodiment, therefore, based on the use case, grays out the recipient's checkbox to help the sender (Sarah in this case) avoid accidentally including Elizabeth. Since there are times when the user may wish to override the system's suggestion, there can be embodiments where the user can still tap on the grayed-out checkbox in order to select it.

FIG. 81 (966) shows an example of an unselected checkbox. This embodiment shows sender selection by checkbox however, many other approaches to sender selection can be applied.

FIG. 82 shows a display from the point of view of User Sarah in the group channel named Office.

FIG. 82 (968) shows that "all of us" can be (and has been) optionally selected. The card will therefore be "From: All of Us". "From all of us" in this exemplary embodiment excludes Elizabeth (the intended card recipient) as indicated by the grayed-out checkbox. FIG. 82 (970) in this exemplary embodiment, once and if "All of us" is selected, the system indicates that condition by showing a dimmed icon of a selected checkbox next to each user's name. This exemplary embodiment identifies users with an avatar and associated username. In other embodiments users can be identified in different ways, for example by an alias, phone number or other identifying attribute. In some embodiments classes or groups can augment or replace individual users. For example, a card sent from the Sales team and the Marketing team to the Customer Care team.

FIG. 82 (972) shows that Sarah has finished selecting the card "senders" (i.e., FROM). By tapping on (955) she is choosing to Continue to the next step.

In this exemplary embodiment a user selects a card and specifies the recipient/s of the card. Then the user who picked the card selects who the senders (FROM) users. In some embodiments the FROM step may be eliminated, skipped or ignored, for example in cases where the system is set-up to always assume that a card is from everyone in the channel. Likewise, in some embodiments the "TO" step could be eliminated, skipped or ignored. For example, in a case where the messaging system was being used mostly for sub-channel collaboration, where maintaining a system of record within the context of the greater channel is important, before sharing the document with everyone in the channel.

Figure 83:
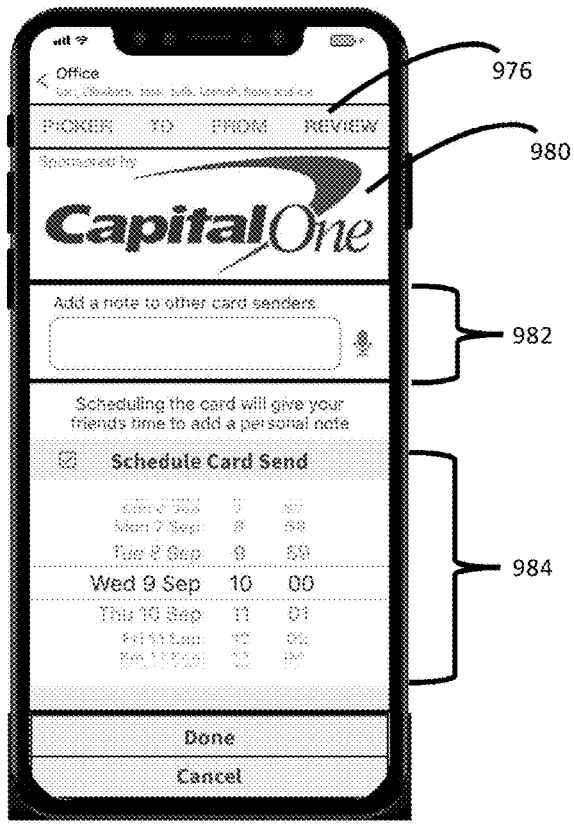

FIG. 83 shows a display from the point of view of User Sarah in the group channel named Office.

FIG. 83 (972) In this embodiment there are four steps that can be followed. "Picker" is the step where a card is selected. "To" is the step where the intended recipient/s are selected, and a personal message optionally added. "From" is the step where the intended "senders" are selected. "Review" is the step where a private note to the senders is optionally added. It is also where a delivery date and time is optionally defined. FIG. 83 (976) indicates that the user is at the "REVIEW" step. In some embodiments the user can navigate between steps by selecting an area associated with a particular step. This embodiment shows four steps. Other embodiments may have fewer or more steps.

FIG. 83 (980) In this embodiment we show an ad that has been included on the display.

FIG. 83 (982) shows an optional area for the card picker to add a comment or "cover note" that will be sent to the selected senders. A cover note can be useful in that it can be used to introduce the card to other individuals who have been selected to be part of the FROM (senders) group. For example, if a user wanted to send a congratulations card to someone, and wanted the card to be from everyone in the channel, it could be useful if the selected Senders had a cover note from the card picker that gave some background and a reason the card was being sent to a/the recipient/s. e.g., "Hey all, Tom has been doing a great job all year and I wanted to send him this card to let him know how much we all appreciate him and the jobs he's doing."

Figure 84:
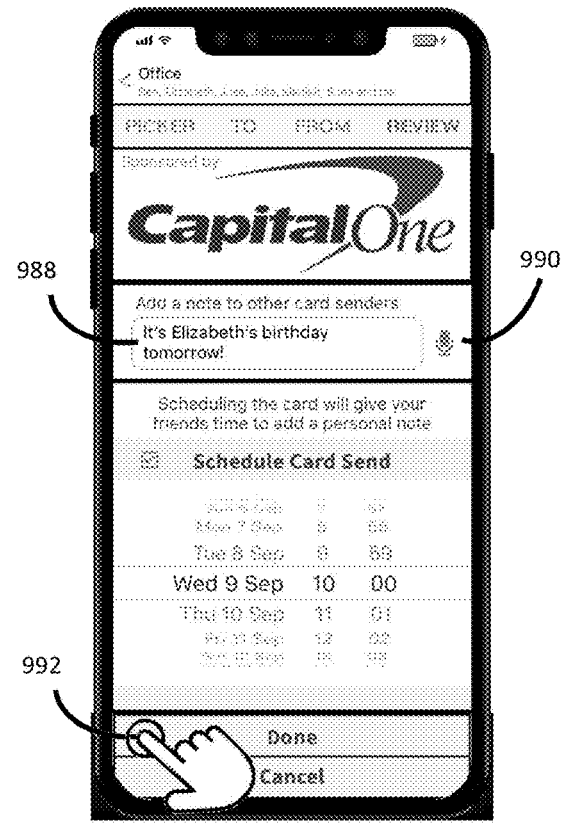

FIG. 83 (984) In this embodiment, the card picker (i.e. the person or bot selecting the card) is optionally given the ability to select a date and time in the future that the card will be sent. This can be an extremely important capability because by choosing a time in the future, it allows time for the Senders to review the card and add a note. In cases where the card is being sent from the card picker alone, it allows the user to pick and "sign" a card at a convenient time and schedule the card to be sent at an appointed time in the future. In this embodiment, the default date and time shown when a user arrives at this screen (FIG. 83) will be the current date and time. If the card picker/sender chooses not to change the date/time scheduler, then the card will be sent immediately when the user taps "Done" as shown in FIG. 84 (992). In this embodiment, if the card is sent without the date/time being adjusted it will be sent to the selected recipient/s without additional personal notes from the other senders. In some embodiments the card is considered "closed" and will not allow for comments to be added subsequent to the card being sent. In other embodiments users are able to continue to add comments to the card even after it has been sent, which in this example, is like a sidebar or sub-channel. In this example, sidebar participants would continue to be able to interact and carry on messaging as a sidebar conversation.

FIG. 84 (988) shows an optional area for the card picker to add a comment or "cover note" that will be sent to the selected senders. In this example, Sarah has added a cover note that her selected FROM users (i.e., Senders) will see. The cover note will orient the other SENDERS. A cover note can be useful in that it can be used to introduce the card to other individuals who have been selected to be part of the FROM (senders) group. In this example, Sarah types a cover note that says "It's Elizabeth's birthday tomorrow!". The selected SENDERS will receive the card along with Sarah's useful context orienting note.

FIG. 84 (990) shows an icon representing a microphone. In this exemplary embodiment, this icon is used to indicate to the user that he/she may tap on it in order to speak a message that will be recorded. In some embodiments additional and/or other forms of input such as a camera, video camera, sticker icon, emoji icon, and/or an icon to indicate that files may be attached can be provided.

FIG. 84 (992) shows that user Sarah has updated the display to her satisfaction and is Done. By clicking on "Done" (992) she completes the Card Picker/To/From and Review steps and causes the messaging system to send the card to the selected SENDERS for their review and possible further action. In this embodiment, once the card picker presses "DONE" the "To" and "From" user selections are unalterable. In other embodiments the card picker may be able to modify the TO, FROM and/or other attributes and/or selections of the card even after the card has been sent. In some embodiments that card picker (or other users) could delete or edit attributes of or relating to the card before [or after] it has been sent.

Figure 85:
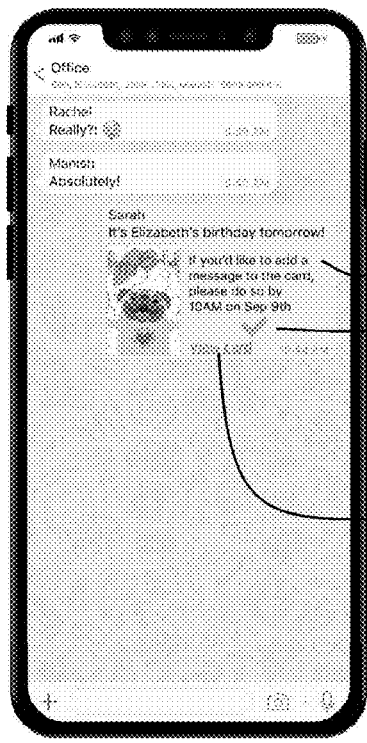

FIG. 85 shows a display from the point of view of User Sarah in the group channel named Office. This figure shows that the display shown is from the point of view of Sarah. In this exemplary embodiment, messages posted by a user logged into their own account on a messaging system are displayed differently from messages posted by others. In this example, messages sent by Sarah herself, are seen by her in a green chat bubble which chat bubble appears to stem from the right side of the display (993). Messages posted by others appear in a white chat bubble and appear to stem from the left side of the display.

FIG. 85 (994). In this exemplary embodiment a check mark is included to indicate to the user that they have already acted on the card. Many other approaches can be applied to achieve the same objective and in still other embodiments no indication is provided.

FIG. 85 (995). In this exemplary embodiment optional selectable "View Card" text is included. In this example, Sarah is given the option to tap on the words "View Card" which, if tapped, will cause the display of the card along with the messages sent to the card recipient. In some embodiments only the card recipient can view the card. In some embodiments only the Card picker and the recipient can view the card. In some embodiments only the card recipient/s can view the all of the personalized messages from the senders and the Senders can only view the personalized message that they posted themselves. If implemented, there are many anticipated variations on ways to implement "View Card".

Figure 86:
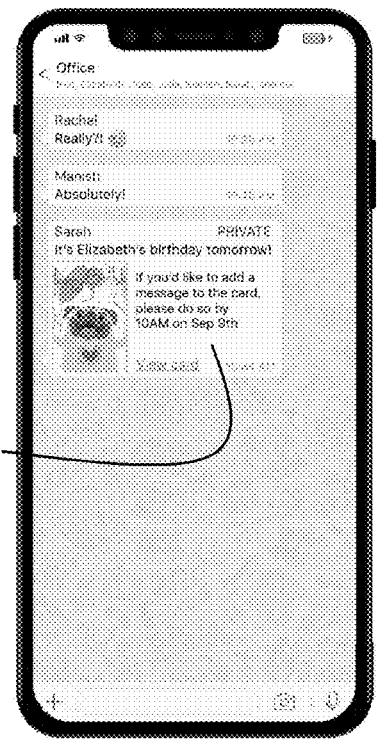

FIG. 86 shows a display from the point of view of User Sona in the group channel named Office. This figure shows that the display shown is from the point of view of Sona. In this exemplary embodiment, messages posted by a user logged into their own account on a messaging system are displayed differently from messages posted by others. In this example, none of the messages appear in green because none of the visible posted messages were posted by Sona. Messages posted by others appear in a white chat bubble and appear to stem from the left side of the display.

FIG. 86 shows a display from the point of view of User Sona in the group channel named Office. FIG. 86 (996) shows that Sona has received Sarah's Private post. Sarah's cover note that says "Elizabeth's birthday is tomorrow" is included in the post. In this exemplary embodiment, the system sent an image of the selected card along with a message informing the recipient of the deadline to act. In this example the associated note says, "If you'd like to add a message to the card, please do so by 10 AM on September 9th". In other embodiments the contents and appearance of the posted CARD message can be different than what is shown in FIG. 86.

Figure 87:
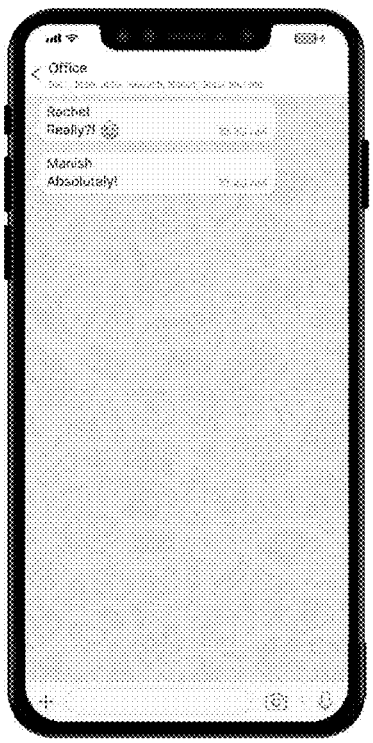

FIG. 87 shows a display from the point of view of User Elizabeth in the group channel named Office. Only channel users who were selected as SENDERS see the CARD post in their channel message stream. Since in this example, Elizabeth is the intended recipient of the card and was intentionally omitted from the selected SENDER group, she does not see the message that the SENDERS see.

Figure 88:
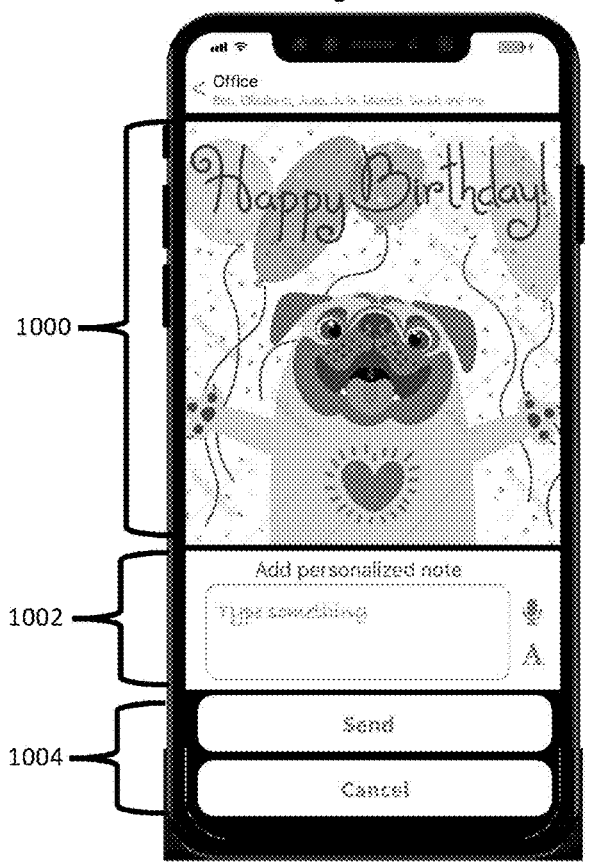

FIG. 88 shows a display from the point of view of User Sona in the group channel named Office.

FIG. 88 (1000) shows the birthday card that was previously selected by user Sarah. In this embodiment the card was [previously] chosen by another user, however in other embodiments there could be other and/or additional methods of card selection, for example, in some embodiments the recipients of the CARD message may also have the ability to vote on or independently choose their own card. In some embodiments, the CARD could be an aggregation (or compilation) of cards or images, and/or other media, selected by more than one user.

FIG. 88 (1002) shows an optional area of the display where user Sona is prompted to enter a personal note to the card recipient/s. In some embodiments the personalized note will be private and only visible to the individual that wrote the note and the recipient/s of the card. In other embodiments the note is visible to the user who wrote the note and other senders of the card as well as the note being visible to the recipient/s of the card. Which user/s can see a personalized note can vary from embodiment to embodiment. In some embodiments the personalized message is additionally "visible" to third parties and/or bots/apps.

FIG. 88 (1004) shows button controls that a User can use to Send their completed message or Cancel the action.

Figure 89:
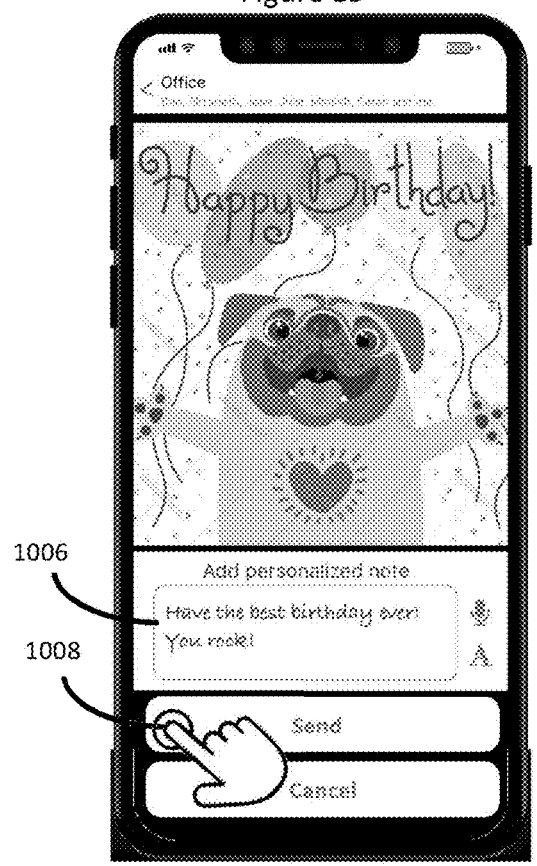

FIG. 89 shows a display from the point of view of User Sona in the group channel named Office.

FIG. 89 (1006) shows that user Sona has added a personal message to the card recipient/s (Elizabeth in this example).

Figure 91:

FIG. 89 (1008) shows that user Sona has tapped the Send button which, in this example, causes the personalized message to be recorded by the messaging system and the display updated (See Sona's updated display, shown as FIG. 91).

Figure 90:
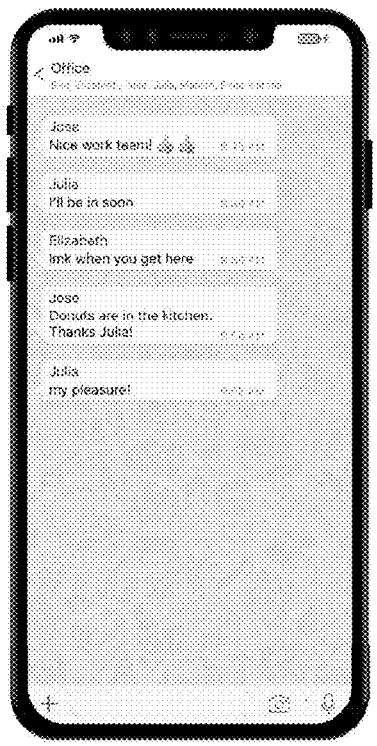
Figure 92:
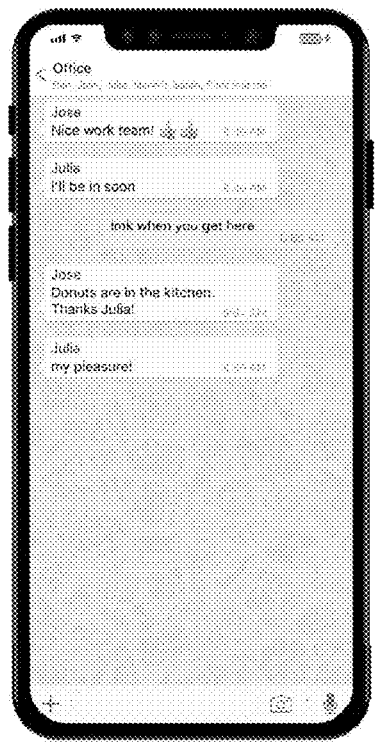

In this example, Sarah scheduled the date and time for the card to be delivered/posted to September 9 at 10 AM (FIG. 83 (984)). FIGS. 90, 91, and 92 show exemplary embodiments of Sarah, Sona and Elizabeth's displays immediately prior to the previously scheduled Card delivery date and time. In some embodiments, if no delivery date and/or time has been defined a default date and time can be applied (for example, in some embodiments the default date and time is set to immediate).

FIG. 90 shows a display from the point of view of User Sarah (the Card Picker and initiator of the Card being created, in this example) in the group channel named Office.

FIG. 91 shows a display from the point of view of User Sona (one of the Users selected by Sarah to be an additional sender of the card) in the group channel named Office.

FIG. 92 shows a display from the point of view of User Elizabeth (the intended recipient of the Card) in the group channel named Office.

Figure 93:
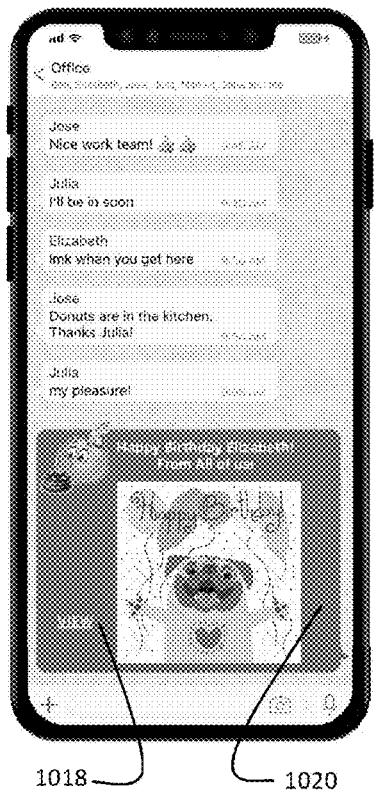
Figure 94:
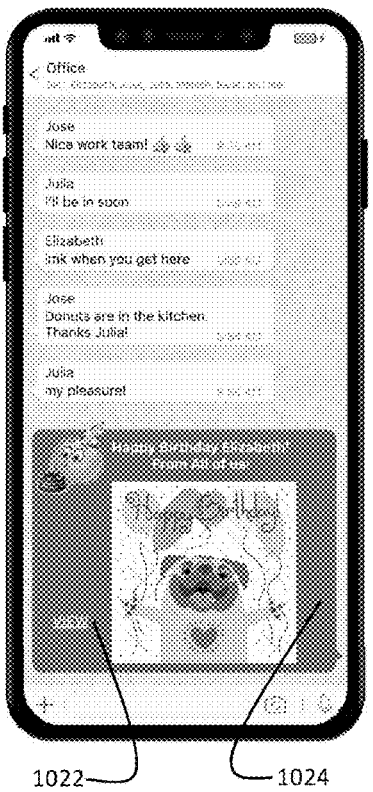
Figure 95:
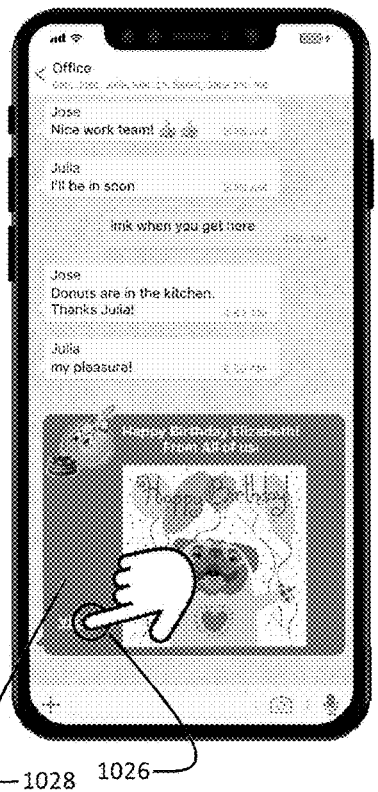

FIGS. 93, 94, and 95—In this example, the card was sent by "All of us", therefore, at 10 AM on September 9, everyone in the Office channel will see the Card posted in their view of the Office channel. In other embodiments fewer than everyone in the channel will be selected as senders and/or recipients and in those cases the card post will not be visible to those users. In some embodiments, the card is posted to the channel and visible to everyone in the channel whether or not any particular user was a sender or a recipient.

FIG. 93 shows a display from the point of view of User Sarah (the Card Picker and initiator of the Card being created, in this example) in the group channel named Office. (1020) shows the appearance of the posted Card from Sarah's point of view. (1018) shows that user Sarah is provided the option to tap "View" to see the card. In this example if Sarah taps "View" her display will be updated to display more information related to the card (there are various was to conceptualize "card" and in some cases it may be useful to replace the descriptor of a "card" with the concept of a sidebar or sub-channel).

FIG. 94 shows a display from the point of view of User Sona (one of the Users selected by Sarah to be an additional sender of the card) in the group channel named Office. (1024) shows the appearance of the posted Card from Sona's point of view. (1022) shows that user Sona is provided the option to tap "View" to see the card. In this example if Sona taps "View" her display will be updated to display more information related to the card.

FIG. 95 shows a display from the point of view of User Elizabeth (the intended recipient of the Card) in the group channel named Office. (1028) shows the appearance of the posted Card from Elizabeth's point of view. (1026) shows that user Sona tapped "View" to see the card.

FIG. 96 shows a display from the point of view of User Elizabeth after she elected to View the card as shown in FIG. 95 (1026).

FIG. 96 (1034) shows an example of an optional generic message generated by the messaging system. In some embodiments the system will automatically create a message that is included on the display. In some cases, the automatic message will include text, images, sound and/or other media. The message can be formatted and presented in many different ways, for example in some embodiments a festive graphic could be accompanied by the sound of fireworks. The message can be static, dynamic e.g., animated). The message can vary based on application coding. The message can be predefined or dynamically generated. The message could be sourced locally or remotely. The message can be different for each user. The message can be different each time a particular user views it. In some embodiments a generic message is not provided. In some embodiments a message is conditionally displayed.

FIG. 96 (1036) shows an embodiment of an area of a display which consists of a scrollable list of personalized messages which messages are associated with the birthday card sent to Elizabeth. In this example messages sent by the senders are grouped together and displayed to Elizabeth. In other embodiments the messages could be displayed/presented and/or filtered/sorted in various other/additional ways.

FIG. 96 (1040) shows an example of a message sent by Julia to Elizabeth. The message indicates that it was sent by user Julia. The message is presented using a selected or default font, which font in this example was chosen to appear hand written with the intent of making the note feel warmer and more familiar. In this example, the words "PRIVATE REPLY" are associated with Julia's message and are selectable. If Elizabeth taps on the words "PRIVATE REPLY" the display will be updated to allow for Elizabeth to enter a personal response to Julia's personal message. In some embodiments the PRIVATE REPLY option will not be provided. In some embodiments various other or additional approaches to facilitate a response to a personalized message can be utilized. In this example each personalized message can be interacted with individually and a further option is made available allowing the card recipient to exclusively or additionally reply to all (1038). In this example Ben's sent Elizabeth an audio recording (1041) in lieu of a text message. This embodiment shows an example of an area of the display being utilized to present an advertisement (1046). In some embodiments there could be ads. In some embodiments there will not be ads. The ad itself could be commercial or not commercial. The ad could be static or dynamic or a combination and, in some embodiments, may or may not be interactive and may or may not include links to external sources. In some embodiments only the Senders and Recipients can see the posted card in their view of the channel. In other embodiments more than the combined group of senders and recipients can see the posted card. An example of this would be a scenario where a small subset of channel members (senders) send a thank you card to another channel member in appreciation for a job well done. However, in this scenario the senders wish to not only thank the intended recipient but to provide the recipient with recognition which is achieved by having the card posted and visible to everyone the channel (note that the card is visible in this example to users that were neither the card sender/s or card recipient/s).

In this example, tapping on "PRIVATE REPLY" as shown in FIG. 96 (1042) causes the screen shown in FIG. 97 to be displayed.

Figure 98:
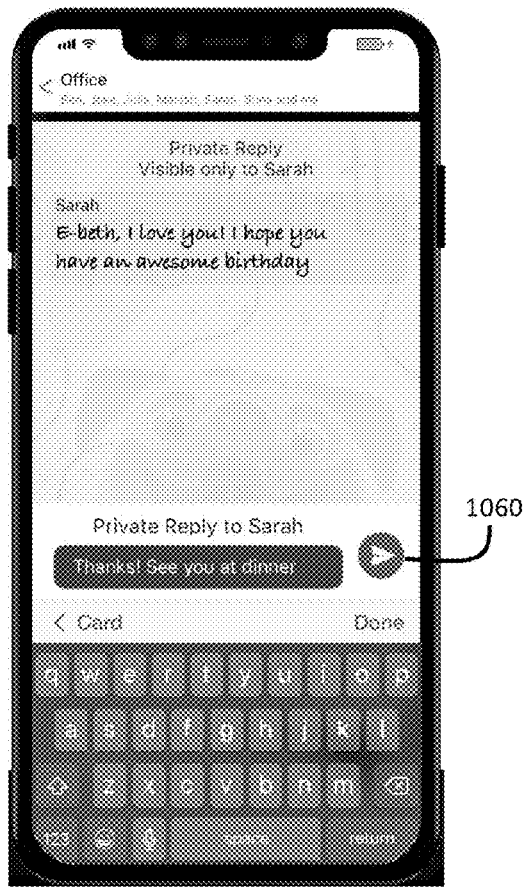
Figure 99:
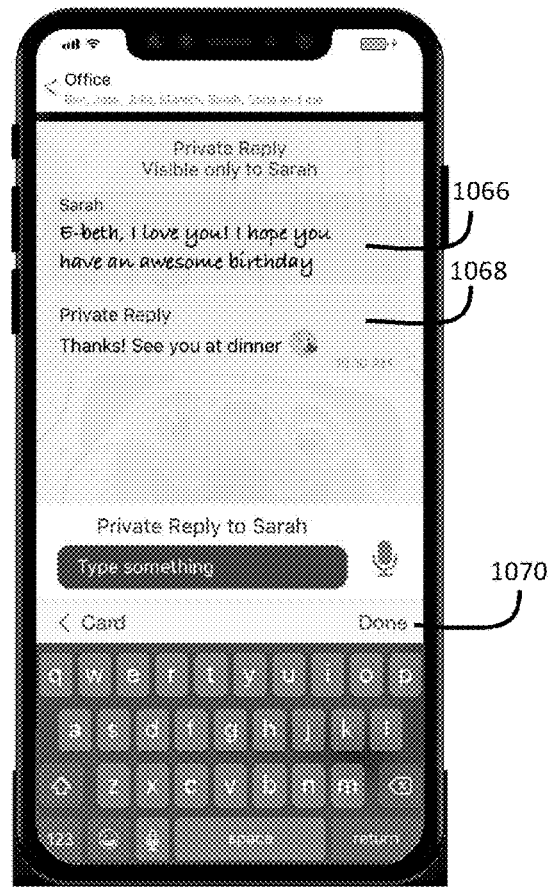

FIG. 97, FIG. 98 and FIG. 99 show a display from the point of view of User Elizabeth (a recipient of the Card) in the group channel named Office.

FIG. 97 (1047) shows a display from the point of view of User Elizabeth (a recipient of the Card) in the group channel named Office).

FIG. 97 (1048) shows an optional system generated message informing the user (Elizabeth in this example) that the message she is viewing is a private message.

FIG. 97 (1049) isolates and shows the selected private personalized message FIG. 96 (1042) sent by Sarah to Elizabeth. In some embodiments more than one message can be selected and responded to together.

FIG. 97 (1049) In this embodiment the selected REPLY TO message is shown apart from the other personalized messages but there are many ways to present the select message or messages and there are many ways to allow response to one or more selected messages.

FIG. 97 (1050) In this example a text entry bar is provided to user Elizabeth in order for her to type a response to Sarah's personalized message. In this example an option to record a response is also provided (1054). In this example, Elizabeth can send more than one response to Sarah's personalized message. By entering text into the text entry bar (or recording a spoken message) and pressing return (or tapping on the send icon shown in FIG. 98 (1060)), messages will be posted into this private (between Sarah and Elizabeth) "sidebar" or "subchannel" which messages are visible only to Elizabeth and Sarah FIG. 99 (1066)(1068). In some embodiments replies can be public. In some embodiments replies can be private. In some embodiments replies are not permitted. In some embodiments only one reply is permitted. In some embodiments one or more replies are permitted. In some embodiments replies are editable. In some embodiments responses are not editable.

FIG. 97 (1056) shows one example of an approach that will cause the display to revert to a previous display of the card.

FIG. 97 (1058) in this exemplary embodiment, tapping "Done" causes the display to In an examplary embodiment, FIGS. 100, 101 and 102 show that private messages between the card senders and the card recipients occur in a sidebar or subchannel associated with the card and/or the base channel. In other embodiments, message exchanges related to the card could take place outside of the base channel (Office, in this example). For example, in some embodiments use of Direct Message or other Group channels could be utilized to facilitate private conversations between a card sender and a card recipient.

FIG. 100 shows a display of the base channel "Office" from the point of view of User Sarah (the Card Picker and initiator of the Card being created in this example). (1080) shows the private message ("Thanks! See you at dinner") sent by Elizabeth to Sarah in response to Sarah's personalized note ("E-Beth, I love you have an awesome birthday") associated with the birthday card. In this example Elizabeth's response is visible in the base channel "Office" only to herself and to Sarah. Other channel members do not see Elizabeth's private response.

FIG. 101 shows a display of the base channel "Office" from the point of view of User Sona (one of the Users selected by Sarah to be an additional sender of the card) in the group channel named Office. In this example Elizabeth's response is visible in the base channel "Office" only to herself and to Sarah. Other channel members, such as Sona, in this FIG. 101 do not see Elizabeth's and Sarah's private message exchange.

FIG. 102 shows a display from the point of view of User Elizabeth (the intended recipient of the Card) in the group channel named Office. (1088) shows the private message ("Thanks! See you at dinner) sent by Elizabeth to Sarah in response to Sarah's personalized note ("E-Beth, I love you have an awesome birthday") associated with the birthday card. In this example Elizabeth's response is visible in the base channel "Office" only to herself and to Sarah. Other channel members do not see Elizabeth's private response.

Figure 103:
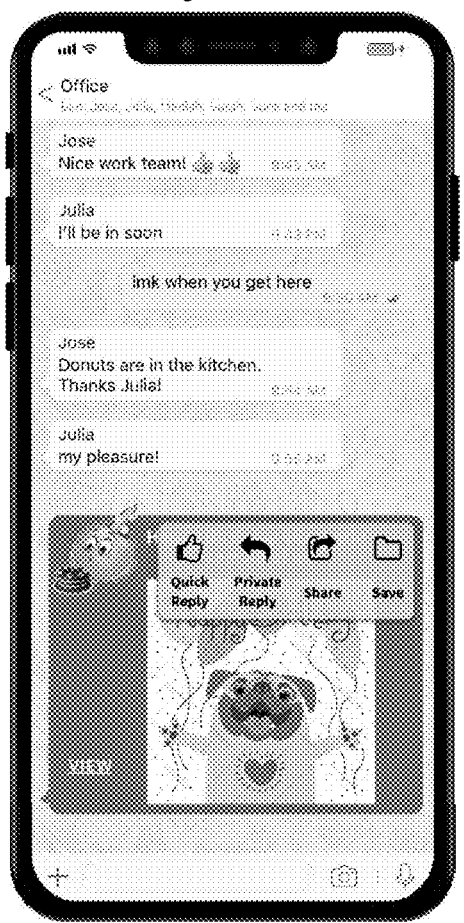

FIG. 103 shows a display from the point of view of User Elizabeth. In this example an optional hover menu appears if Elizabeth "long presses" an area associated with the card. The hover menu allows to user to make a further selection from among one or more further action options. In this example the user is provided with four possible further actions; 1) Quick Reply; 2) Private Reply; 3) Share and; 4) Save.

1) Quick Reply. In this example the Elizabeth can send a Quick Reply to channel members directly from her base channel view. A Quick Reply in this example would post a further message from Elizabeth to the Office channel (the "base channel" in this example)
2) Private Reply. In this example Elizabeth can send a Private Reply to a selected one or more channel members. A Private Reply in this example would post a further message from Elizabeth to selected users. In some embodiments, the Private Reply would be sent to the selected users using Direct Message or Group channels. In other embodiments, a sidebar or subchannel associated with the card and/or the base channel would be utilized. In some embodiments, the base channel itself would be used and the Private messages simply identified as private and visible only to the parties to the private exchange of messages.
3) Share. In this example, Elizabeth can select "Share" in order to send a copy of or a link to the card to other users or to third party, possibly external (e.g., via email, SMS, RCS, etc.), recipients.
4) Save. In this example Elizabeth can choose to save her birthday card to her computer device, an area of her messaging app (e.g., a card gallery), or other destination. In this example, if Elizabeth chooses to Save the card, she would be prompted to enter a name for the card and a destination for saving or downloading the card.

Figure 104:
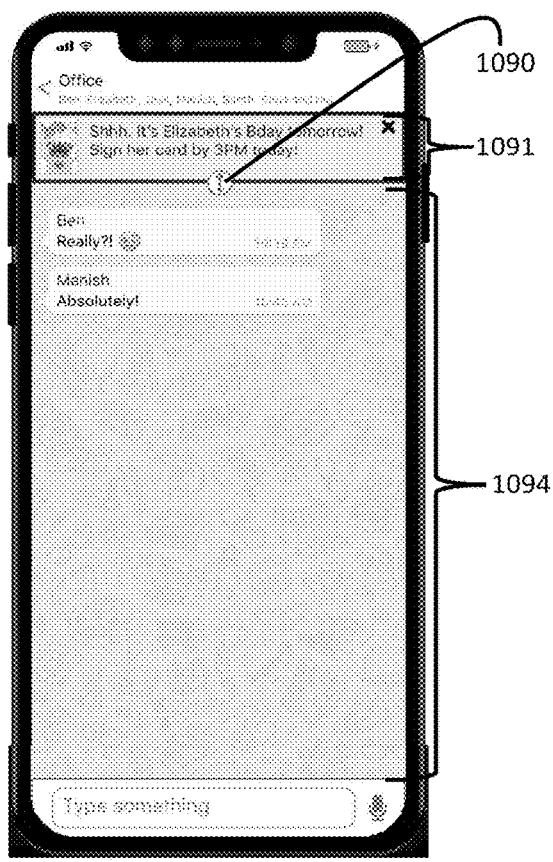
Figure 105:
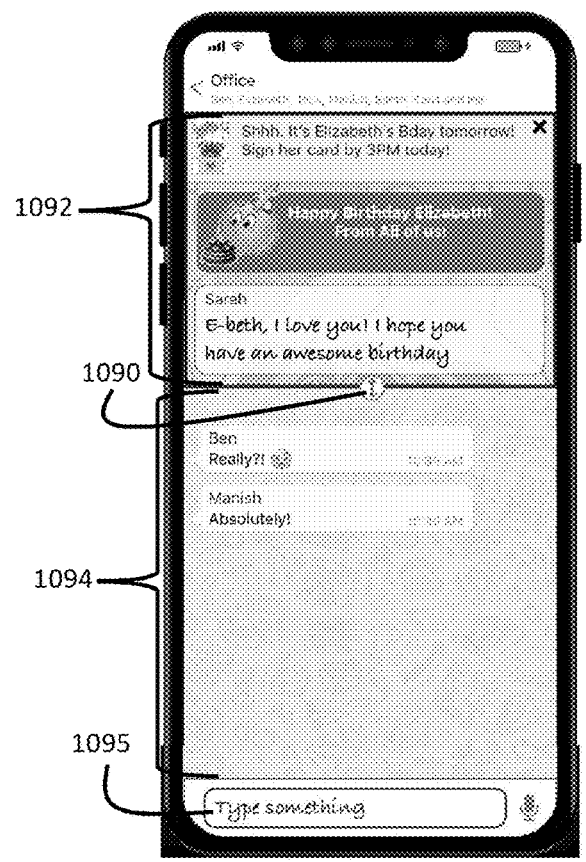

FIG. 104 and FIG. 105 show an exemplary embodiment where access to the Sidebar is provided by way of interaction with a slider icon (1090). In this example, a Sidebar Inclusion Notification Message has been pinned to the top of the display (FIG. 104 1091). By manually sliding the slider icon (1090) up or down, certain viewing parameters are established (the "viewing area") in which viewing area messages associated with the associated Sidebar Inclusion Notification Message are displayed (FIG. 105 1092). By further physical interaction, the Sidebar messages themselves (to the extent that they exist within the channel) can be viewed by scrolling up or down within the viewing area (1092). In this example, Base Channel Messages are displayed in the remaining viewing area (1094). In this embodiment the "look and feel" of the text entry bar (1095) is modified (the font and color in this example) depending upon the active view providing a [visual] indication to the user of which channel (Base channel or Sidebar/sub channel) a new message will be posted to and associated with.

Tapping within one of the viewing areas, (e.g., tapping above or below the slider icon in this example), toggles the area that is considered "active".

A further exemplary embodiment of the present invention is illustrated in FIGS. 106-137.

The foregoing explanation has referred to a Base Channel. In one exemplary embodiment of the present invention, the Base Channel is a public channel. In another exemplary embodiment of the present invention, the Base Channel is a private channel. Thus, when "message channel" is mentioned, the "message channel" might be a public channel or it might be private channel.

Channels can be public or private. Public channels are accessible by all or substantially all members of a messaging platform, network, service or domain (e.g., everyone using a particular app, or everyone using a particular domain such as a particular company or organization). The scope of "Public" may vary from implementation to implementation but in general "public" means "not private". Access to private channels is usually limited to specified members. This exemplary embodiment describes a public channel (i.e., the channel is accessible to all subscribers, members or users of the messaging platform) but with exclusionary limitations that improve computer data security that facilitate and enable private conversations within a public channel(s).

In a further exemplary embodiment, members (or most members) in a public channel have access to the channel by default. In another exemplary embodiment, members in a private channel are explicitly designated.

Figure 106:
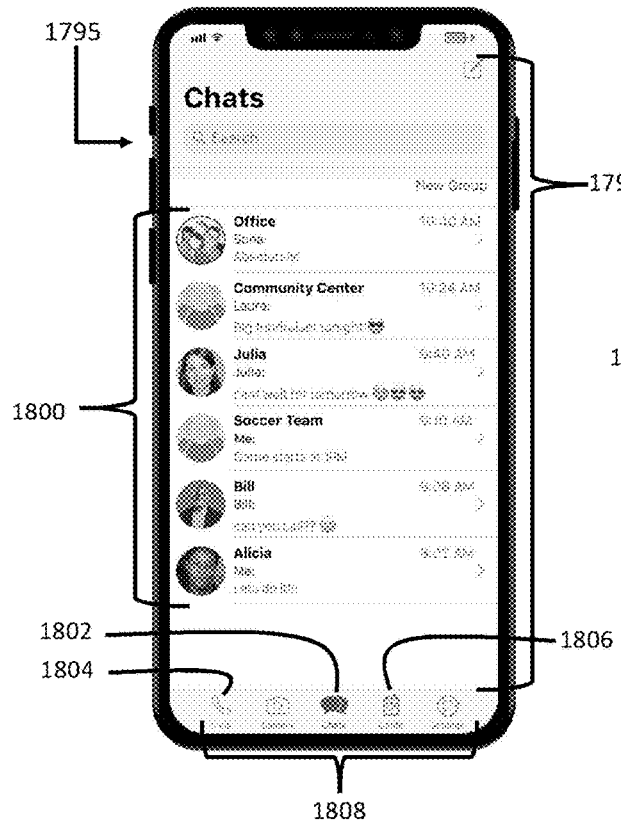
Figure 107:
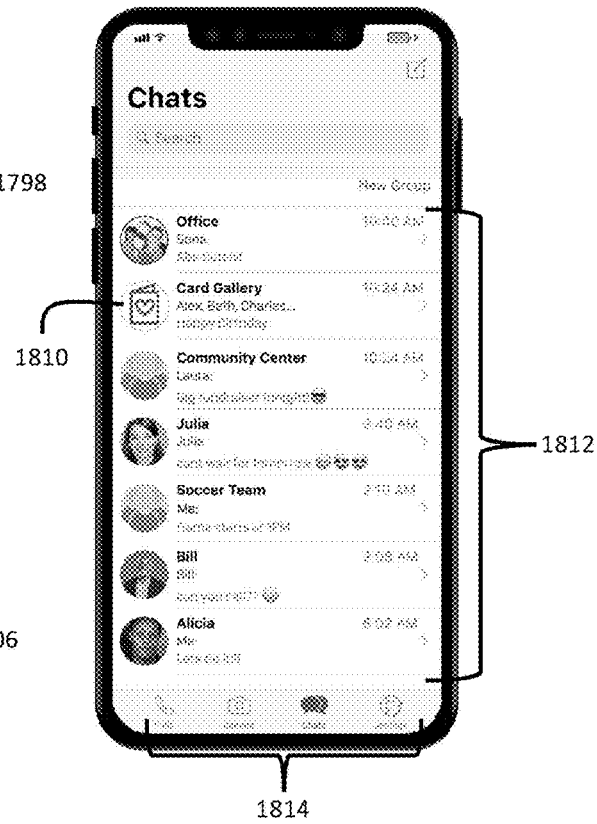

FIG. 106 and FIG. 107 show an exemplary display from the point of view of Sarah. FIG. 106 and FIG. 107 show that user Sarah is viewing a list of channels via menu 1800 and has access to a further channel via channel icon 1806 as well as access to other options including but not limited to options represented by icons 1802 and 1804. FIG. 106 and FIG. 107 show Sarah's display prior to her selection of a channel.

In the exemplary embodiment shown in FIG. 106, some channels are shown and are selectable from menu 1800 while channel or subchannel (e.g., Card Gallery) creation, configuration and/or access is selectable from cards icon 1806. The channel or subchannel being created may be a Sidebar. The channel or subchannel created may be a public channel or a private channel. A user interface for selecting, configuring, or creating channels, such as the example shown in FIG. 106, may be useful in cases when certain channels may generally be used in one manner while other channels may generally be used for specified other purposes. The user interface for channel selection shown in FIG. 106 may be applied as a simple means to separate, distinguish, differentiate or call attention to one channel or group of channels from another/other channel(s). Other methods of highlighting, calling attention to and/or facilitating access to favorite, key or specified channels can be applied, such as pinning a channel to the top of the channel list. There is no limit to the number of ways to present channels for selection and one approach may be used alone or in any combination with any number of other approaches. In some cases the ability to select a channel may be more or less persistent than other methods. For example, in the exemplary embodiment shown in FIG. 106, a channel represented in a particular manner may persist and/or be selectable at respectively different times. In the example, menu 1800 is a list of channels. In some embodiments more than one approach to providing access to a channel, channel creation, and/or channel configuration may be provided. For example, in some embodiments, new channels may be configured or created and existing channels may be accessed via icon 1806 as shown in FIG. 106. In other embodiments, new channels may be configured/created and existing channels may be accessed via menu field 1810 as shown in FIG. 107.

To be clear, not all icons 1808 appearing together in FIG. 106 are associated with and/or represent channels. For example the "cards" icon 1806 provides configuration of a channel (e.g. Card Gallery) creation of a channel, and/or access to existing channels while the other icons serve respectively different purposes. In this example, the sending and receiving of digital greeting cards may take place in a Sidebar. Furthermore, while a channel may start as a sidebar (with less than all members of a base channel), one or more members of a base channel may be added to a sidebar after its creation. In one embodiment, members are added to a sidebar until the sidebar includes all the members that were in the base channel before the sidebar was created.

FIG. 106 shows an example of "chat bubble" icon 1802 that is currently selected (in this example, the "chat bubble" icon is solid to indicate its selection) resulting in the "Chats" display. This display includes the display of an associated menu 1800 that includes a list of channels. The "telephone" icon represented by 1804 is another example of an icon not associated with and/or that represents a channel. When selected, icon 1804 launches a telephone calling module.

FIG. 107 is another exemplary embodiment, and in contrast to FIG. 106, provides a channel configuration/creation and/or access feature from among menu 1812 that includes a list of channels. In this embodiment one or more channels are presented together in menu 1812. In this example, the menu field 1810 that accesses the "Card Gallery" is included in the list of channels. Menu field 1810 may be used for new channel configuration/creation as well as accessing further channels.

Thus, one way to look at FIG. 106 and FIG. 107 is that they are displaying a full or partial "menu of accessible channels."

Figure 108:
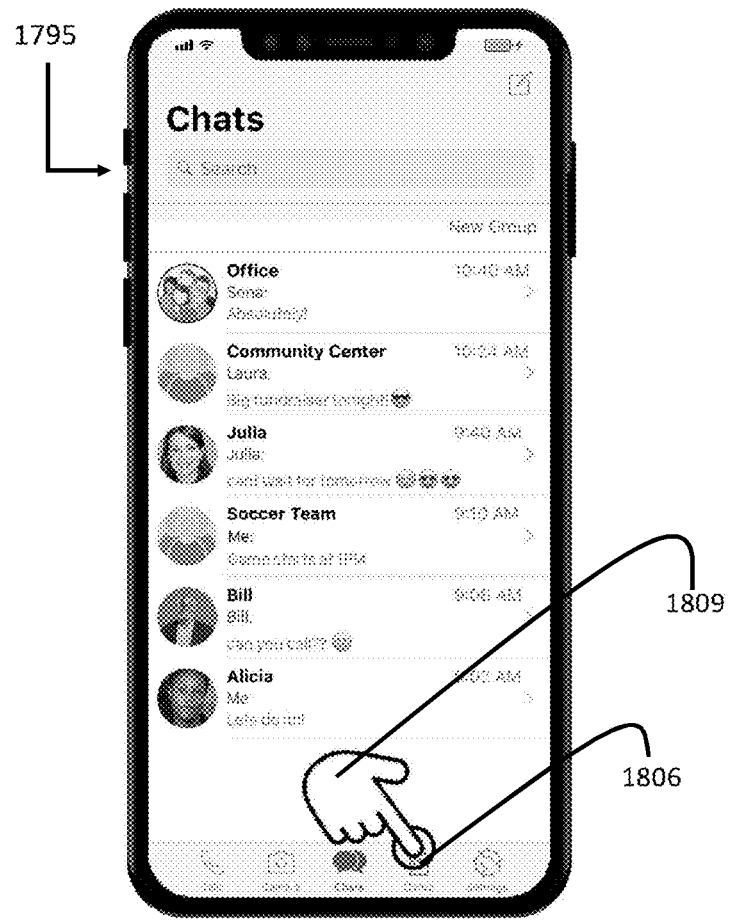

FIG. 108 shows a display from the point of view of Sarah. In this FIG. 108, user Sarah selects "Card Gallery" channel configuration, creation, or access by tapping on the "Cards" icon 1806 via stimulus 1808. In this example, tapping the "Cards" icon 1806 causes the display of the "public" Card Gallery channel configuration and access menu shown in FIG. 109*a*, or alternatively FIG. 109*b*. In the example shown in FIG. 108, user stimulus 1809 is a finger that interacts with device 1795 with facilitation via icon 1806, but other forms of user stimulus are contemplated, such as mouse click, voice, eye movement, haptic detection, etc.

FIG. 108 shows a display from the point of view of user Sarah. FIGS. 109*a* and 109*b* show alternative displays from the point of view of user Sarah.

As a further example, selecting either Cards icon 1806 (FIG. 106) or Card Gallery 1810 (FIG. 107) results in device 1795 displaying an exemplary channel that is Card Gallery Channel 1816 (FIG. 109*a*). Card Gallery Channel is illustrated in FIG. 109*a* as a broadcast only channel, but this is merely exemplary. Broadcast only channels can be especially useful in cases where there are a great many members and/or when there is a desire to restrict message posting to a channel to a limited number of specified authorized "broadcasters". Broadcast channels can also be useful when combined with Sidebars as described in this example because the combination results in the limiting of the visible channel messages to only Sidebar Inclusion Notification Messages (and other authorized posts) which SINM are associated with and relevant to the particular user viewing the channel. FIG. 109*a* shows a broadcast only channel (i.e.

without a text entry bar). FIG. 109*b* shows another embodiment wherein Card Gallery Channel 1816 has a capability for direct posting to the base channel (through a text entry bar, for example 1833 109*b*). In some embodiments, the specification of intended recipients may be provided and/or required in connection with posts to the channel. (In other words—in cases where the channel may have a great many members it may be desirable to require the selection of recipients before allowing the user to post any message to the base channel). FIG. 109*b* message 1831 shows a message posted directly to the channel and made visible only to selected channel members. Card Gallery Channel 1816 includes a plurality of Sidebar Inclusion Notification Messages (SINMs) 1818 (with the exception of message 1830 that will be explained below). SINMs 1818 include separate Sidebar Inclusion Notification Message (SINM) 1824, 1826, and 1828. SINM 1824, 1826,1828 each correspond to a respectively different sidebar. Furthermore, in this embodiment, each SINM 1824, 1826, 1828 indicates that a respective action has taken place in each respective sidebar. SINM 1824 indicates that a message was received in the respective sidebar at 8:00 AM. SINM 1826 indicates that a message was received in the respective sidebar at 10:00 AM. SINM 1828 indicates that a message was sent from the respective sidebar at 1:00 PM.

In the exemplary embodiment shown in FIG. 109*a*, each SINM 1824, 1826, 1828 serves two purposes. The first purpose is to provide identification, status, and content of each sidebar. Note that this purpose has optional components and more, less, or different information may be provided. The second purpose is to provide a location on the screen that, when selected (haptically, for example), changes the display so that the corresponding sidebar can be seen and/or interacted with.

Note that while viewing Card Gallery Sidebar 1816, creation of sidebars is permitted via New Icon 1820. Thus, by configuring the display in this manner, Sidebar Inclusion Notification Messages are displayed on this screen. (Note that as an example, other messages may be displayed as well, such as Sponsored Message 1830 that is not related to a sidebar. Sponsored Message 1830 may originate from a different source than sidebar participants, such as an advertiser, a platform operator (or other authorized person), bot/app, or other entity In the above example, each Sidebar Inclusion Notification Message is representative of a unique Sidebar (e.g., Digital Greeting Card). In some embodiments, selecting a SINM causes the display to revert to the associated Sidebar. "Selecting" may be accomplished, for example, by haptic interaction with the portion of the display at which the SINM is displayed. In some embodiments, digital greeting cards awaiting review and/or signature may appear under a heading such as "Pending" (shown in FIG. 121) while previously viewed and/or acted upon cards, if any, may appear under a heading such as "Archive" FIG. 109 (1817).

Due to the fact that, in one exemplary embodiment, Sidebar Inclusion Notification messages are visible only to selected participants, it is likely that each Card Gallery channel member will have his/her own respectively unique display of the channel's contents/messages.

In FIG. 109*a* (and FIG. 109*b*), SINM 1824, 1826, 1828 are examples of Sidebar Inclusion Notification Messages. Sidebar Inclusion Notification Messages can take many forms and in some cases can look similar or identical to regular messages or messages used for other purposes.

Tapping on a defined area associated with the Sidebar Inclusion Notification Message will cause the display of the messages in the associated Sidebar (Card) to be displayed. In this example, the SINM includes a digital representation of a greeting Card. Many other approaches and/or methods of Sidebar selection could be applied. In addition, the display of the Sidebar can take many forms, for example, it could appear as a separate screen, it could appear superimposed on the current screen, it could appear as embedded (e.g., collapse/expand), etc.

Thus, if FIGS. 109*a* and 109*b* are illustrating display of what is effectively a "further message channel," then the further message channel displayed in FIGS. 109*a* and 109*b* is displaying a plurality of SINMs or, in other words, messages that indicate that the particular entity viewing his/her/its own display (1795) is included (i.e., is an actor) in the associated Sidebars.

Furthermore, one way to look at FIGS. 109*a* and 109*b* is that they are illustrating display of a "further message channel" that is viewed after viewing the full or partial "menu of accessible channels" illustrated in FIG. 106 and FIG. 107, such that the "further message channel" is one of the channels accessible by the user.

FIG. 109*a* (and FIG. 109*b*)—In some embodiments the name of the channel may appear on the display (for example, Card Gallery 1816).

Figure 111:
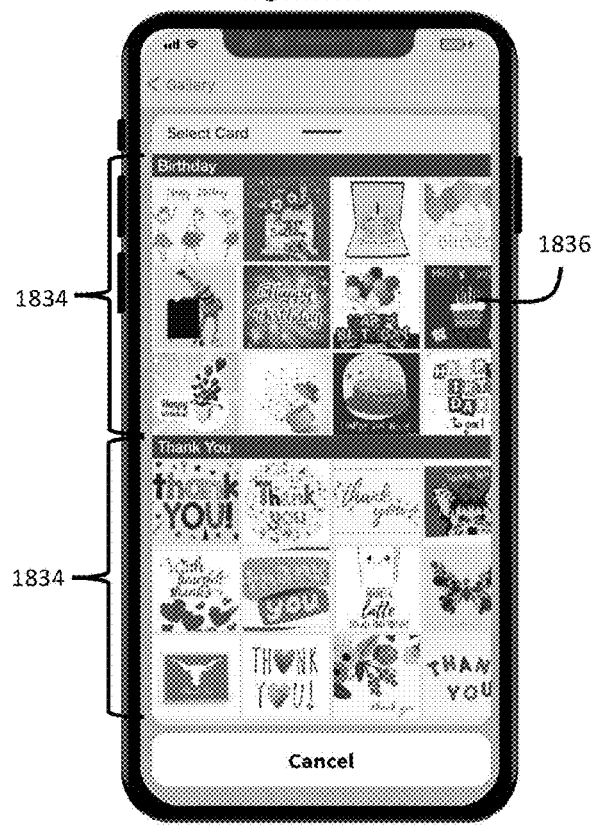

FIG. 110—In this embodiment, tapping (1832) on the create new card icon (1820) causes the display shown in FIG. 111.

FIG. 111 illustrates an exemplary screen that is displayed after, for example, interaction with icon 1820 in FIG. 110. In FIG. 111, the screen is divided into different fields 1834. There may be differences with regard to each field 1834. In one embodiment, fields may be grouped into certain logical relationships based on the respective contents. In other embodiments, fields may be grouped into certain relationships based on rules.

As shown in FIG. 111, each field 1834 comprises a plurality of tiles 1836. In some embodiments the display of anchor elements may be a display of stickers, emojis or other images. In some embodiments the user may enter text or audio input. In this example, each tile represents a respectively different selectable anchor element. Each tile 1836 may be associated with certain rules, content, visual display, etc. In the embodiment shown in FIG. 111, each tile 1836 will eventually result in different visual displays as explained further below. Other approaches may be used for presenting and allowing selection of the anchor element, as would be understood by one of ordinary skill in the art reading the present disclosure.

Figure 112:
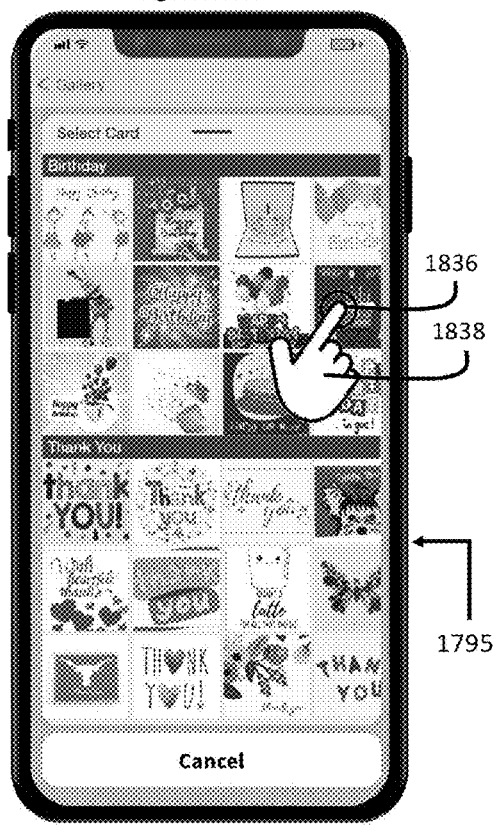

In FIG. 112, user stimulus 1838 selects a specific tile 1836. Processing then proceeds to FIG. 113.

In FIG. 113, further action is taken after tile 1836 is selected.

FIG. 113 shows a display from the point of view of user Sarah who is the Sidebar Creator in this example. The exemplary screen shown as FIG. 113 includes an image 1840 of the tile (anchor element) selected in FIG. 112.

FIG. 113 illustrates options 1842. In this example the Card Creator is provided with the options of defining group wave participants "To" and "From" and specifying the date and time to "send" (i.e., join the recipient/s to the sidebar). Different or other options may be available.

In this embodiment the "To" group wave selection screen is displayed by default in response to the selection made in FIG. 112 (indicated by the active "To" button 1844). This screen shown in FIG. 113 facilitates the selection of the "To" group wave participants (i.e., the card recipient/s").

Sarah, the Card Creator in this example, is able to scroll through her unique directory of platform contacts who have been added to her personal directory. Each subscriber, user, member, etc. of the messaging application, network, domain, etc. may have their own respectively unique directory. Since Sarah is the Card Creator, she scrolls through her directory and selects the intended recipient/s of the card. In this embodiment selection is indicated by tapping on the check circle associated with an intended group wave participant (1850).

FIG. 113 illustrates an embodiment in which the user desirably selects at least one participant in the "To" group wave (it can be the card creator him/her self). The Card Creator may not "Send" the card (i.e., create the sidebar) until at least one "To" group wave participant has been defined. In this embodiment the "Send" button is deactivated 1851 until at least one "To" group Wave participant has been selected. FIG. 114 1851 in this embodiment, shows the button as eligible to be selected.

FIG. 114 shows a display from the point of view of user Sarah. In this example, Sarah has selected "Elizabeth" as the intended recipient of the card as indicated by the checked circle (1850).

FIG. 115 and FIG. 116 show a display from the point of view of user Sarah. In this example, Sarah has tapped on the "From" button (1852) which caused the screen to update to display and enable the "From" selection module. FIG. 115 shows that Sarah has selected Ben has a participant in the "From" group Wave rule. FIG. 116 shows that Sarah has also selected Jose and Julia to be participants of the group wave. Sarah finalizes the selection of "From" group wave rule participants by selecting Manish from her directory.

In this embodiment the Card (Sidebar) Creator is by default a selected participant in the "From" Group Wave rule (not shown). In this embodiment the Sidebar Creator may not de-select herself as a "From" participant. In other embodiments any scenario or combination of selecting, deselecting or selection rules may be applied. For example, in some embodiments everyone who is not a selected card recipient may by default be selected and assigned to the "From" group wave. In other embodiments, the presently described software is synchronized with a calendar in which birthdays are recorded. In such a scenario, the person with the birthday recorded in the calendar is automatically assigned to the "To" field and predefined group members other than the person in the "To" field are assigned to the "From" field. In some embodiments a "Select All" and/or "Clear all" option can be provided to expedite participant selection or de-selection. In some embodiments the group wave participants can be selected at the same time and on a single screen while in other embodiments the selection may take place on one or more screens.

Before exiting the "From" group wave selection module, Sarah wants to add a 3$^{rd}$ party to the "From" group wave. Is this embodiment entities external to the messaging application (members or non-members) can be added to a group wave by sending a link to the sidebar to the external party via email, SMS, RCS or other electronic method. In this embodiment, the Sidebar Creator is provided with an option to add email address of the desired participant (1854). Tapping on the text "Add a participant via email" in this example, cause the screen shown in FIG. 117 to be displayed.

Figure 117:
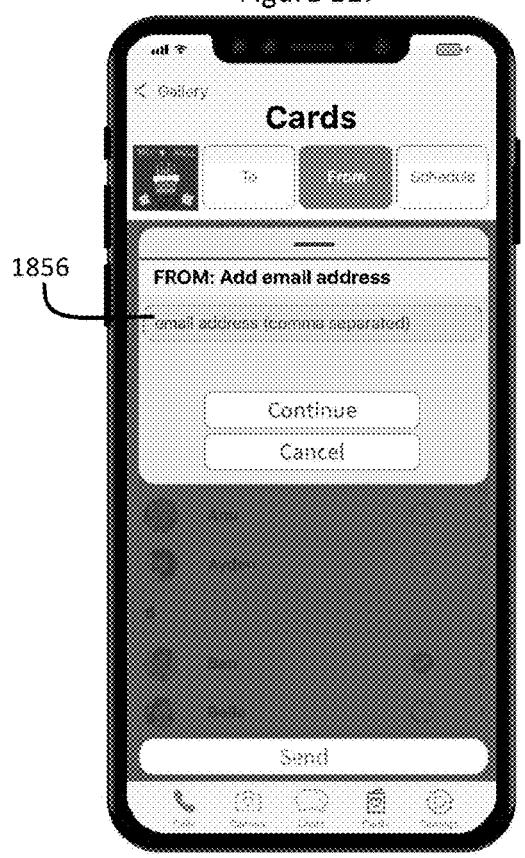

FIG. 117 shows a display from the point of view of user Sarah (the Sidebar Creator). Sarah can enter the email address of the entities (people, bots/apps) she wishes to add to the group wave.

FIG. 117 shows a display from the point of view of user Sarah (the Sidebar Creator). From this screen, Sarah can enter the email address of the entities (people, bots/apps) she wishes to add to the group wave.

Figure 118:
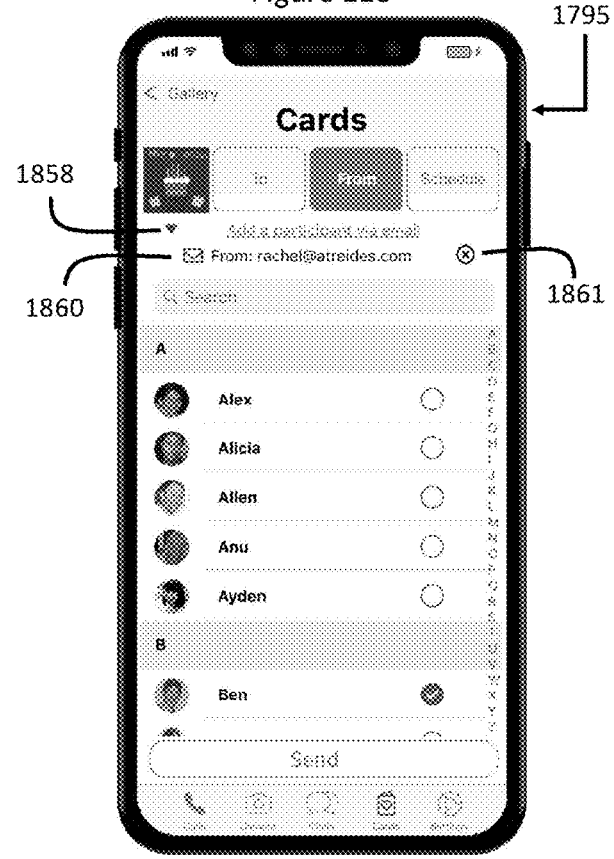

FIG. 118 shows a display from the point of view of user Sarah (the Sidebar Creator). This screen has been updated to reflect the email address 1860 entered in the text entry box 1856 shown in FIG. 117. The optional triangle icon shown as 1858 is just one of many ways to facilitate a display of more or fewer email addresses. In this embodiment the triangle (1858) icon can be rotated to cause the display of the list of email addresses to be collapsed or expanded.

Figure 119:
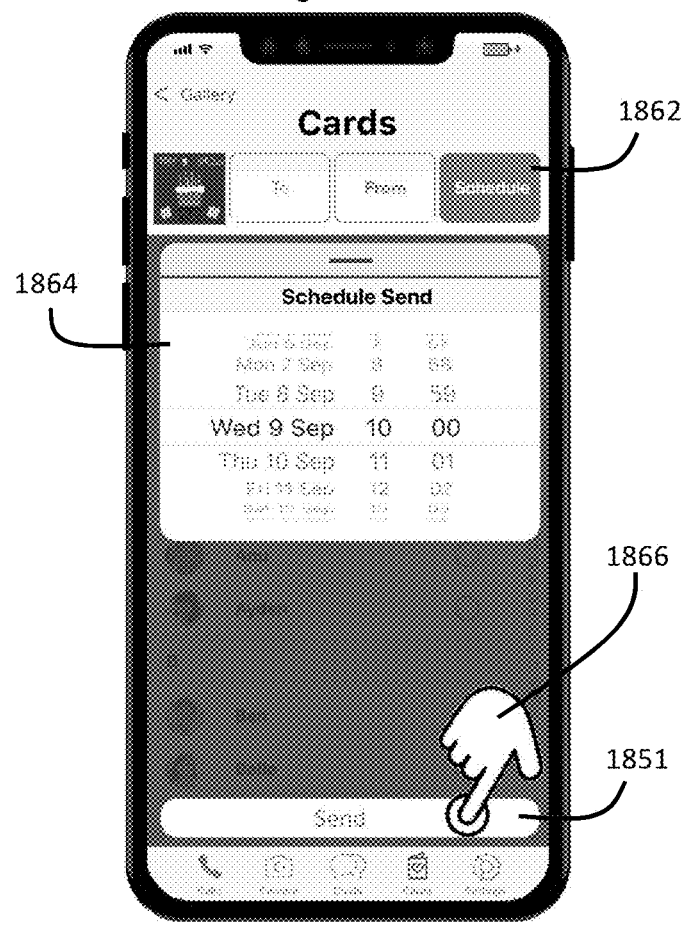

FIG. 119 shows a display from the point of view of user Sarah (the Sidebar Creator). FIG. 119 shows that the Card Creator has optionally opted to specify a date and time to "send" the card to the intended recipient (i.e., the Card Creator desires to specify a date and time that the "To" group wave participants will be given access the Sidebar). Upon being given access to the Sidebar, and in accordance with a predefined Group Wave Rule that defines the attributes (e.g., layout, contents, design, placement etc.) of the Group Wave associated Sidebar Inclusion Notification Message, the "To" group Wave rule participant will receive a Sidebar Inclusion Notification Message.

FIG. 119 includes interaction 1866 to show that user Sarah taps the Send button 1851 to cause the Sidebar (card) to be created. In this embodiment, tapping on Send creates the sidebar and causes the display of the user's screen to revert to the "Chats" view.

In some embodiments, a date and time must be specified in order for the Card to be "sent" while in other embodiments the card may be sent regardless of whether a date and time has been specified. In some embodiments the Card Creator may press the "Send" button at any time during the card creation process to cause the card to be posted to the sidebar.

Figure 120:
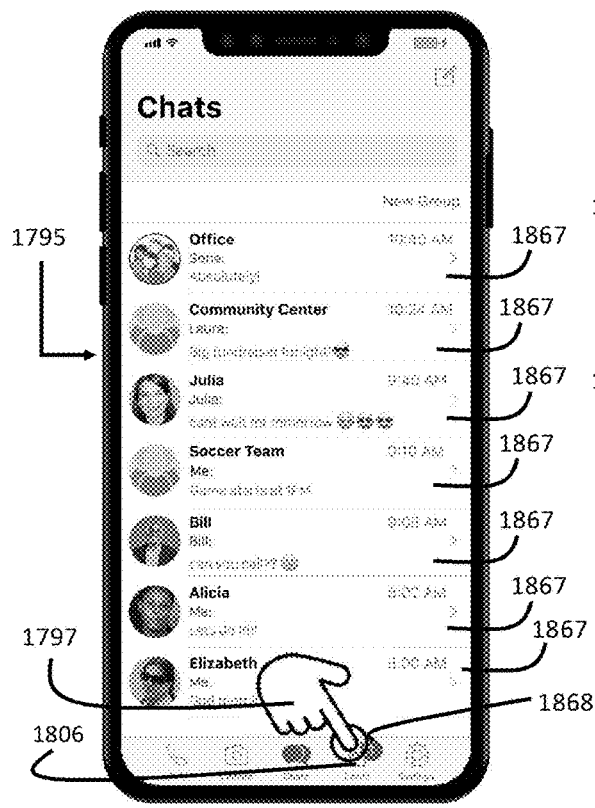

FIG. 120 shows a display from the point of view of user Sarah. Sarah is a participant in the "Senders" group wave rule. In this example a new message indication is provided and associated with certain channels in cases when a certain channel contains an as yet unseen message. In this embodiment, a new message indicator (a red circle) 1868 is superimposed on the Cards channel icon 1806 which is intended to alert Sarah, who is a participant of the Sender Group Wave rule, to the fact that this is an as yet unseen message in her Card Galley channel. The other Sender Group Wave rule participants will also be presented with a new message indicator on their respective displays and associated with the Card Gallery channel.

FIG. 120 shows a display from the point of view of user Sarah. In this embodiment, user Sarah may access (e.g., view, interact with, etc.) any of her channels by tapping on her device display on an area associated with the channel she wishes to inspect (1867). In this embodiment Sarah may access her Card Gallery channel by tapping on the icon associated with that channel (1806). In this example, user Sarah taps (1797) on the Cards icon (1806) which causes the display of the screen shown in FIG. 121.

Figure 121:
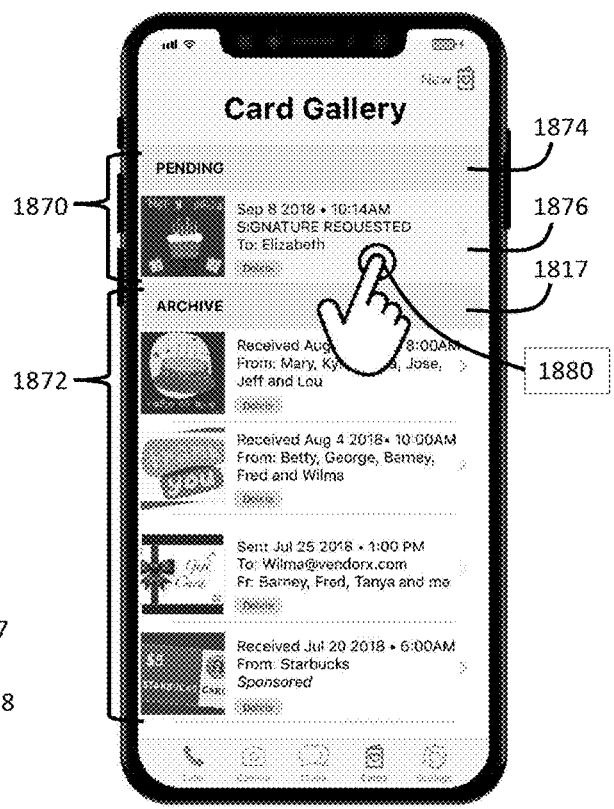

FIG. 121 shows a display from the point of view of user Sarah. Sarah is a participant in the "Senders" Group Wave rule. In order to reduce clutter and to facilitate the intended functionality of this channel, direct posting to this channel has been restricted (no means of direct text/data entry, such as a text entry box, is provided). However, creation of sidebars is permitted. By configuring the channel in this manner, only Sidebar Inclusion Notification Messages are posted to the channel (and certain other messages which may be posted to the channel by other means, such as sponsored messages which messages, if any, and if so configured, may, in some embodiments, be posted by the platform operator or other authorized person, bot/app or entity).

FIG. 121 illustrates an exemplary embodiment in which Sidebar Inclusion Notification Messages associated with new (previously unseen by the user) cards and cards that are awaiting some form of interaction are grouped together and presented under an optional heading. In this case a section heading named "Pending" (1874) is displayed. Sidebar Inclusion Notification Messages associated with previously seen, acted upon and saved cards (sidebars) are grouped together and presented under an optional heading. In this case a section heading named "Archive" (1874) is displayed. Due to the fact that, in this embodiment, users can not post messages directly to the public channel, only messages that are Sidebar Inclusion Notification Messages will populate the Card Gallery channel. This fact results in an interesting form of a Public channel in the context of messaging systems, in that each member of this form of public channel will likely have a unique view of the channel's content, i.e., since Sidebar Inclusion Notification Messages are only posted to Sidebar participants (Senders and Recipients), each user's Card Gallery channel will likely be unique and contain a unique collection of Cards that pertain only to him/herself.

FIG. 121 (1876). The contents and attributes of the Sidebar Inclusion Notification Message associated with the "From" Group Wave rule in this example was predefined. For example, in this embodiment, in cases where this specific "Birthday Card" is selected as the anchor message, Group Wave participants in the Senders Group Wave rule will receive a SINM that includes an image of the birthday card, the date and time the birthday card was created, text that displays "SIGNATURE REQUESTED" and the name of the intended recipient/s. The attributes of the SINM can vary greatly and from recipient to recipient and can be based on any factor, such as who the senders are, how many senders/recipients, location of senders/recipients, time of day, specific date, device used, motion detection, relationship, etc.

FIG. 121. In this example, user Sarah taps (1880) on the Sidebar Notification Message corresponding to Elizabeth's birthday card (1876) in order to cause the display of the related Sidebar.

Figure 122:
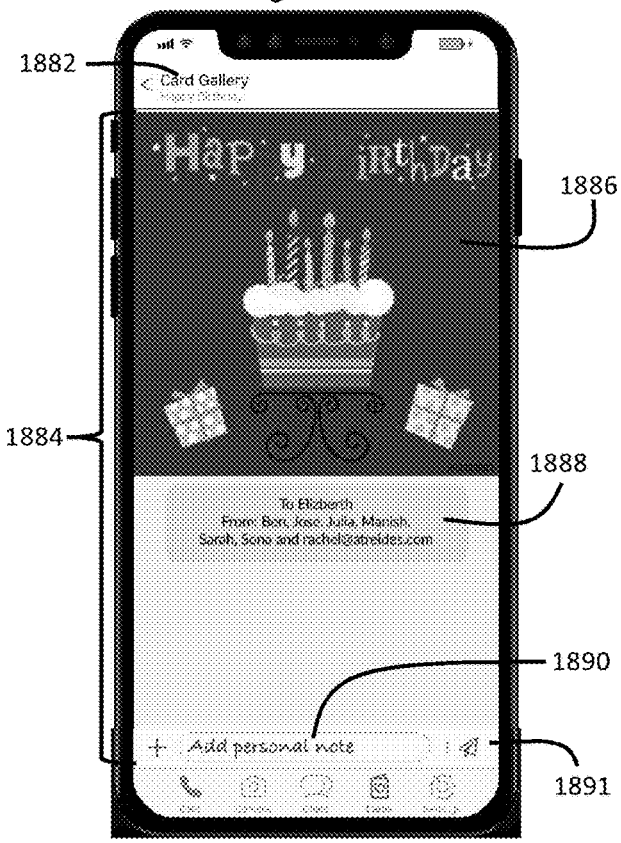

FIG. 122 (1882) shows an optional navigation element that can be used to assist and orient a user. In this example, tapping an area associated with the back carat "<" will cause the display to return to the display of the Card Gallery channel shown in FIG. 121

FIG. 122 shows a display from the point of view of user Sarah (a participant of the Senders Group Wave). 1884 shows a view of the selected Sidebar sub-channel, which sub-channel excludes all channel participants other than, in this example, those selected by the Card Creator. In this embodiment the display of the Sidebar sub-channel includes a representation of the selected anchor message (1886). In this embodiment, an optional system message associated with a Sidebar Rule is displayed (1888). The user, Sarah, in this example, is prompted to enter a personal note, which note will be added to the Sidebar and visible to all sidebar participants once they have been given access to the Sidebar. FIG. 122, in this example, is a display of the Sidebar (Card) at a time that is after the "From" Group Wave rule participants has been given access to the Sidebar but before the "To" Group Wave rule participants has been given access to the Sidebar.

Figure 123:

In FIG. 123, user Sarah, is shown to have added a personal note (1892). In this example tapping the "send" icon (1891) after entering text and/or other data (e.g., photos, audio, video, emoji, stickers, attachments, etc.) causes the personal note to be posted to the sidebar.

Figure 124:

FIG. 124 shows a display from the point of view of user Sarah (a participant of the Senders Group Wave). 1894 shows that Sarah's personal note has been posted to the Sidebar (and, in this example, is the first note to be posted). In some embodiments the order of the display of messages will be determined based on a rule or calculation. For example, in some embodiments the Card Creator's message will always be posted first.

Figure 125:
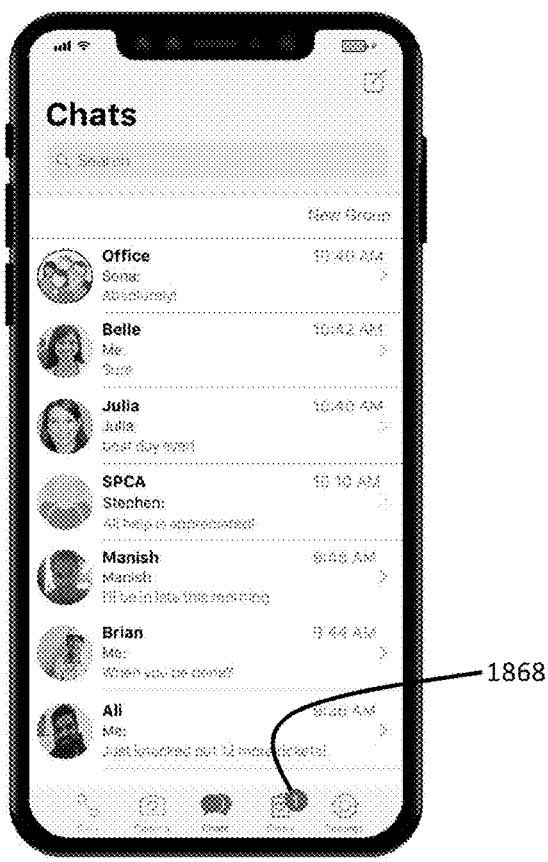

FIG. 125 shows a display from the point of view of another one of the selected participants of the "From" Group Wave rule. In this example, the user is Sona. FIG. 125 shows that Sona has an unseen message in her Card Gallery channel as indicated by the red circle (1868). In some embodiments the red circle notification indicates that there is an unseen (i.e., new) message posted to the associated channel, while in other embodiments the indication could convey other or additional meanings such as, urgent, pending action, scheduled event, etc.

Figure 126:
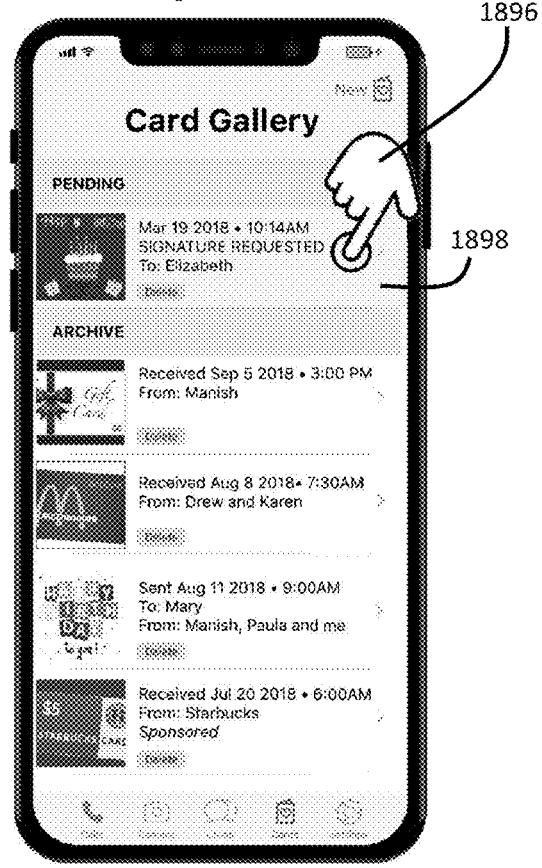

FIG. 126 shows a display from the point of view of user Sona (a participant of the Senders Group Wave). Note that Sona's display of the public Card Gallery channel is unique to her and contains only the Sidebar Inclusion Notification Messages associated with the Sidebars in which she is a participant.

FIG. 126. In this example, user Sona taps (1896) on the Sidebar Notification Message corresponding to Elizabeth's birthday card (1898) in order to cause the display of the related Sidebar.

Figure 127:

FIG. 127 shows a display from the point of view of user Sona (a participant of the Senders Group Wave rule). FIG. 127 shows a view of the selected Sidebar sub-channel, which sub-channel excludes all channel participants other than, in this example, those selected by the Card Creator. In this embodiment the display of the Sidebar sub-channel includes a representation of the selected anchor message. In this embodiment, an optional system message associated with a Sidebar Rule is displayed. The user, Sarah, in this example, is prompted to enter a personal note, which note will be added to the Sidebar and visible to all sidebar participants once they have been given access to the Sidebar. FIG. 127, in this example, is a display of the Sidebar (Card) at a time that is after the "From" Group Wave rule has been given access to the Sidebar but before the "To" Group Wave rule has been given access to the Sidebar.

Figure 128:

In FIG. 128, user Sona, is shown to have added a personal note (1902). In this example tapping the "send" icon after entering text and/or other data (e.g., photos, audio, video, emoji, stickers, attachments, etc.) causes the personal note to be posted to the sidebar.

Figure 129:

FIG. 129 shows a display from the point of view of user Sarah (a participant of the Senders Group Wave rule). FIG. 129 shows that both Sarah's (1904) and Sona's (1906) personal notes have been posted to the Sidebar. In this embodiment the account owner's own message posts appear to themselves with a green background, while messages posted by others are displayed with a yellow background. There many ways to distinguish between user messages if so desired.

Figure 130:
Figure 131:
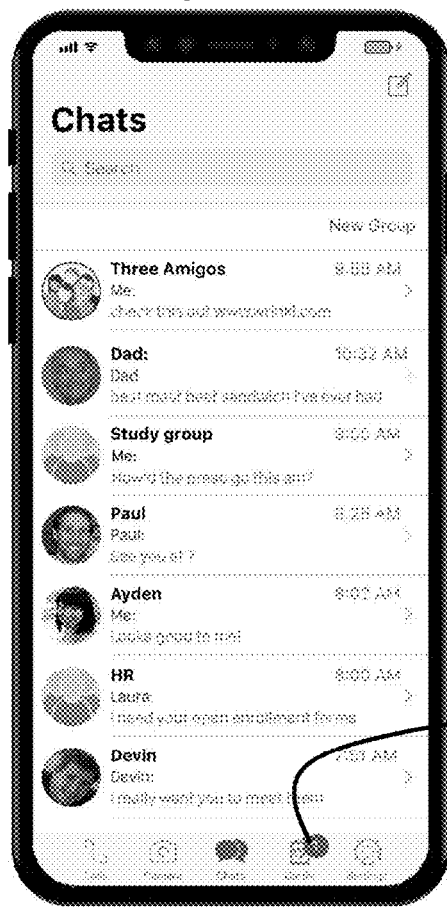

FIG. 130 shows a display from the point of view of user Elizabeth (the intended card recipient and a participant of the "To" Group Wave rule immediately before 10:00 AM on September 9$^{th}$ FIG. 131 shows a display from the point of view of user Elizabeth (a participant of the "To" Group Wave) at 10:00 AM on September 9$^{th}$. This is the time specified by the Card Creator to add the card recipient/s ("To" Group Wave rule) to the Sidebar. Once members of the "To" Group Wave rule is given access to the Sidebar a Group Wave rule specific Sidebar Inclusion Notification Message is posted to the Card Gallery Channel of the "To" Group Wave rule participants and the contents of the Sidebar become accessible to those participants. In this embodiment, the participants of the "From" Group Wave rule retain their access to the Sidebar.

FIG. 131 shows that user Elizabeth's display is updated at 10 AM on September 9$^{th}$ to indicate (1868) that there has been a new message posted to the Card Gallery channel.

Figure 132:
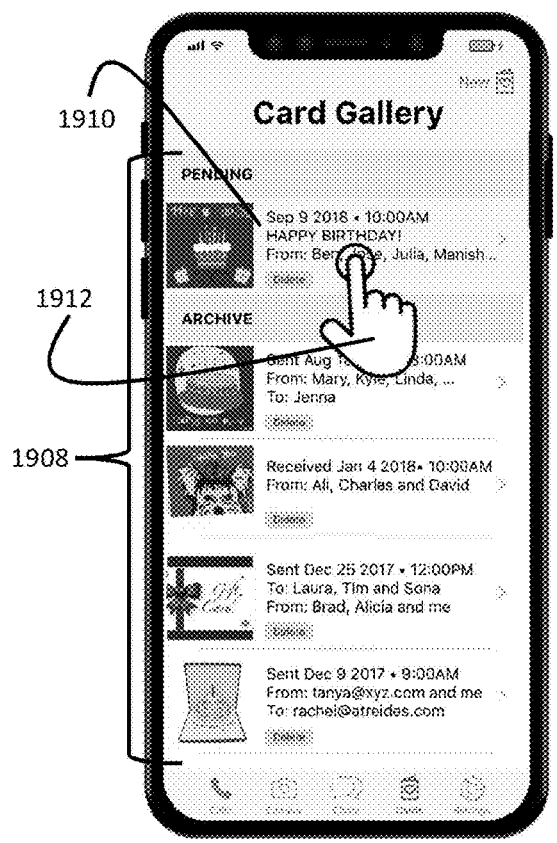

FIG. 132 shows a display from the point of view of user Elizabeth (a participant of the "To" Group Wave rule). FIG. 132 shows that Elizabeth has tapped on the Card icon which caused the display of the Card Gallery channel. FIG. 132 (1908) displays the contents of the Card Gallery channel from Elizabeth's point of view. The Card Gallery channel is a public channel but since direct posting to the channel has been restricted, only the Sidebar Inclusion Notification Messages related to the Sidebars that Elizabeth is a participant in are visible to her.

FIG. 132 (1910). The contents and attributes of the Sidebar Inclusion Notification Message associated with the "To" Group Wave rule in this example was predefined. For example, in this embodiment, in cases where this specific "Birthday Card" is selected as the anchor message, Group Wave participants in the "To" Group Wave rule will receive a Sidebar Inclusion Notification Message that includes an image of the birthday card, the date and time the birthday card was created, text that displays "HAPPY BIRTHDAY" and the names and/or other identifying attributes (to the extent possible) associated with the participants of the Senders Group Wave. The attributes of the Sidebar Inclusion Notification Message can vary greatly and from recipient to recipient and can be based on any factor, such as who the senders are, how many senders/recipients, location of senders/recipients, time of day, specific date, device used, motion detection, relationship, etc.

Figure 133:
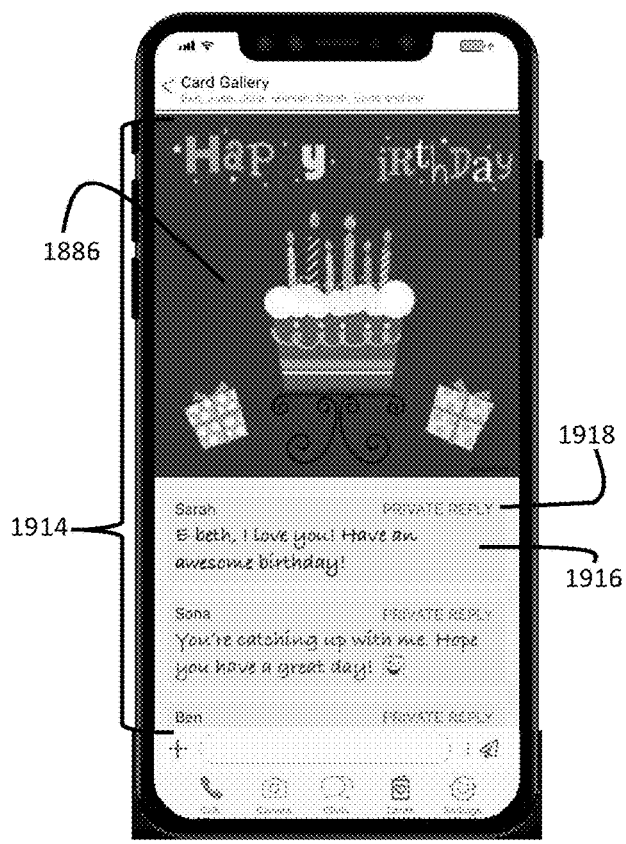

FIG. 132—In this example, user Elizabeth taps (1912) on the Sidebar Notification Message corresponding to Elizabeth's birthday card (1910) in order to cause the display of the related Sidebar shown as FIG. 133.

FIG. 133 shows a display from the point of view of user Elizabeth (a participant of the "To" Group Wave). 1914 shows a view of the selected Sidebar sub-channel, which sub-channel excludes all channel participants other than, in this example, those selected by the Card Creator. In this embodiment the display of the Sidebar sub-channel includes a representation of the selected anchor message (1886) below which the personal messages posted to the channel by Group Wave participants are displayed. In this embodiment messages can continue to be posted to the sidebar by participants of the Group Waves.

FIG. 133 shows a display from the point of view of user Elizabeth (a participant of the "To" Group Wave rule). 1916 shows a private message posted by Sender Group Wave participant Sarah. In this embodiment Elizabeth may post messages to the sidebar that will be visible to the participants of the sidebar or she may wish to send a private response to a posted message that will be visible only to the person (or bot) that posted the message being replied to which creates a further sidebar (a.k.a. a "Nested Sidebar"). To send a private response and to create a nested sidebar which further sidebar will be private between Elizabeth and Sarah and which "Nested Sidebar" will exclude the other participants of the Sidebar, Elizabeth, in this example, can tap the prompt that reads "PRIVATE REPLY". Doing so causes the screen shown in FIG. 134 to be displayed.

FIG. 134 shows a display from the point of view of user Elizabeth (a participant of the "To" Group Wave). In this embodiment, tapping on "PRIVATE REPLY" (1918) in FIG. 133 caused the display of a further Sidebar, a Nested Sidebar. In some embodiments a dedicated Nested Sidebar sub-channel associated with the spawning Sidebar will be a created and consist of just the messages related to the Nested Sidebar. In this embodiment, the Nested Sidebar related messages are placed in a pre-existing private Direct Message channel between the parties. The pre-existing Direct Message channel in this example also contains other private messages between the parties (Elizabeth and Sarah) (1920) that are unrelated to the Sidebar conversation.

As a result of Elizabeth's tapping on (1918) in message (1916) in FIG. 134 a further message in a further channel (e.g., Direct Message channel, new channel) is able to be formed (1926) which further message can contain text, images, etc. and which further message is combined and associated with a representation of the Further Anchor Message (1924).

FIG. 134 shows a Direct Message channel between Sarah and Elizabeth (1934). The channel is being shown from Elizabeth's point of view. In this embodiment, messages relating to the Nested Sidebars between the parties initiated in FIG. 133 are posted to this channel. In this embodiment, Elizabeth may return to a display of the parent Sidebar (Card) by tapping on "<Card" 1928. In this embodiment, Elizabeth may return to a display of her "Chats" channels by tapping on "<Chats".

FIG. 135 shows a display from the point of view of user Elizabeth (a participant of the "To" Group Wave rule). This FIG. 135 shows that Elizabeth has entered a message (1930). This private Nested Sidebar message will be associated and posted together with the Further Anchor Message (1932) in, in this example, the Elizabeth/Sarah Direct Message channel once Elizabeth taps on the "Send" icon (1934).

FIG. 136 shows a Direct Message channel between Sarah and Elizabeth (1934). The channel is being shown from Elizabeth's point of view. The posted Nested Sidebar message is shown 1936.

FIG. 137 shows a Direct Message channel between Sarah and Elizabeth (1934). The channel is being shown from Elizabeth's point of view. The posted Nested Sidebar message is shown 1938.

In some embodiments external users may be specified via their email, telephone number or other identifier as group wave participants. In cases where an external party is specified as a participant, that party may be communicated with using one of many possible mechanisms by which the third party may view and participant in the Sidebar. A weblink is an example of one possible mechanism.

The present description has described multiple embodiments of the present invention. It is understood that one or more aspects of one exemplary embodiment may be combined with one or more aspects of another exemplary embodiment (and/or further exemplary embodiments) in order to create yet a further exemplary embodiment of the present invention.

While a non-transitory machine-readable storage medium 928 is shown in an exemplary implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the disclosure. The term "machine-readable storage medium" shall accordingly be taken to include, but not be limited to, solid-state memories, and optical and magnetic media.

Some portions of the detailed descriptions are presented in terms of algorithms and symbolic representations of operations on data bits within a computer memory. These algorithmic descriptions and representations are the means used by those skilled in the computer processing arts to most effectively convey the substance of their work to others skilled in the art. An algorithm is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "associating", "updating", "providing", "integrating", "selecting", "executing", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

The invention claimed is:

1. A method of managing message communication relating to a channel that is accessible by a plurality of message actors, said method comprising the steps of:
   a) creating or identifying an anchor element in order to create a sidebar relative to the channel;
   b) selecting or creating a first group wave rule that identifies a subset of the plurality of message actors;
   c) providing said subset of said plurality of message actors with access to the sidebar based on said selecting of said first group wave rule, wherein an excluded actor of said plurality of message actors is excluded from access to said sidebar;
   d) selecting or creating a second group wave rule that relates to said excluded actor;
   e) receiving one or more responsive messages in said sidebar from at least one message actor, of said subset of the plurality of message actors, responsive to said providing in step c); and
   f) providing said excluded actor with access to content of said sidebar.

2. A method according to claim 1, wherein said plurality of message actors a human or a bot.

3. A method according to claim 1, wherein said anchor element or an element derived therefrom is placed in the sidebar.

4. A method according to claim 1, wherein said anchor element is selected from a plurality of anchor elements.

5. A method according to claim 1, wherein prior to performing said providing at step c), said anchor element exists in said message channel.

6. A method according to claim 1, wherein prior to performing said providing at step c), said anchor element exists outside the messaging channel.

7. A method according to claim 1, wherein step c) includes the step of selecting a further anchor element.

8. A method according to claim 1, wherein step f) includes the step of forwarding the anchor message to a further element actor that communicates outside of the messaging channel.

9. A method according to claim 1, wherein step c) is performed multiple times, and one of said actors of said subset receives access to the sidebar multiple times, or the one of said actors of said subset receives access to the sidebar and access to a further sidebar the multiple times, respectively.

10. A method according to claim 1 wherein in step c) the group wave rule is applied in a manner that results in a further action selected from the list consisting of: i) emailing a link to a third party that provides access to the sidebar; and ii) saving additions to the sidebar in a separate file.

11. A method according to claim 1 wherein step f) further comprises the step of selecting a time when the excluded actor is provided with access to the sidebar.

12. A method according to claim 1, wherein at least one of the subset of message actors receives a message that the anchor element or sidebar associated therewith is accessible to them.

13. A method according to claim 1, wherein identity of at least one of said subset of message actors is hidden from the excluded actor.

14. A method according to claim 1, wherein step f) is performed responsive to a predetermined event occurring.

15. Apparatus for managing message communication relating to a channel that is accessible by a plurality of message actors, said apparatus comprising:

memory for storing programming code; and one or more processors for performing the following steps based on said code:

a) creating or identifying an anchor element in order to create a sidebar relative to the channel;

b) selecting or creating a first group wave rule that identifies a subset of the plurality of message actors;

c) providing said subset of said plurality of message actors with access to the sidebar based on said selecting of said first group wave rule, wherein an excluded actor of said plurality of message actors is excluded from access to said sidebar;

d) selecting or creating a second group wave rule that relates to said excluded actor;

e) receiving one or more responsive messages in said sidebar from at least one message actor, of said subset of said plurality of message actors, responsive to said providing in step c); and f) providing said excluded actor with access to content of said sidebar.

16. Apparatus according to claim 15, wherein said plurality of message actors include a human or a bot.

17. Apparatus according to claim 15, wherein prior to performing said providing at step c), said anchor element exists in said message channel.

18. Apparatus according to claim 15, wherein prior to performing said providing at step c), said anchor element exists outside the messaging channel.

19. Apparatus according to claim 15, wherein step f) includes the step of forwarding the anchor message to a further message actor that communicates outside of the messaging channel.

20. Apparatus according to claim 15 wherein in step c) the group wave rule is applied in a manner that results in a further action selected from the list consisting of: i) emailing a link to a third party that provides access to the sidebar; and ii) saving additions to the sidebar in a separate file.

21. Apparatus according to claim 15 wherein step f) further comprises the step of selecting a time when the excluded actor is given access to the content of the sidebar.

22. Apparatus according to claim 15, wherein at least one of the subset of message actors receives a message that the anchor element has been forwarded to them.

23. Apparatus according to claim 15, wherein identity of at least one of said subset of message actors is hidden from the excluded actor.

24. Apparatus according to claim 15, wherein step f) is performed responsive to a predetermined event occurring.

25. A method according to claim 1, wherein said providing in step f) is delayed until said one or more message actors are permitted to provide said one or more responsive messages responsive to said first providing.

26. A method according to claim 1, wherein said method is initiated after viewing at least one message received from one of said message actors in a further message channel.

27. A method according to claim 1, wherein said method is initiated after viewing a further message channel comprising a plurality of messages indicating whether channel actors are included in channels.

28. A method according to claim 27, wherein said further message channel is viewed after viewing a menu of other channels, wherein said further message channel is one of said other channels.

29. A method according to claim 1, wherein step d) is performed before step b).

30. A method of managing message communication relating to a channel that is accessible by a plurality of message actors, said method comprising the steps of:

a) creating or identifying an anchor element in order to create a sidebar relative to the channel;

b) selecting or creating a first group wave rule that identifies a subset of the plurality of message actors;

c) providing said subset of said plurality of message actors with access to the sidebar based on said selecting of said first group wave rule, wherein an excluded actor of said plurality of message actors is excluded from access to said sidebar;

d) selecting or creating a second group wave rule that relates to said excluded actor; and e) providing said excluded actor with access to content of said sidebar.

* * * * *